(12) United States Patent
Gallagher-Gruber et al.

(10) Patent No.: US 11,774,735 B2
(45) Date of Patent: Oct. 3, 2023

(54) SYSTEM AND METHOD FOR PERFORMING AUTOMATED ANALYSIS OF AIR SAMPLES

(71) Applicant: FIRST FRONTIER PTY LTD, Seacliff (AU)

(72) Inventors: Jordan Gallagher-Gruber, Seacliff (AU); Gabor Szijártó, Budapest (HU)

(73) Assignee: First Frontier Pty Ltd

( * ) Notice: Subject to any disclaimer, the term of this patent is extended or adjusted under 35 U.S.C. 154(b) by 518 days.

(21) Appl. No.: 17/050,187

(22) PCT Filed: Apr. 24, 2019

(86) PCT No.: PCT/AU2019/000048
§ 371 (c)(1),
(2) Date: Oct. 23, 2020

(87) PCT Pub. No.: WO2019/204854
PCT Pub. Date: Oct. 31, 2019

(65) Prior Publication Data
US 2021/0090238 A1  Mar. 25, 2021

(30) Foreign Application Priority Data
Apr. 24, 2018 (AU) ................. 2018901364

(51) Int. Cl.
*G06T 7/00* (2017.01)
*G02B 21/00* (2006.01)
(Continued)

(52) U.S. Cl.
CPC ..... *G02B 21/0016* (2013.01); *G01N 15/0625* (2013.01); *G01N 15/1475* (2013.01);
(Continued)

(58) Field of Classification Search
CPC ......... G06T 7/0002; G06T 2207/20084; G06T 2207/20081; G06T 2207/10056;
(Continued)

(56) References Cited

U.S. PATENT DOCUMENTS 3,692,412 A  9/1972  Chubb
4,618,938 A  10/1986  Sandland et al.
(Continued)

FOREIGN PATENT DOCUMENTS

EP  1184659  3/2002
EP  1986155  10/2008
(Continued)

OTHER PUBLICATIONS

"Millipore Particle Monitoring Guide," Millipore Corporation, 1998, 69 pages.
(Continued)

*Primary Examiner* — Hoa Q Pham
(74) *Attorney, Agent, or Firm* — Sheridan Ross P.C.

(57) ABSTRACT

A system and method for automated analysis of a filter obtained from an air quality monitoring apparatus used for sampling airborne respirable particles such as asbestos fibres, synthetic mineral fibres, pollen or mould particles is described. The system comprises capturing images at a plurality of sample locations. At least one magnified phase contrast image is obtained at each sample location. An automated quality assessment is then performed using a computer vision method to assess one or more quality criteria. Failure may lead to the sample location being ignored for subsequent analysis, or the whole filter slide may be rejected if the overall quality is poor. The quality assessment may performed be in two stages comprising an overall filter quality assessment performed on a series of low power/magnification images captured over the filter and a
(Continued)

field of view or graticule level quality assessment performed on high power/magnification images captured at individual sample locations on the filter. Images which pass the quality assessment are then analysed using a computer vision method to identify and count the number of respirable particles.

**28 Claims, 22 Drawing Sheets
(6 of 22 Drawing Sheet(s) Filed in Color)**

(51) Int. Cl.
*G01N 15/06* (2006.01)
*G02B 21/02* (2006.01)
*G01N 15/14* (2006.01)
*G01N 15/00* (2006.01)

(52) U.S. Cl.
CPC ....... *G02B 21/008* (2013.01); *G02B 21/0036* (2013.01); *G02B 21/025* (2013.01); *G06T 7/0002* (2013.01); *G01N 2015/0046* (2013.01); *G01N 2015/0693* (2013.01); *G06T 2207/10056* (2013.01); *G06T 2207/20081* (2013.01); *G06T 2207/20084* (2013.01); *G06T 2207/20221* (2013.01); *G06T 2207/30242* (2013.01)

(58) Field of Classification Search
CPC .. G06K 9/3233; G06K 9/4609; G01B 11/306; G02B 21/0056; G02B 21/14; G02B 21/36; G02B 21/025; G02B 21/367; G02B 21/0036; G02B 21/008; G02B 27/52; G01N 15/0618; G01N 15/0612; G01N 15/0625; G01N 2015/0049; G01N 2015/0693; G01N 2015/0046; G01N 21/94; G01N 21/361; G01N 21/365; G01N 33/0036
USPC .................................. 356/335–343; 382/149
See application file for complete search history.

(56) References Cited

U.S. PATENT DOCUMENTS

| | | | |
|---|---|---|---|
| 4,940,327 | A | 7/1990 | Lilienfeld |
| 5,205,155 | A | 4/1993 | Cooper |
| 5,566,249 | A | 10/1996 | Rosenlof et al. |
| 7,418,118 | B2 | 8/2008 | Furnas et al. |
| 8,250,021 | B2 | 8/2012 | Roth |
| 8,254,696 | B2 | 8/2012 | Matteoni et al. |
| 8,331,620 | B2 | 12/2012 | Branham et al. |
| 9,917,112 | B2 | 3/2018 | Yamazaki et al. |
| 10,502,700 | B2 * | 12/2019 | Barber ............... G01N 15/1456 |
| 11,079,585 | B2 * | 8/2021 | Gallagher-Gruber ....................... G02B 21/361 |
| 2005/0111086 | A1 | 5/2005 | Knoblich et al. |
| 2005/0251347 | A1 | 11/2005 | Perona et al. |
| 2008/0267469 | A1 | 10/2008 | Kawabata et al. |
| 2017/0227430 | A1 | 8/2017 | Marini et al. |
| 2019/0258046 | A1 | 8/2019 | Gallagher-Gruber et al. |

FOREIGN PATENT DOCUMENTS

| | | |
|---|---|---|
| JP | 2007-218641 | 8/2007 |
| KR | 2012-0075836 | 7/2012 |
| KR | 2012-0129383 | 11/2012 |

OTHER PUBLICATIONS

Baron et al. "Evaluation of the Magiscan Image Analyzer for Asbestos Fiber Counting," American Industrial Hygiene Association Journal, Jan. 1987, vol. 48, No. 1, pp. 39-46.
Theodosiou et al. "Airborne Asbestos Fibers Detection in Microscope Images using re-initialization free Active Contours," IEEE, 32nd Annual International Conference of the IEEE EMBS, Aug. 31-Sep. 4, 2010, 4 pages.
"Clemex Vision PE," Clemex Technologies Inc., Jun. 2015, 16 pages.
"Guidance Note on the Membrane Filter Method for Estimating Airborne Asbestos Fibres," Commonwealth of Australia, Apr. 2005, 2nd. Edition, 75 pages.
Boucher et al. "Development of a semi-automatic system for pollen recognition," Aerobiologia, 2002, vol. 18, pp. 195-201 (Abstract only).
Ishizu et al. "Image Processing of Particle Detection for Asbestos Qualitative Analysis Support Method," 10th International Conference on Control, Automation, Robotics and Vision, Dec. 17-20, 2008, Hanoi, Vietnam, 7 pages.
Ishizu et al. "Automatic Counting Robot Development Supporting Qualitative Asbestos Analysis—Asbestos, Air Bubbles, and Particles Classification Using Machine Learning," Journal of Robotics and Mechatronics, Apr. 2010, vol. 22, No. 4, pp. 506-513.
Landsmeer et al. "Detection of pollen grains in multifocal optical microscopy images of air samples," Microsc. Res. Tech., 2009, vol. 72, No. 6, pp. 424-430 (Abstract Only).
Wienke et al. "An adaptive resonance theory based artificial neural network (ART-2a) for rapid identification of airborne particle shapes from their scanning electron microscopy images, Chemometrics and Intelligent Laboratory Systems," Nov. 1994, vol. 25, No. 2, pp. 367-387 (Abstract only).
International Search Report and Written Opinion for International (PCT) Patent Application No. PCT/AU2019/000048, dated Jun. 21, 2019, 7 pages.

* cited by examiner

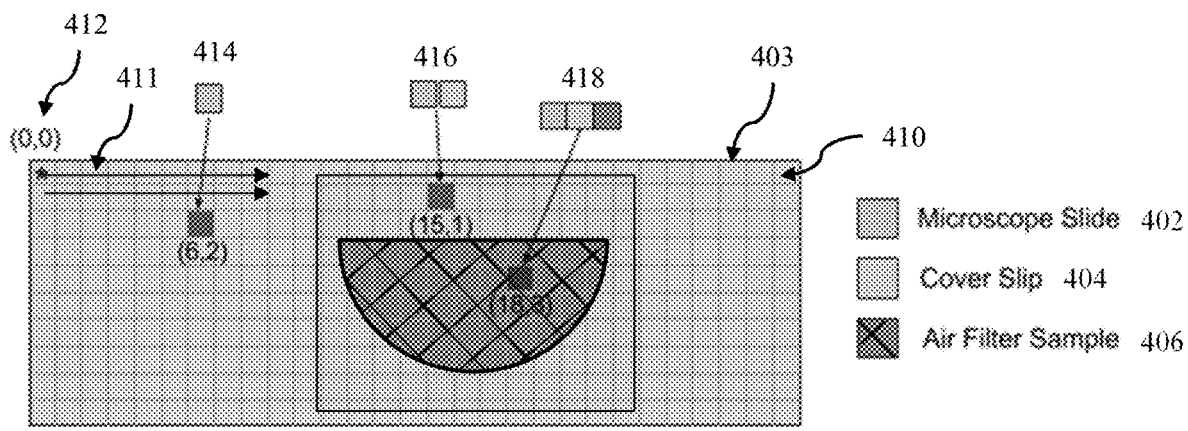
Figure 4B
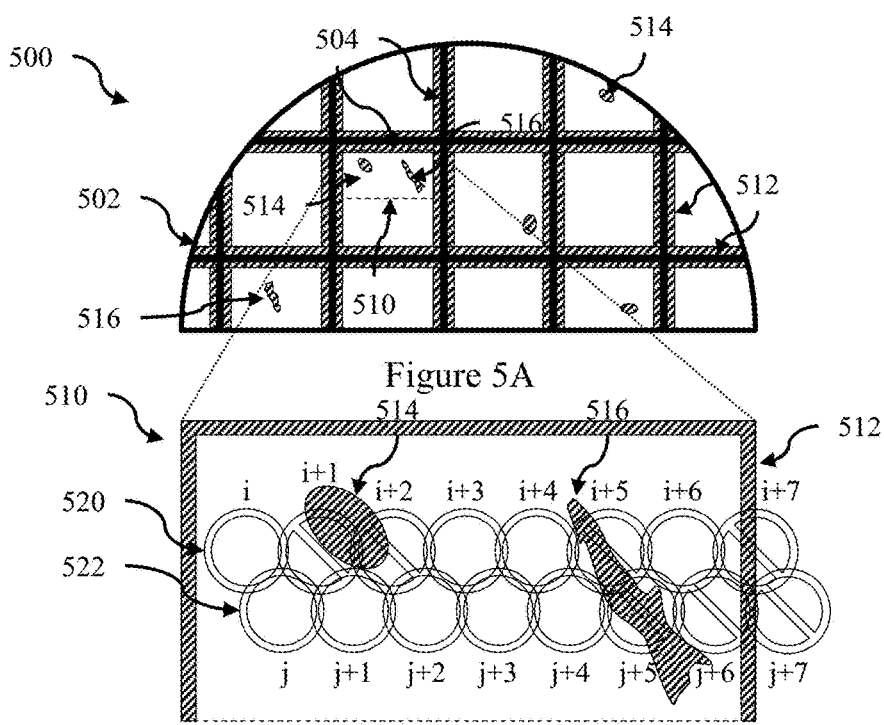
Figure 5A
Figure 5B
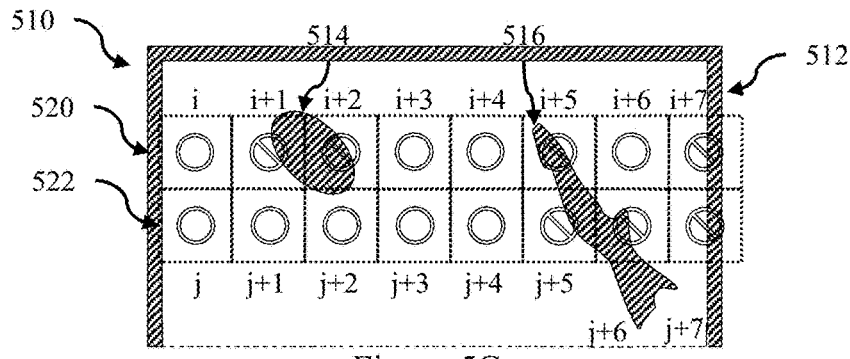
Figure 5C

SYSTEM AND METHOD FOR PERFORMING AUTOMATED ANALYSIS OF AIR SAMPLES

CROSS-REFERENCE TO RELATED APPLICATIONS

This application is a national stage application under 35 U.S.C. 371 and claims the benefit of PCT Application No. PCT/AU2019/000048 having an international filing date of 24 Apr. 2019, which designated the United States, which PCT application claimed the benefit of Australian Provisional Patent Application No. 2018901364 titled "SYSTEM AND METHOD FOR PERFORMING AUTOMATED ANALYSIS OF AIR SAMPLES" and filed on 24 Apr. 2018, the contents of each of which are hereby incorporated by reference in their entireties.

TECHNICAL FIELD

The present disclosure relates to monitoring air quality. In a particular form the present disclosure relates to automated systems for analysing air samples for the presence of respirable particles such as asbestos fibres or synthetic mineral fibres (SMF).

BACKGROUND

Airborne respirable particles and fibres, such as asbestos or synthetic mineral fibres (SMF) represent a health hazard and Occupational Health and Safety guidelines and or laws often require air quality monitoring apparatus to be installed near locations where respirable fibres may be present. These air quality monitoring apparatus comprise a pumping system which draws air through a filter at a specified flow rate, and after sampling the air for respirable fibres such as asbestos fibres, the filter can be removed and sent off to a laboratory for conversion to a membrane filter for counting of asbestos fibres. Typically the filters are mixed cellulose ester (MCE) filters with a pore size of around 0.8 micrometres. In Australia, the currently accepted and recommended method for analysis of membrane filters for sampling asbestos fibres is known as the Membrane Filter Method (MFM). The membrane filter method was first developed by the Australian National Health and Medical Research Council in 1976. A guidance note was issued in 1988 and was updated again in 2005 by the National Occupational Health and Safety Council (NOHSC) and published as a "Guidance Note on the Membrane Filter Method for Estimating Airborne Asbestos Fibres [NOHSC: 3003 (2005)]". This guidance note defines the sample collection methodology, details of the membrane filter method and reporting requirements, and the entire content of this guidance note is hereby incorporated by reference. Similar reference documents or guidance notes exist in other jurisdictions, such as OHSA 1994 note: 29 CFR 1910.1001b Occupational safety and health standards: detailed procedure for asbestos sampling and analysis—Non-Mandatory. Washington, D.C.: U.S. Department of Labor, Occupational Safety and Health Administration.

As stated in the guidance note, the MFM is used to assist in monitoring the effectiveness of control measures for preventing exposure to airborne asbestos fibres, and in determining worker exposure to airborne asbestos fibres. The membrane filter method requires a skilled operator to manually review a large number (e.g. 100) graticule areas (points) over the membrane filter through a phase contrast microscope and count the number of countable respirable fibres in the graticule field of view. Counting requires the operator to match a fibre to a published reference shape, and they must exclude counting in locations where membrane filter grid lines, air bubbles and large particulate matter are within the graticule field of view or close to the graticule field of view, as air-bubbles can cause a wash effect where fibres are pushed to the edges of the bubble. The operator counts "countable respirable fibres" which are those fibres which match a published reference shape (e.g. the Guidance Note). That is a countable respirable fibre is one that fits the geometric requirements defined by the Guidance Note (or similar reference). According to this definition, almost all asbestos fibres are countable respirable fibres, but it must be noted that not all countable respirable fibres are necessarily asbestos fibres. Despite this, the number of countable respirable fibres is used as a measure (or proxy) of the number of asbestos fibres in the air sample.

As noted in the Guidance Note "experience has shown that this method does not always produce comparable results when used by different laboratories and by different workers. Differences can arise due to variations in sampling, preparation of the slide, optical counting, the calculation of the results and other influencing factors. Inter-laboratory comparisons of dust measurements are feasible only if agreement can be reached concerning all details of the method". Thus whilst the membrane filter method is still the recommended method for measuring airborne asbestos fibres, it remains both a time consuming and subjective measurement. Further the validity of the method relies upon the operator to strictly adhere to the guidelines and diligently identifying regions to be excluded, and correctly identify and count fibres over the full surface of the membrane filter. When operators are under time or cost pressures there remains the risk that strict adherence to the guidelines may be sacrificed, and thus safety and reliability of the membrane filter method is compromised. Automated systems have the potential to improve on the poor repeatability/reliability and slowness of human operators. To be effective such automated systems must be fast, reliable, and accurate to build trust in the use of such systems. Some automated systems have been proposed to perform automated fibre counting, however most do not appear to have transitioned from laboratory to commercial use.

There is thus a need to provide improved systems and methods for analysing a membrane filter obtained from an air quality monitoring apparatus for measuring airborne asbestos fibres (and other respirable fibres or similar matter), or to at least provide a useful alternative to existing systems and methods.

SUMMARY

According to a first aspect, there is provided a method for automated analysis of a filter obtained from an air quality monitoring apparatus used for sampling airborne respirable particles, the method comprising:
  loading an optically transparent support supporting a sample portion of a filter into a robotic XY stage of a digital phase contrast microscope further comprising an image sensor configured to capture an image of the image plane of the digital phase contrast microscope;
  capturing at least one image at each of a plurality of sample locations to obtain a plurality of images that tile a sample portion of the filter, wherein the at least one image comprises at least one magnified phase contrast image, and the robotic XY stage is configured to move the optically transparent support to position the sample location in the field of view of the microscope;

performing a quality assessment by analysing one or more images captured at one or more of the plurality of sample locations using a computer vision method to estimate one or more quality criteria and terminating further analysis at at least the sample location if the estimated one or more quality criteria fails the quality assessment based upon one or more predefined quality thresholds, wherein estimating the one or more quality criteria comprise estimating one or more of a dust loading, a particle loading, a particle distribution, a pixel colour distribution, a brightness range, or an image property or feature that indicates poor quality or proximity to a boundary, gridline or air bubble;

analysing the countable region using a computer vision method to identify and count the number of countable respirable particles within the countable region; and reporting either the total number of countable respirable particles counted in the countable region of the filter, or an estimate of the density of particles on the filter.

In one form, terminating further analysis may comprise terminating further analysis at that sample location if the estimated one or more quality criteria fails the quality assessment based upon one or more predefined quality thresholds and then moving to another sample location, and if further analysis is terminated at more than a threshold number of sample locations then no further locations are sampled and a failed quality assessment status is reported. In a further form a quality assessment may be performed at each sample location, and further comprising performing a filter level quality assessment by combining one or more images at a plurality of sample locations to estimate one or more filter level quality criteria, the one or more filter level quality criteria comprising identify one or more tears in the filter, detecting if a portion of the filter is outside of a coverslip, detecting discolouration of the filter, estimating a percentage of the membrane covered by air bubbles, estimating a dust loading, and/or detecting an image property or feature that indicates poor quality or improper sample preparation. In a further form each image may be captured in a magnification range of between 100× and 200×.

In one form the quality analysis may be performed in two parts, the first part comprising performing a filter level quality assessment of the filter using a plurality of images captured in a first magnification range at a plurality of sample locations, and the second part comprises performing a field of view level quality assessment of one or more of the at least one images at a plurality of sample locations captured in a second magnification range, wherein the second magnification range is a higher power magnification range than the first magnification range, and performing a filter level quality assessment comprises analysing a plurality of images captured in the first magnification range at a plurality of sample locations, and the estimating the one or more quality criteria comprises identifying one or more tears in the filter, detecting if a portion of the filter is outside of a coverslip, detecting discolouration of the filter, estimating a percentage of the membrane covered by air bubbles, estimating a dust loading, and/or detecting an image property that indicates poor quality or improper sample preparation, and performing a field of view level quality assessment at each sample location comprises estimating one or more a dust loading, a particle loading, a particle distribution, a pixel colour distribution, a brightness range, and/or an image property or feature that indicates poor quality or proximity to a boundary, gridline or air bubble for the field of view at the sample location, and wherein if the estimated one or more quality criteria fails a filter level quality assessment then terminating further analysis comprises terminating further analysis of the filter and reporting a failed quality assessment status for the filter, and if the estimated one or more quality criteria fails a field of view level quality assessment then terminating further analysis comprises terminating further analysis for this sample location and then moving to another sample location unless further analysis has been terminated at more than a threshold number of sample locations in which case no further locations are sampled and a failed quality assessment status is reported.

In a further form the first magnification range may be between 10× and 200×, and the second magnification range may be between 200× and 600×. In one form the second part may be performed after the first part and the filter level quality assessment. In a further form the filter level quality assessment may be used to plan the location of the sample locations used in the second part. In one form the plurality of images used for performing the filter level quality assessment are collected at the same time as the plurality of images used for performing field of view level quality assessment, and an objective lens of the digital phase contrast microscope is robotically switched between two magnifications at a sample location depending upon whether an image to be captured is to be used for the filter level quality assessment or the field of view level quality assessment. In one form the plurality of images used for performing the filter level quality assessment may tile the sample portion of the filter or may be captured at a plurality of sample locations distributed within the sample portion of the filter such that the total area of the captured images comprises at least 20% of the total area of the sample portion. In a further form the plurality of sample locations may be randomly selected.

In one form, performing the filter level quality assessment may further comprise determining a countable region of the filter and one or more excluded regions within the countable region of the filter, the excluded regions comprising one or more of filter grid lines, air bubbles and large particulate matter. In a further form, analysing the plurality of images using a computer vision method to determine a countable region comprises:

identifying one or more locations comprising a slide boundary, a coverslip, gridlines on the filter, one or more bubbles on the filter, or large particulate matter including dirt;

defining or more excluded regions containing the one or more identified locations;

defining the countable region by identifying the set of images in the plurality of images which do not contain an excluded region within the field of view of the image, and wherein analysing a plurality of the at least one image at each of a plurality of sample locations comprising analysing the countable region using a computer vision method to identify and count the number of countable respirable particles within the countable region.

In one form, analysing the countable region may comprise analysing the one or more captured images at each sample location if the field of view at the sample point is wholly within the countable region.

In one form, the step of capturing at least one image at each of a plurality of sample locations may comprises capturing, at each sample location, a set of Z magnified phase contrast images each captured at a different focal plane, and analysing the countable region comprises Z-stacking the set of Z magnified phase contrast images to obtain a single stacked image, and the computer vision method analyses the single stacked image to identify and count the number of countable respirable particles within a counting region of the field of view of the single stacked image. In an alternate form the image with the sharpest focus (from the set of images) is selected and is used in the step of analysing a plurality of the at least one image at each of a plurality of sample locations. In an alternate form, the Z images are separately analysed to detect a feature present in multiple focal planes.

In one form, the computer vision method to identify and count the number of countable respirable particles within a counting region of the field of view at each sample location may comprise:
  identifying one or more regions of interest within a counting region of the field of view;
  applying a pixel extractor to identify candidate fibre pixels in each region of interest using one or more machine learning techniques, background filtering, or diffusion filtering techniques, and outputting one or more pixel blobs comprising a contiguous group of pixels;
  applying a feature extractor to each pixel blob received from the pixel extractor to apply one or more geometric operations to classifying a pixel blob having a geometry matching a respirable particle as a countable respirable particle; and
  counting the number of countable respirable particles.

In a further form the pixel extractor may use one or more machine learning classifiers trained on a reference set of images of a respirable particle to each region of interest to identify one or more candidate regions of interest which match a reference image. In a further form, the pixel extractor uses an anisotropic diffusion filtering technique.

In a further form, the respirable particles and countable respirable particles are asbestos fibres and the one or more geometric operations may comprise applying a regular asbestos fibre geometric filter to each candidate region of interest using a filtering criteria requiring a pixel blob in a candidate region of interest to have a maximum width less than 3 micrometres, a length greater than 5 micrometres and a length:width ratio greater than 3:1, and which does not appear to touch any other pixel blob within the candidate region of interest, and each pixel blob satisfying the filtering criteria is counted as a single countable respirable fibre.

In a further form, respirable particles and countable respirable particles are asbestos fibres and the one or more geometric operations may further comprise applying a bundled asbestos fibre geometric filter to each candidate region of interest using a filtering criteria requiring a pixel blob in a candidate region of interest to have a maximum width less than 3 micrometres, a length greater than 5 micrometres and a length:width ratio greater than 3:1; and which does not appear to touch any other pixel blob with a maximum width, defined as the smaller of the two dimensions of the other pixel blob, greater than 3 micrometres, and wherein counting the number of countable respirable fibres comprises counting any individually distinguishable fibres, or if no individual fibres can be distinguished then counting the bundle as a single fibre.

In one form, analysing one of the plurality of the at least one image at each of a plurality of sample locations using a computer vision method may comprise using a deep learning neural network model. In a further form the deep learning neural network model is a convolution neural network comprising convolutional filters and ReLU activation and receives an input image and identifies candidate respirable particle features in an image, and the one or more geometric operations are applied to determine and count the number of respirable particles in the image. In a further form, the deep learning neural network model is a convolution regression neural network comprising a VGG16 network and full connection layers, and receives an input image and outputs a count of the estimated number of respirable particles in the image.

In one form, the step of capturing at least one magnified phase contrast image at each of a plurality of sample locations may comprise:
  a) defining a 2D mapping grid over the sample portion, wherein the dimensions of the grid are based on a field of view associated with a magnification setting of the digital phase contrast microscope, and the grid points define the plurality of sample locations;
  b) selecting a point within the 2D mapping grid;
  c) instructing the robotic XY stage to the selected point and capturing at least one magnified phase contrast image;
  d) repeating steps b) and c) until the captured images tile the sample portion or have a total area exceeding a threshold area.

In one form the method may further comprise determining a target focal plane at at least one sample location, comprising:
  capturing an image at a magnification of between 4× and 200× and using a computer vision method to identify one or more gridlines in the captured image;
  moving the robotic XY stage so that an identified gridline is proximal to a centre of the field of view;
  switching an objective lens of the digital phase contrast microscope to a higher magnification objective lens;
  adjusting a Z height of the digital phase contrast microscope until the gridline is in focus;
  storing the Z height as a point in the target focal plane, and using the stored target focal plane to determine the focal plane for capturing one or more images at one or more other sample locations.

In one form the method may further comprise determining a target focal plane at at least one sample location, comprising:
  capturing a series of images at a magnification of between 4× and 200× at a sample location, wherein the series of image are each taken at a different Z height;
  analysing the series of images to determine one or more of a coverslip boundary or an upper slide boundary, or a lower slide boundary, and
  storing the Z height of the image with the sharpest focus that is estimated to be within upper slide boundary and the lower slide boundary as a point in the target focal plane, and using the stored target focal plane to determine the focal plane for capturing one or more images at one or more other sample locations.

In one form the method may further comprise generating a predictive focal plane map of the sample portion of the filter, comprising picking a plurality of sample locations distributed across the sample portion and estimating a target focal plane at each of the sample locations.

In one form, the method may further comprise:
  placing the filter on the optically transparent support using a sample placement stencil located under the optically transparent support that indicates a preferred location for the filter;

treating the filter to form a membrane filter; and fixing the membrane filter to the optically transparent support using a coverslip.

In one form, each of the at least one magnified phase contrast image has a total magnification of between 10 times and 2000 times.

In one form, the countable respirable particles are asbestos fibres or synthetic mineral fibres and the filter is a membrane filter.

In one form, the optically transparent support may be a microscope slide, and the method may further comprise loading a plurality of microscope slides each supporting a sample portion filter into a computer controlled autoloader configured to loads and unload one or more microscopes into the robotic XY stage, and inserting the microscope slide supporting the sample portion filter into a robotic XY stage is performed using the autoloader, and wherein each microscope slide comprises a unique identifier, and the method further comprises capturing a representation of the identifier, and performing the capturing analysing and reporting steps for each loaded microscope wherein the reporting also reports the unique identifier of the microscope.

According to a second aspect, there is provided a system for automated analysis of a filter obtained from an air quality monitoring apparatus used for measuring airborne respirable particles, the apparatus comprising:

a robotic microscope platform comprising
a phase contrast microscope;
a motorised XY stage for receiving an optically transparent support which in use comprises a sample portion of a filter;
a motorised Z axis focus drive;
an image sensor located in an image plane configured to capture at least one magnified phase contrast image; and at least one computing apparatus operatively connected to the robotic microscope platform, the at least one computing apparatus comprising at least one processor and a memory operatively connected to the processor, and the computing apparatus configured to perform the method of the first aspect.

In one form, the system may further comprise a motorised nosepiece comprising multiple objective lenses each with a different magnification.

In one form, the system may further comprise an autoloader for storing a plurality of optically transparent supports and configured to load and unload one or more optically transparent support in the motorised XY stage.

In one form, the at least one computing apparatus may comprise a local computing apparatus and at least one remote computing apparatus, the local computing apparatus either directly connected to the robotic microscope platform or integrated in the robotic platform, or connected on a local network and wherein the local computing apparatus is configured to perform the capturing step and provide the captured at least one image to the at least one remote computing apparatus over a network connection, and the remote computing is configured to perform the analysis and reporting steps.

BRIEF DESCRIPTION OF DRAWINGS

The patent or application file contains at least one drawing executed in color. Copies of this patent or patent application publication with color drawing(s) will be provided by the Office upon request and payment of the necessary fee.

Embodiments of the present disclosure will be discussed with reference to the accompanying drawings wherein:

FIG. 4B is a schematic diagram of a 2D grid mapped to the microscope slide of FIG. 4A;

FIG. 5A is a schematic diagram of a filter illustrating gridlines and excluded regions according to an embodiment;

FIG. 5B is close up of a partial grid illustrating excluded regions and sample locations according to an embodiment;

FIG. 5C is close up of a partial grid illustrating excluded regions and sample locations according to an embodiment;

In the following description, like reference characters designate like or corresponding parts throughout the figures.

DESCRIPTION OF EMBODIMENTS

Figure 1A:
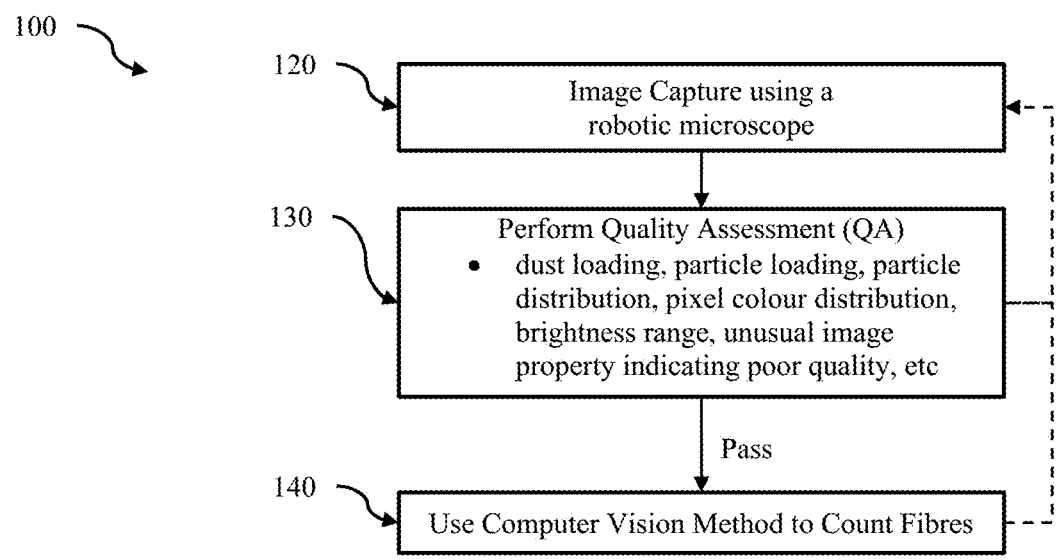
FIG. 1A is a flowchart of a method for automated analysis of a filter obtained from an air quality monitoring apparatus used for sampling airborne respirable particles according to an embodiment.
Figure 1B:
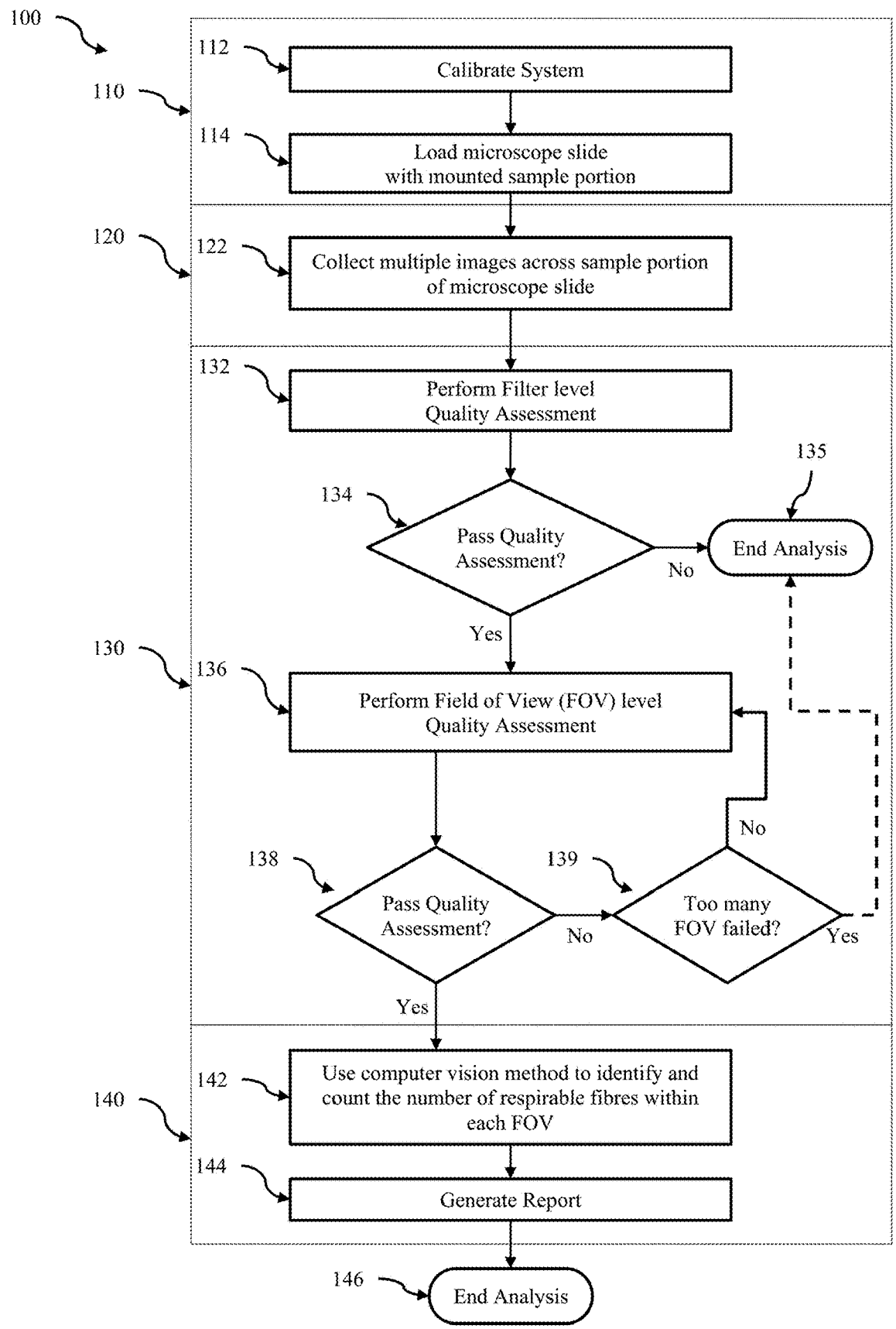
FIG. 1B is a flowchart of a method for automated analysis of a filter obtained from an air quality monitoring apparatus used for sampling airborne respirable particles according to an embodiment.
Figure 1C:
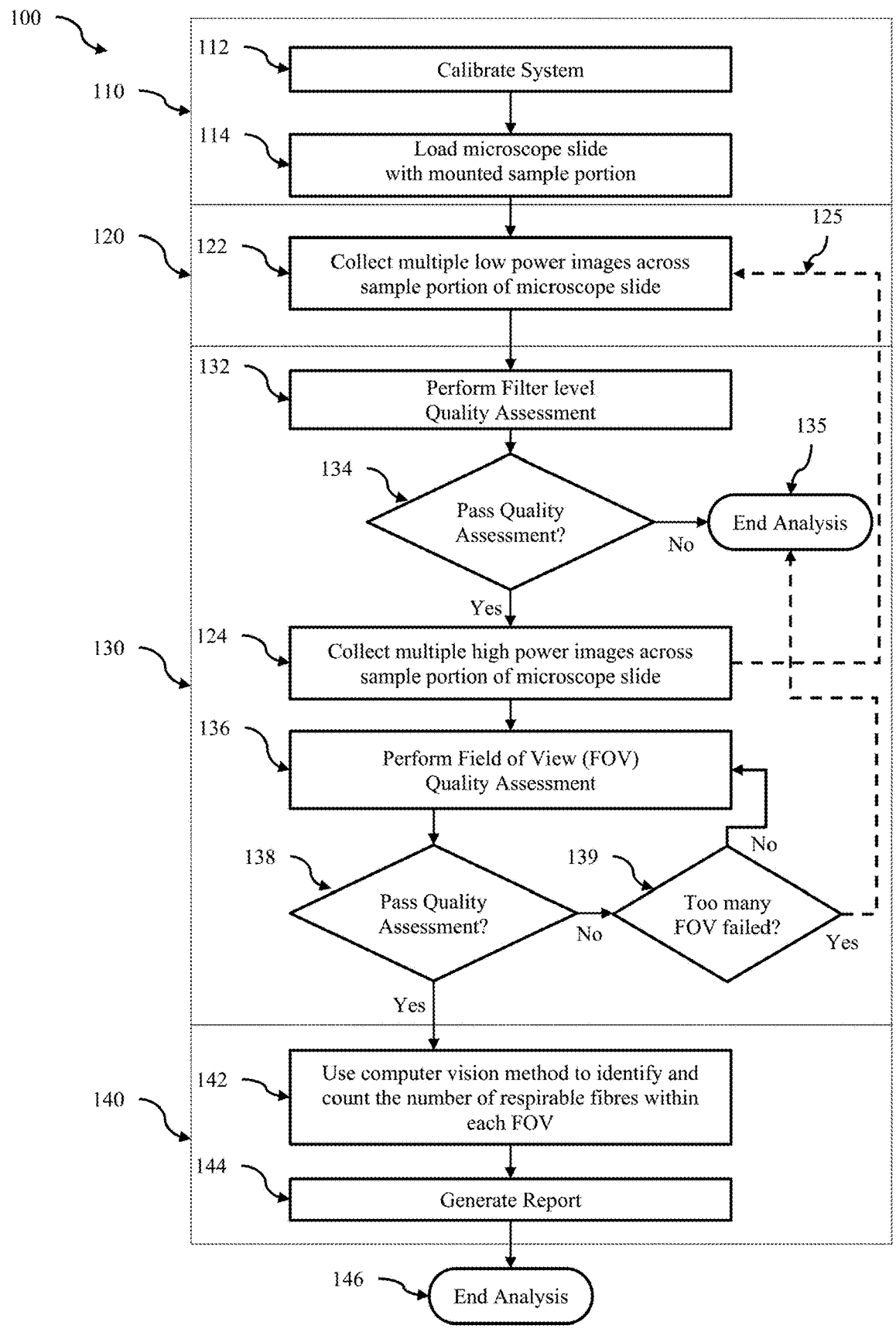
FIG. 1C is a flowchart of method for automated analysis of a filter using a low power scan and a high power scan according to an embodiment.
Figure 1D:
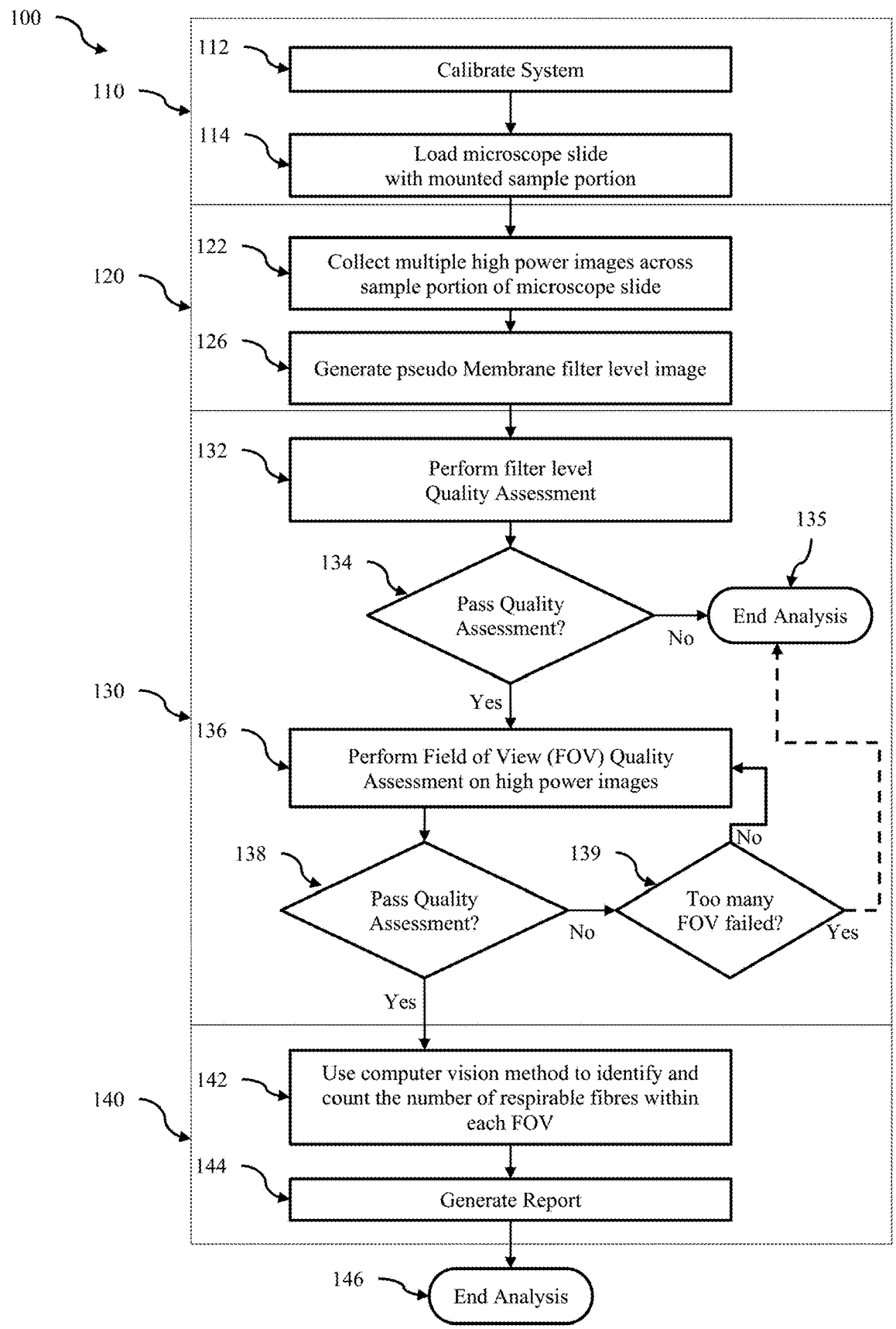
FIG. 1D is a flowchart of method for automated analysis of a filter using a high power scan to generate a pseudo filter level image according to an embodiment.
Figure 15:
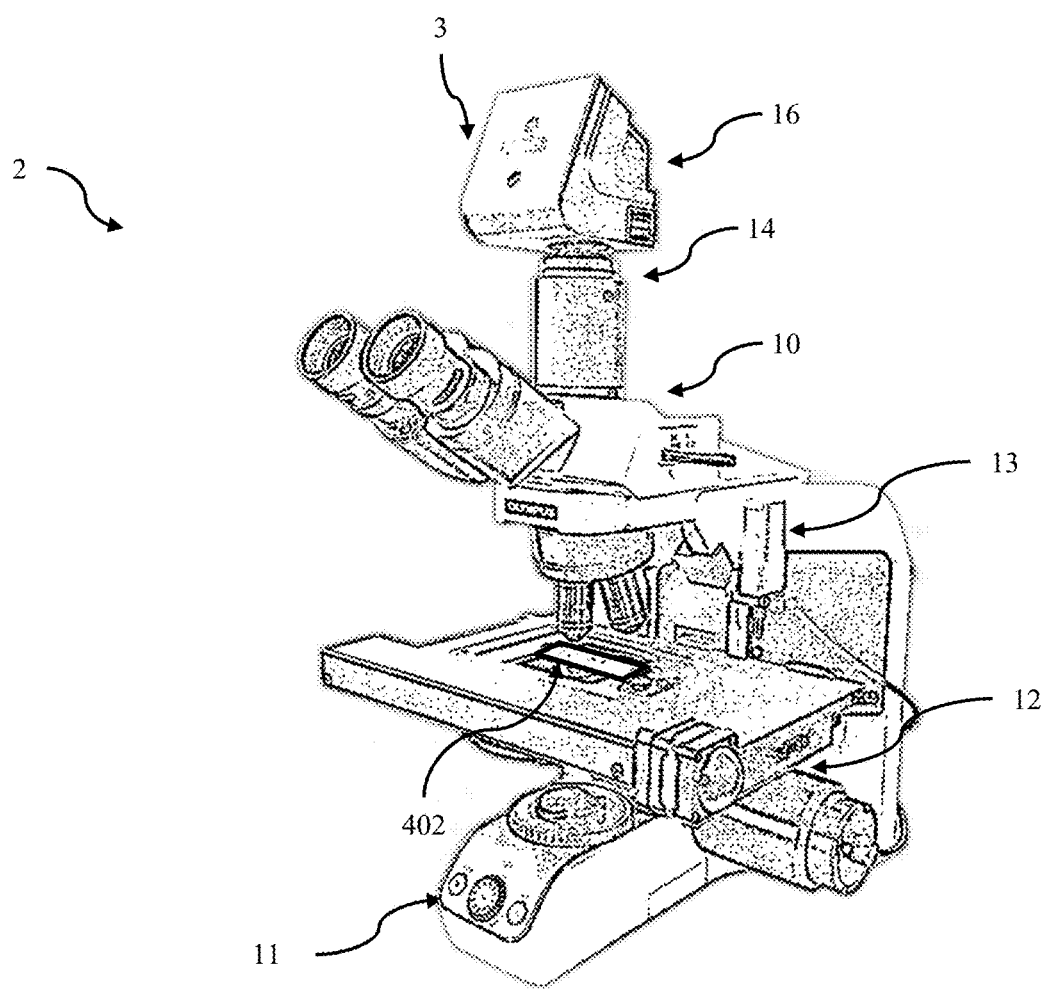
FIG. 15 is a schematic drawing of a robotic microscope platform according to an embodiment.

Referring now to FIG. 1A, there is shown a flow chart 100 of a method for automated analysis of a filter obtained from an air quality monitoring apparatus used for sampling airborne respirable particles such as asbestos and synthetic mineral fibres according to an embodiment. FIGS. 1B, 1C, and 1D illustrate a range of embodiments which implement the broad method showed in FIG. 1A. These implement several variations on how automated quality assessment can be performed which are further illustrated in FIGS. 2A to 2I. Implementing automated quality assessment builds confidence in the automating counting method, and allows efficient processing of filters including the rejection of poor quality field of views so that time is wasted attempting to identify and count particles at the sample location, or entire filters so time is not spent on a poor quality filter. FIG. 3 is a schematic diagram of a system for automated analysis of a filter obtained from an air quality monitoring apparatus according to an embodiment. The system comprises a robotic microscope platform 2 and at least one computing apparatus 4 operatively connected to the robotic microscope platform 2. FIG. 15 is a schematic drawing of a robotic microscope platform according to an embodiment. In some embodiments additional components may be included, such as a microscope slide (or other optically transparent support) autoloader 18. The membrane filters can be used to capture a range of respirable particles and one particularly important application is for the detection and counting of asbestos fibres as these remain a serious health issue. As such the following explanation and embodiments will focus on detection and counting of asbestos fibres. However whilst the system is designed for use measuring asbestos fibres it will be apparent that the system can be adapted to measure other respirable fibres in air samples, such as synthetic-mineral-fibres (SMF), silica fibres, wool fibres and wooden fibres, and other respirable particles such as mould spores and pollen. More generally it can be used to identify and count other respirable particles which have well defined geometrical or visual properties which can be reliably identified using computer vision methods. Accordingly whilst the specification may provide examples of asbestos fibres captured on filters (converted to membrane filters), it will be understood that this is illustrative, and the method may be used for other respirable particles captured on filters in air sampling equipment, and which are transparent or can converted to a membrane filter and mounted onto a slide or other optically transparent support. The filter may be a transparent tape that capture respirable particles (ie filters from passing air) or other similar capture mediums that can be loaded onto a microscope slide (or similar).

Referring now to FIG. 1A, the method 100 begins with an image capture stage 120 across a sample portion of a filter loaded in a robotic microscope to capture a plurality of images. The sample portion is supported on an optically transparent support such as a glass microscope slide. A robotic XY stage is configured to move the optically transparent support to position the sample location in the field of view of the microscope. At least one image is captured at each of a plurality of sample locations distributed over the sample portion of the filter. At least one of these images is a magnified phase contrast image. Further multiple images may be captured at the sample location. These may be at different focal planes (or Z heights) and/or at different magnifications by switching the objective lens stage or other optical elements. A quality assessment (QA) 130 is performed on one or more of the captured images and if the quality assessment stage 130 is passed, then a computer vision method is used to count particles 140. A report can then be generated.

The quality assessment stage comprises estimating a range of quality criteria which can then be compared against relevant predetermined thresholds. These can then be used to determine if the quality assessment is passed or failed. Failure may occur if only one of many sample criteria are outside of an acceptance range, or multiple quality criteria may be combined. In some embodiments multiple thresholds for a quality criteria could be defined where a first threshold is used to trigger automatic fail and a second threshold to indicate marginal quality, and is then used in combination with other quality criteria. For example a failure may be triggered if two or more quality criteria are in marginal quality ranges. In some embodiments quality assessment failure results in terminating further analysis at just the sample locations. A counter may count the number of times sample locations are rejected, and if more than a threshold number are rejected then further analysis of the filter may be terminated and a failed quality assessment status reported. The threshold number may be a predetermined number of locations such as 10 or 20, or represent a percentage of all locations sampled (or planned to be sampled), such as 20% or 50% of all locations. In some embodiments quality assessment failure may result in terminating all further analysis of the filter, for example if it indicates whole filter (ie macroscale) quality problems.

The quality criteria may comprise a particle loading, a particle distribution, a pixel colour distribution, a brightness range, and/or an unusual image property or feature that indicates poor quality or proximity to a boundary, gridline or air bubble. Other indicators of poor quality may include the presence of one or more tears in the filter, a portion of the filter being outside of a coverslip, discolouration of the filter, a large percentage of the membrane covered by air bubbles, a high total dust loading over the filter, the presence of unusual objects of features such as spots, blobs, or scratches indicating possible contamination or damage to the filter, slide, or coverslip which may adversely affecting particle counting.

The quality criteria may be estimated from high power/high magnification images that reflect quality in the field of view or graticule level (ie where magnification where particle counting is performed. This will be referred to as field of view level quality assessment, but could also be referred to as graticule level or particle counting level. Additionally or alternatively quality criteria may be estimated from low power/low magnification (ie macroscopic scale) images indicating the overall filter level quality. As noted above an individual field of view may fail a quality assessment, in which case it may be discarded. Provided that enough high quality of high power field of view level (or graticule level) images are captured the slide can be analysed. However in some embodiments the slide as a whole may be rejected if too many individual high magnification field of views fail, or if low power images indicate that the filter as a whole is poor quality.

As shown in FIGS. 1B to 1D and 2A to 2G, the quality assessment may be performed in a several ways. In the embodiment shown in FIG. 1B, multiple images are captured across the sample portion of the filter 122. Some of the images are used to perform a filter quality assessment 132 and if the filter quality assessment is passed 134 then field of view (or graticule) level quality assessment 136 is performed at each of the sample locations for which computer vision counting is to be performed. If a field of view passes the FOV level quality assessment 138, then a computer vision method is used to identify and count the number of respirable particles within the FOV 142. The FOV level quality assessment may be is performed on high power (or high magnification) image suitable for performing particle counting on. The images used for the Filter level Quality Assessment 132 may be low power or low magnification images. If the Filter level Quality Assessment 132 is failed or if too many individual FOV fail quality assessments 136 the analysis of the filter/slide 135 may be terminated. In this case a report indicating the failure of the sample may be generated including reasons for the failure. Alternatively if Filter level Quality Assessment is passed 134 and sufficient FOV quality assessments are passed 138, then a report is generated 144 indicating either the total number of countable respirable particles counted in the countable region of the filter, or an estimate of the density of particles on the filter. The analysis of the slide is then ended 146 and a new slide is analysed.

FIG. 1C is another embodiment in which the quality assessment is performed in two parts. In the first part a low power (or low magnification) scan is performed comprising capturing a plurality of low power/magnification images 122 which are collectively analysed to assess the overall filter level quality. If this filter level quality assessment is passed, then the second part is performed which comprises collecting multiple high power (or high magnification) images 124 across the sample portion of the microscope slide. As previously FOV level quality assessment is performed on each of the high power images, which if passed is then passed to the computer vision counting method 142. In some embodiments the first part (low power scan and QA) is performed before the second part (high power scan and FOV QA). In other embodiments, as illustrated by dashed lines 125, the images may be collected in at the same time (ie in parallel). That is a low power image may be collected at a first sample location, then multiple high resolution images within the overall field of view of the low power image are collected before moving onto the sample location for the next low power image. This requires automated swapping of the objective lens between the low power and high power images.

In the embodiment illustrated in FIGS. 1B and 1C performing a filter level quality assessment comprises analysing a plurality of images captured in the first magnification range and performing a field of view level quality assessment at each sample location is performed on images captured in a second magnification range, which is larger than the first magnification range. In some embodiments the first range is between 10× and 200×, and the second magnification range is between 200× and 600× (where "×"=times). In some embodiments the quality criteria for filter level quality assessment comprises identifying one or more tears in the filter, detecting if a portion of the filter is outside of a coverslip, detecting discolouration of the filter, estimating a percentage of the membrane covered by air bubbles, estimating a dust loading, and/or detecting an image property that indicates poor quality or improper sample preparation. Estimating the one or more quality criteria for the field of view level quality assessment comprises identifying one or more tears in the filter, detecting if a portion of the filter is outside of a coverslip, detecting discolouration of the filter, estimating a percentage of the membrane covered by air bubbles, estimating a dust loading, and/or detecting an image property that indicates poor quality or improper sample preparation. In this embodiment, if the filter level quality assessment is failed then terminating further analysis comprises terminating further analysis of the filter and reporting a failed quality assessment status for the filter. If the field of view level quality assessment is failed, then terminating further analysis comprises terminating further analysis for this sample location and then moving to another sample location unless further analysis has been terminated at more than a threshold number of sample locations in which case no further locations are sampled and a failed quality assessment status is reported.

FIG. 1D is another embodiment in which a single set of high power images at multiple sample locations across the sample portion 122. These are all collected at single magnification range and then used to generate a pseudo filter level (ie pseudo macroscale) image 126 on which a filter level quality assessment is performed 132. This effectively replicates performing a low power scan. The magnification range is preferably in the range of 100× to 200× (where ×=times) total magnification. This is trade-off between sufficient resolution to identify images, and the total number of images that can need to be captured to enable both field of view level and filter level quality assessments to be performed. However as outlined below, other magnification ranges could be used (eg less than 100× or more than 200×).

As illustrated in FIGS. 1B to 1D, a preliminary step 110 may be performed including calibration of the system 112 and loading 114 of a microscope slide 402 into a robotic XY stage 12 of a digital phase contrast microscope 2. The microscope slide 402 supports a sample portion of a filter 406. As a point of clarity, the air quality monitor (or air sampler) comprises a removable filter which is typically treated and converted to form a transparent membrane (typically on a microscope slide, but another optically transparent support surface could be used) and we will refer to this transparent treated filter as a membrane filter. Such filters can be used to capture a range of particles such as asbestos fibres, synthetic-mineral-fibres (SMF), silica fibres, wool fibres and wooden fibres, pollens, mould spores etc. For example one example of a filter is a VersaTrap Spore Trap cassette which captures mould spores and other particles including asbestos particles with sizes ranging from 1.5 to 3.9 μm. A sample portion is then some portion of this fixed transparent membrane which is to be scanned. For example the sample membrane could be cut in half, with half mounted on the slide (the sample portion) and the other half saved in case an issue arises with the preparation and mounting, or to enable a follow-up analysis to be performed later.

A calibration step 112 may be periodically performed. This may be performed at the start of each day of operations, after some fixed amount of time such as every 6 or 12 hours or every week, or according to some other schedule such as every $1000^{th}$ slide analysed. Calibration may performed as per the current manual approach, with the exception that centering of the condenser is performed using the camera feed rather than by observing down the eye-piece. The calibration step may also comprise inserting a detection limit calibration slide in the robotic microscope. This comprises a series of bands that are either manually or automated using a calibration program that moves the slides to the known location of band and then capturing and analysing the image using a computer vision method to check the captured image matches the expected image. The calibration may also involve centring and aligning phase rings for phase contrast calibration. Again this could be a manual process, or it may be automated. In one embodiment centering is performed using a low magnification objective lens to perform the centring operation by drawing a virtual graticule ring that would otherwise be on the objective. The virtual ring would reflect the size of the ring on the objective (e.g. . . . 20× or 40×).

Typical air filters used in air sampling or monitoring apparatus are 25 mm diameter circular filters, however some air samplers uses smaller 13 mm diameter circular filters. Other samplers could use other geometries but this does not affect the method as described herein. The membrane filters 406 are mounted on a microscope slide as follows. The filter is placed on a microscope slide and a solvent such as acetone-triacetin added to dissolve or melt the filter to create a transparent membrane on the slide and then fixed to the microscope slide using a coverslip 404. The smaller 13 mm diameter circular filters can be directly placed on a microscope slide 402, however the 25 mm diameter circular filters must first be cut to form a sample portion. In many cases the filter is cut in half to form two half circles, one of which is placed on the microscope slide 402 and converted to a transparent membrane filter 406, and the other which is retained for storage. In some embodiments the sample portion is the complete portion of the membrane filter fixed on the microscope slide 402. In other embodiments, the sample portion may be a smaller portion on the membrane filter fixed on the microscope slide, such as a portion of a predefined size such as a central 10 mm square or 10 mm diameter circular portion to enable standardisation of results, or a minimum size (at least a 5 mm diameter circular portion) or some percentage of the total size of the membrane filter (75%, 50%, 25%).

As part of the sample preparation and mounting step 114, a template may be used to indicate where to place the membrane filter on the slide, along with the coverslip and/or gridlines if present. It is noted that embodiments of the methods described herein may be used on membrane filters with or without gridlines. By matching gridline position and orientation to the template (when present) it may be possible to plan scans to avoid gridlines or use the gridlines through the analysis process to ensure the correct focal plane is being analysed. As will be discussed below, the analysis method may identify gridlines within the image, as gridlines are often not perfect and can be significantly warped from the sample preparation step. In the case that a sample template is used it should allow for boundaries around the filter (ex. 2 mm on circumference and 3 mm from cut line (if sample is cut)).

The digital phase contrast microscope 2 further comprises an image sensor 16 configured to capture an image of the image plane 14 of the digital phase contrast microscope 2. The robotic XY stage 12 is a motorised stage that can support and position one or more microscope slides within the field of view of the optical assembly, or optical path of the microscope. In some embodiments the robotic XY stage 12 may also include a motorised Z axis drive 13 (e a robotic XYZ stage). For the sake of clarity XY will be used inclusively to specify at least robotic control of X and Y axes, and does not preclude control of the Z axis as well (i.e. XY=at least XY). The position is controlled by microscope controller module 26 which may execute on the computing apparatus 4. The microscope controller module 26 may be a distributed application. The robotic XY stage may be configured to support multiple slides. In this case each slide held by the XY stage is analysed in sequence. In some embodiments an autoloader 18 is used to store prepared microscope slides 402 and these are progressively loaded onto the robotic XY stage (for example via one or more microscope slide holders on the robotic XY stage, and the microscopes are scanned. In some embodiments a polariser stage could be added to allow polarised light microscopy (phase contrast) images to be captured, and fibre identification performed on the polarised light microscopy (PLM) images.

The magnification of the microscope is a combination of the magnification of the image sensor/camera lens and the objective lens. Unless otherwise stated, or where the context clearly indicates otherwise, the magnifications ranges referred to in the specification and claims will be total magnifications (ie combined image sensor/camera lens and objective lens). For example the camera lens may have between 2× and 10× magnification, and the microscope has one or more objective lens which provide between 2× and 60× magnification, giving a total magnification range of 4× to 600×. The digital phase contrast microscope may also comprise a robotically controlled nosepiece, which is configured to switch in (and out) objective lenses of different magnifications. For example if the camera lens was 10× then the objective lens stage may comprise a low power objective lens with a magnification range of 2×-10× to capture low power images for quality assessment with total magnifications in a range from 20× to 100×, and a high power objective lens with a magnification of 20× to 60× for capturing high magnification (or high power) images for counting of particles with a total magnification range of 200 to 600 times.

Typically high magnification images are collected to assist the computer vision method in identifying particles. At magnifications up to around 200×, the depth of field is sufficient to capture all particles and beyond 200× multiple images at different focal planes (Z heights) may be required to capture all particles. The field of view decreases with increased magnification. The advantage of lower resolutions is their increased field of view, allowing sampling of a larger area of the filter. At total magnifications of 100× or more particles are generally detectable with common image sensors. At magnifications below 100× the ability of computer vision methods to reliably identify particles is to some extent affected by the image sensor resolution and optics. In particular if high resolution images sensors are used (ie high pixel densities), then lower magnification images can be used (ie are still of sufficient quality to allow reliable particle detection). That is the high resolution image sensor may compensate for a lower total magnification. One embodiment where this is particularly suitable is the embodiment shown in FIG. 1D, where a pseudo filter level image is generated from individual images. In this case a high resolution image sensor may be used with images captured with a total magnifications in the range of 40× to 100×.

The image capture stage 120 further comprises capturing at least one image at each of a plurality of sample locations across the sample portion of the filter. These may tile the sample portion, or a tile region of the sample portion, or sample the sample portion such that the total area exceeds a threshold amount. This threshold amount may be a fixed value (eg 25 mm$^2$) or fixed percentage, such as 20% or 50% of the total area. The amount should be large enough such that results from the sampled regions are sufficient to give confidence on the overall quality of the slide (and do not represent a localised result). The sampling may be planned or regular, such as using a grid, or randomly sampled. The robotic XY stage is configured to move the microscope slide so as to position a sample location in the field of view of the microscope (ie under the optical path). A sample location is selected, for example by the microscope controller module 26, and the robotic XY stage is instructed to move the microscope slide to locate the selected sample location under the optical assembly (or path) of the microscope. One or more images is then captured. At least one of these captured images is a magnified phase contrast image. In some embodiments all of the captured images are phase contrast images. In some embodiments the one or more images may also comprise a dark image taken against a dark background and a light image taken against a light image, or an image taken against a grey or coloured background. Other images such as PLM images could also be captured. The move/capture procedure is repeated until a sufficient number of sample locations across the sample portion of the microscope slide have been collected. As outlined above (with reference to FIGS. 1A to 1D) these images may then be analysed separately, in groups, or digitally stitched together to form a composite pseudo filter level image. The composite image may be formed using the known location of the slide from the microscope controller module 26 and the known magnification, and/or by using image processing to identify overlapping pixels between adjacent images. In some embodiments the plurality of images could be captured as a video stream, and extracted as frames from the video stream.

Figure 2A:
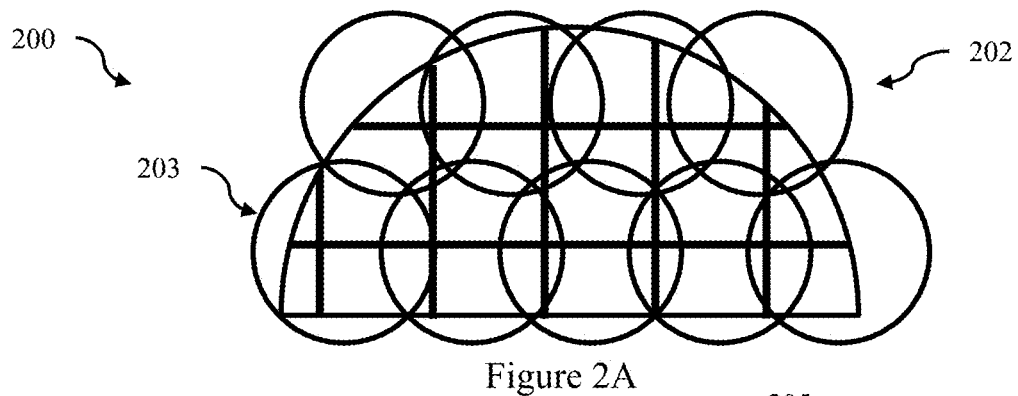
FIG. 2A is a schematic diagram of the field of view of a set of images that tile a sample portion of a filter for performing a low power quality assessment according to an embodiment.
Figure 2B:
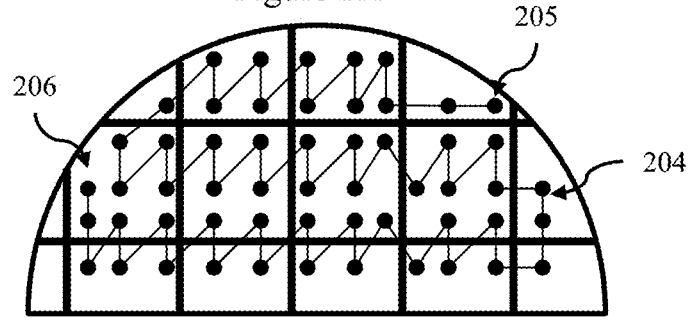
FIG. 2B is a schematic diagram of the sample locations a set of images for performing field of view level quality assessment and counting of respirable particles based on the low power quality assessment of FIG. 2B according to an embodiment.
Figure 2C:
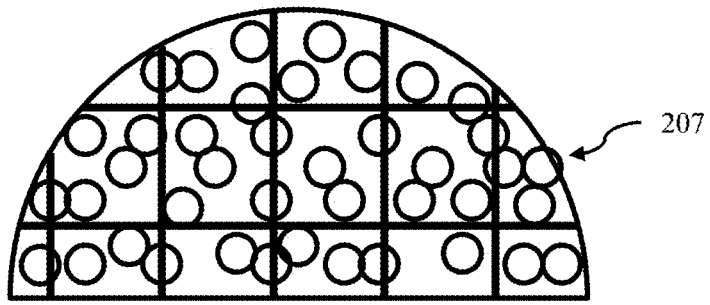
FIG. 2C is a schematic diagram of the field of view of a set of images taken at random sample locations across a sample portion of a filter for performing a low power quality assessment according to an embodiment.
Figure 2D:
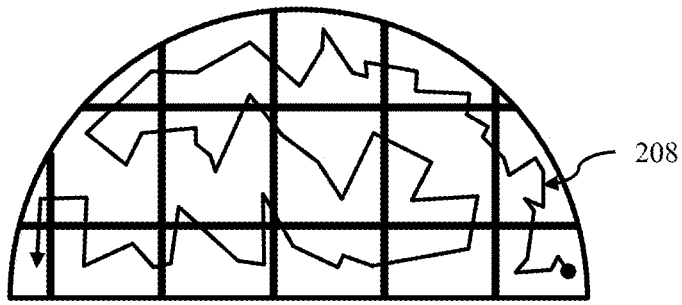
FIG. 2D is a schematic diagram of a scanning path for collecting a set of images for performing field of view level quality assessment and counting of respirable particles based on the low power quality assessment of FIG. 2C according to an embodiment.
Figure 3:
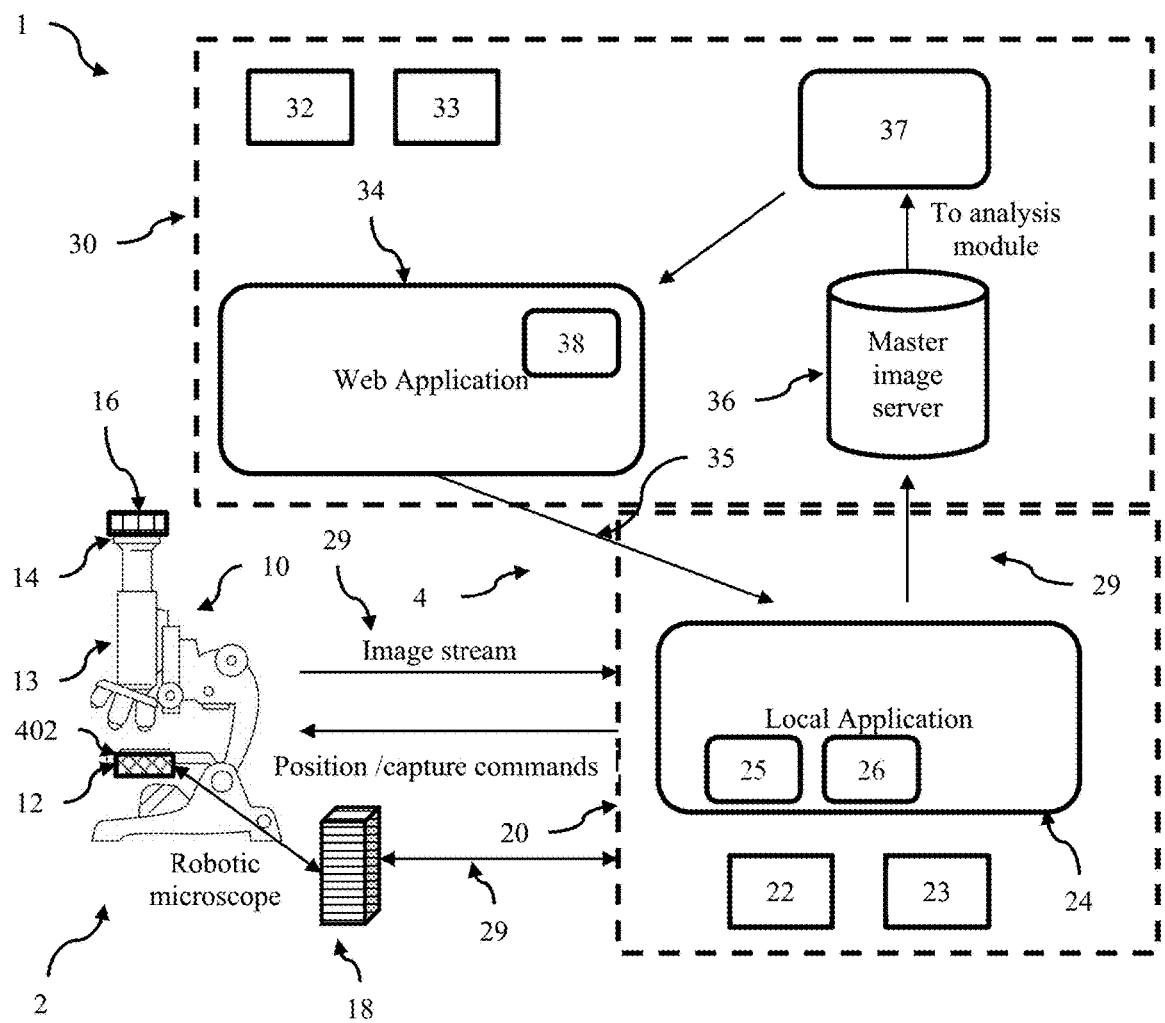
FIG. 3 is a schematic diagram of a system for automated analysis of a filter obtained from an air quality monitoring apparatus used for sampling airborne respirable particles according to an embodiment.

FIGS. 2A to 2D illustrate the sample locations and path of image collection. These illustrate possible collection paths of the embodiment shown in FIG. 1C, in which collection of images is split into two parts. The low power images are collected and a quality assessment is performed. Further the low power images are then used to plan the sample locations for collecting the high power images. FIG. 2A is a schematic diagram 200 of the field of view of a set of low power (low magnification) images 202 that tile 203 a sample portion of a filter for performing a filter (ie low power) quality assessment according to an embodiment. FIG. 2B is a schematic diagram of the sample locations of a set of high power images 204 for performing field of view level quality assessment and counting of respirable particles based on the low power quality assessment of FIG. 2B according to an embodiment. The collection path starts at first sample location 205 and ends at the last sample location 206. FIG. 2C is a schematic diagram of the field of view of a set of images taken at random sample locations across a sample portion of a filter for performing a low power quality assessment according to an embodiment. These random locations 207 sample approximately 50% of the total sample portion. FIG. 2D is a schematic diagram of a scanning path 208 for collecting a set of images for performing field of view level quality assessment and counting of respirable particles based on the low power quality assessment of FIG. 2C according to an embodiment. As previously the lower power images are used to plan the sample locations for collecting the high power images.

Figure 2E:
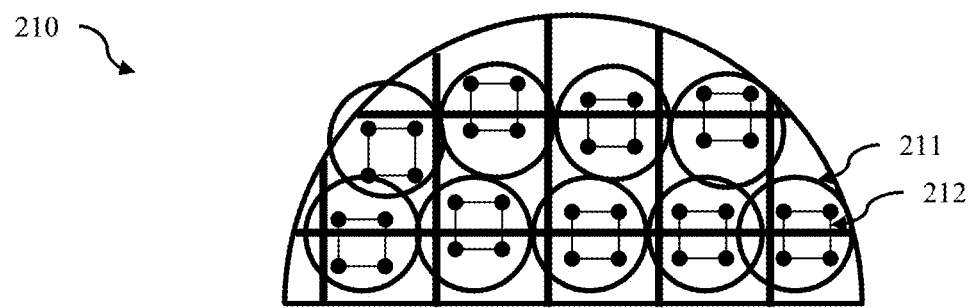
FIG. 2E is a schematic diagram of the field of view of a set of images taken at a set of sample locations across a sample portion of a filter for performing a low power quality assessment according to an embodiment, along with a plurality of sample locations within each field of view used for counting the number of respirable particles in a sample portion of a filter according to an embodiment.

FIG. 2E illustrates a method for collecting both low power and high power images at the same time, for example for performing the method in FIG. 1C (via dashed line 125). FIG. 2E is a schematic diagram of the field of view of a set of low power images 211 taken at a set of sample locations across a sample portion of a filter for performing a low power quality assessment. Several high power images 212 are also captured at several sample locations 212 within each low power field of view 211.

Figure 2F:
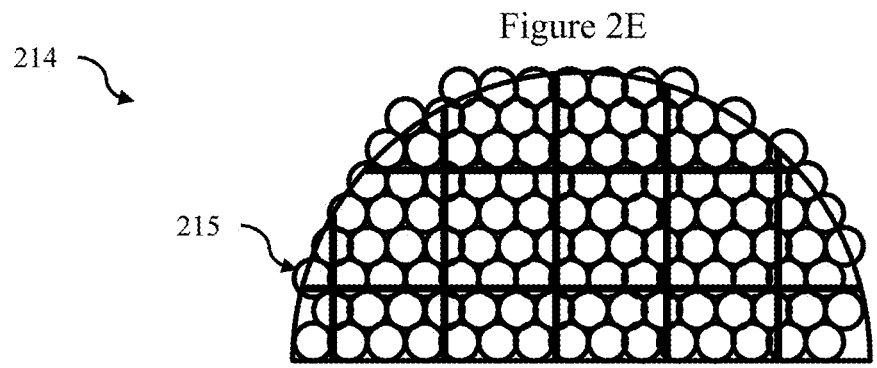
FIG. 2F is a schematic diagram of the field of view of a set of images that tile a sample portion of a filter according to an embodiment.
Figure 2G:
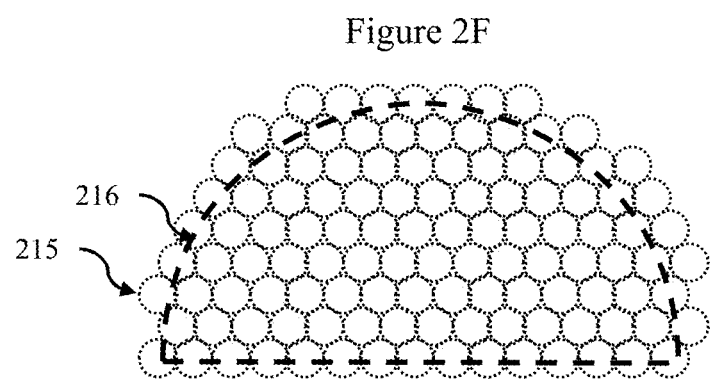
FIG. 2G is a schematic diagram of a pseudo-macroscopic image for performing a low power quality assessment generated from the set of images shown in FIG. 2F according to an embodiment.

FIGS. 2F and 2G illustrate the method illustrated in FIG. 1D in which a pseudo Filter level image is generated. As shown in FIG. 2F a set of images 215 that tile a sample portion of a filter are collected. As shown in FIG. 2G is a pseudo-filter level (or pseudo macroscopic) image is generated by combining the individual images and is used for performing a low power quality assessment. In this embodiment where the set of images tile the sample portion the magnification range is preferably in the range of 20× to 40×. Whilst higher magnification may be used this will increase the time taken to tile the sample portion (reducing the overall efficiency of the automation). However in other embodiments the set of images 215 need not tile the whole sample portion, just multiple regions to replicate a sampling based approach for example as illustrated in FIG. 2C or 2E. That is several pseudo Filter level images may be generated or the pseudo Filter level image may comprise non-contiguous portions.

Figure 2H:
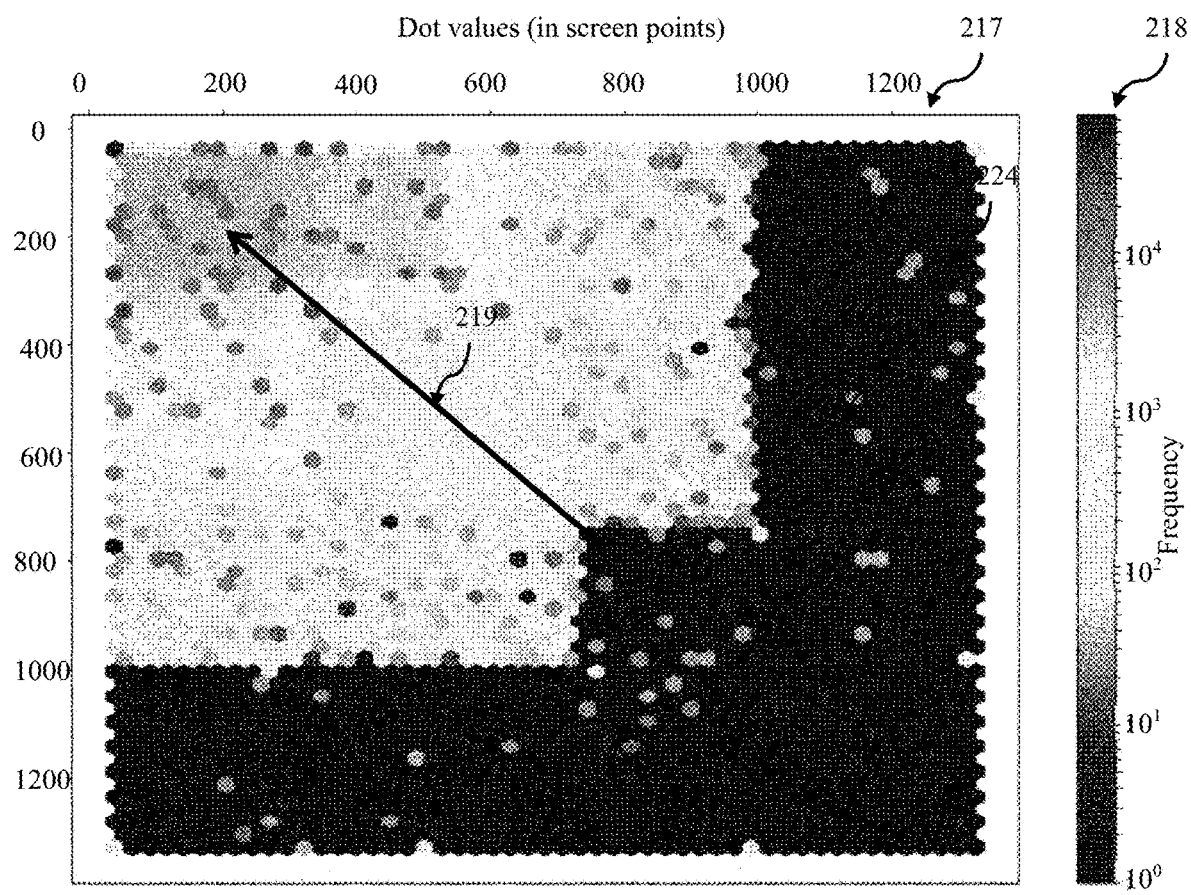
FIG. 2H is a plot of the particle distribution across a sample portion according to an embodiment.

FIG. 2H is a plot of the particle distribution across a sample portion illustrating a filter level quality assessment according to an embodiment. In this embodiment the sample portion is rectangular area 217 and the plot shows the density of particles using the legend 218. As illustrated by line 219 the density increases approximately 1000 times from the bottom right to the upper left.

In some embodiments the method may further comprise determining a target focal plane. This is the focal plane at which particles are expected to be observable, and can be used as a starting plane to collect one or more images in the Z direction. This may be performed at a single sample location and then used for all other sample location on the same slide. Alternatively it may be used to predict the target focal plane for nearby sample points. In one embodiment the method is be performed at multiple locations across the slide to build up a map of the target focal planes, prior to capturing the high resolution images. This method can be used on filters with or without grid lines. In the case of grid lines the procedure is generally faster.

In one embodiment the method comprises capturing an image at a magnification of between 4× and 200× and then using a computer vision method to identify one or more gridlines in the captured image. The robotic XY stage moves the slide so that an identified gridline is in the centre of the field of view. The objective lens of the digital phase contrast microscope is then switched to a higher magnification objective lens. The Z height of the digital phase contrast microscope is then adjusted until the gridline is in focus. This Z height is then stored as a point in the target focal plane, and is then used to determine the focal plane for capturing one or more images at one or more other sample locations.

Figure 2I:
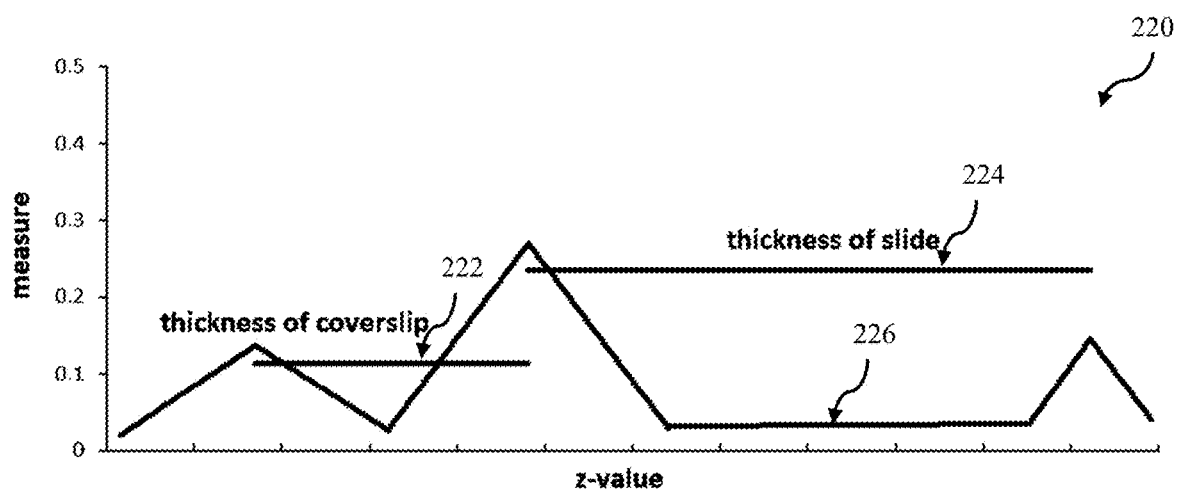
FIG. 2I is a plot of a measured optical parameter vs Z height to determine a target focal plane containing particles according to an embodiment.

In the case where there are no gridlines the method comprises capturing a series of images at a magnification of between 4× and 20× at a sample location, wherein the series of image are each taken at a different Z height. The series of images are analysed to determine one or more of a coverslip boundary or an upper slide boundary, or a lower slide boundary. This is illustrated in FIG. 2I which is a plot of a measured optical parameter vs Z height which is used to determine a point in the target focal plane containing particles according to an embodiment. The measure optical parameter may be a brightness or an intensity estimate (pixel values) whose values will change as they cross a boundary due to reflection effects. The images are analysed to determine the image with the sharpest focus that is estimated to be within upper slide boundary and the lower slide boundary as the target focal plane. The Z height of this sharpest image is then stored and used as a point in the target focal plane to determine the focal plane for capturing one or more images at one or more other sample locations.

The above methods can be used to generate a predictive focal plane map of the sample portion of the filter by picking a plurality of sample locations distributed across the sample portion and estimating a target focal plane at each of the sample locations.

In some embodiments light and dark images may be taken at a lower magnification than the phase contrast images to capture a larger field of view. These light and dark images may tile the sample portion or sample the sample portion, but may be taken less frequently. In some embodiments several low power/macroscale images may be taken, each of a portion (eg 25%) and then stitched together to make a single pseudo macroscale image.

Tiling of the sample portion may be performed in sequential manner for example by defining a 2D mapping grid over at least the sample portion. Defining a 2D mapping grid based on the slide coordinates allows valid sample locations and excluded regions to be identified so that the analysis is limited to high quality portions of the membrane filer. In some embodiments the 2D mapping grid may be defined over the entire microscope slide, based on known dimensions of the microscope slide. The dimensions of the grid may be based on a field of view associated with a magnification setting of the digital phase contrast microscope, for example so that a grid cell is wholly within the field of view, and the grid points then define the plurality of sample locations. The 2D mapping grid and grid points can define the centre of the cell so that the sample location is centred on the grid point or alternatively the grid points might correspond to vertex of the cells (eg lower right vertex). The cell size then defines the increments for the robotic XY stage to move the slide. For example the slide could be sequentially scanned in a row by column format in which the slide is incrementally moved across by a cell width (X) after each scan and then down (Y) a cell width at the end of the row. Successive images may have overlapping portions and can then be digitally stitched together based on a knowledge of the microscope slide and dimensions, as well as the field of view or magnification of the microscope. In other embodiments the tiling could be performed randomly, by selecting random points until the sample portion was covered. A 2D mapping grid could also be used to determine sampling locations so that sufficient images are collected so that the total area exceeds a threshold amount. For example every nth grid point could be sampled.

Figure 4A:
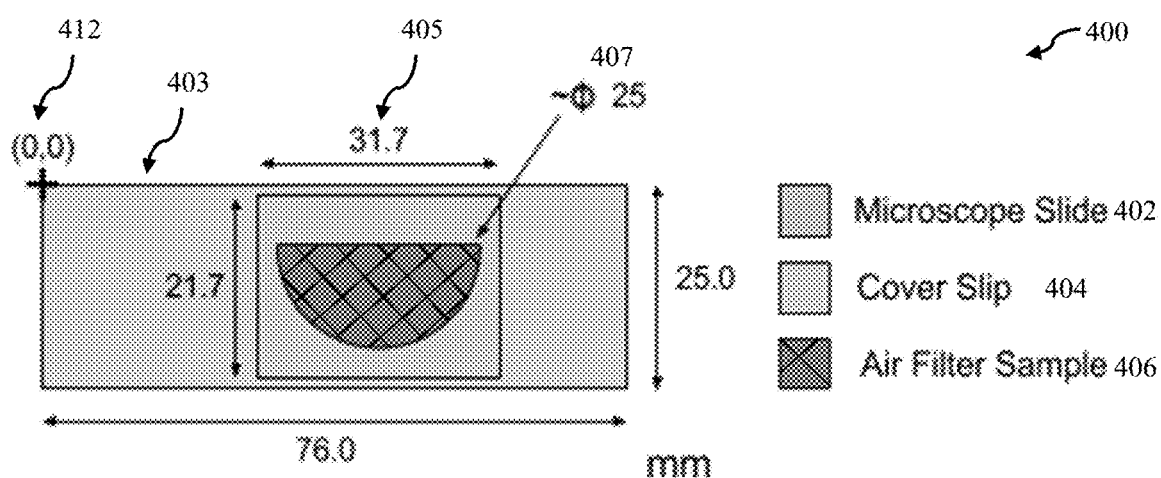
FIG. 4A is a schematic diagram of a microscope slide, coverslip and filter sample showing dimensions according to an embodiment.

FIG. 4A is a schematic diagram 400 of a microscope slide 402, coverslip 404 and a sample portion of a membrane filter 406 according to an embodiment. The slide has edges (or boundaries) 403 of known dimensions and FIG. 4A shows the known (or measured) dimensions of the slide 403, cover slip 405 and sample portion 407 according on one embodiment. FIG. 4B is a schematic diagram of a 2D grid 410 mapped to the microscope slide of FIG. 4A. In this embodiment the microscope slide is progressively scanned on a row by row basis 411 starting from the grid origin (0, 0) 412 which is located in the top left corner of the microscope slide. As can been seen in FIG. 4B the grid 410 is a rectangular grid with fixed row and column spacing which defines an array of grid cells (ie fixed separation distance between grid vertices, or fixed grid dimensions). Each grid cell can be characterised by the objects within the grid cell. For example grid cell (6, 2) comprises the microscope slide 414, grid cell (15, 1) comprises the microscope slide and cover slip 416, and grid cell (18, 3) comprises the microscope slide, cover slip and membrane filter sample 418. In one embodiment knowledge of the slide dimensions 403 and microscope optical properties (eg field of view, magnification) are used to define (or determine) the mapping grid 410 and the real world slide coordinates used for instructing the robotic XY stage during scanning and capturing of images. In another embodiment the microscope slide holder comprises at least two reference points that defines a rectangular scanning area within which a (mounted) microscope slide is contained. The robotic XY stage is then instructed to progressively scan and capture images within this scan area, and image recognition performed on the captured images to identify microscope slide, cover slip and air filter sample portion. Known slide dimensions can be used to assist in this process, or the image recognition may be performed in the absence of this information. The scanned images may be digitally combined to form a composite image to identify large scale (membrane level) features such as a microscope slide, cover slip and air filter sample portion. Alternatively the individual images are separately analysed to identify such features.

The grid dimensions (eg row/column spacing, of cell dimensions) may be based on the capabilities of the robotic XY stage (eg size of increments) and/or it may be matched to the field of view at a specific magnification at which the magnified phase contrast images are taken (e.g. 600 times). In some embodiments the successive (or adjacent) rows are offset so the columns form an approximately zig zag, staggered, notched (rotated crenelated) path. In other embodiments the mapping grid may be rectangular cells, hexagonal cells (eg with offset rows) or other regular shape cells that allow tiling of at least the sample portion. In some embodiments the dimensions of the grid cell are larger than the field of view at which an image is captured so the grid cell contains the sample image, and in other embodiments the field of view is larger than the grid size to the grid cell is wholly contained within a sample image. In this case the portions of the image outside of the grid cell may be discarded, and/or used to align adjacent cells.

In some embodiments the grid dimensions (cell size) are defined based on the field of view used to capture high magnification phase contrast images, and the scanning process is further configured to periodically capture additional low magnification (eg light and dark) quality assessment images. Knowledge of the relative field of views of the high magnification and low magnification images can be used to determine how often to capture low magnification images. Effectively two 2D grids are mapped over the microscope slide—a first high resolution grid for capturing high magnification phase contrast sample images over the sample portion 406, and a second low resolution grid for capturing low magnification quality assessment images (eg light and dark images) over at least the sample portion 406 (and in some embodiments the entire microscope slide 403.

In some embodiments the scanning stage comprises a mapping step which is performed to define the 2D grid used for capturing the high magnification images to tile the sample portion. In these embodiments a set of mapping images are captured across the slide to identify at least the location of the sample portion 406 (eg edges 407). In some embodiments the locations of the cover slip 404 (edges 405) and/or location of the slide 402 (edges 403) may also be identified as part of this mapping step. The locations used to capture the mapping images may be based on expected slide dimensions such as nominal slide dimensions, or learnt slide dimensions. For example the system could utilise a learning algorithm which initially captures random (or semi-random) locations across a slide and as multiple slides are captured and analysed the system learns a set of expected slide dimensions (eg using a classifier or other machine learning method). The captured mapping images can be high magnification phase contrast images or low magnification quality assessment (eg light/dark) images, and the images are analysed (using computer vision techniques to determine whether they contain just the microscope slide, just microscope and cover slip, or microscope slide, cover slip and sample portion (ie are in the sample portion). Once the locations (ie edges or dimensions) of at least the sample portion are determined, a 2D mapping grid 410 is defined and high magnification scanning is then be performed across the entire sample portion. This scanning may skip grid cells previously captured during the earlier mapping step used to determine the location/edges of the sample portion (ie mapping images may form part of the capture plurality of images that tile the sample portion).

Once the images are captured, a quality assessment stage 120 is performed. In one embodiment this comprises analysing the plurality of images using a computer vision method to determine a countable region of the filter (sample portion) and one or more excluded regions within the countable region of the filter (sample portion). These excluded regions comprise one or more filter grid lines, air bubbles and large particulate matter, and represent regions which must be ignored when counting respirable particles such as asbestos fibres. The countable region may be a single region containing excluded portions, or it may be formed of multiple distinct portions distributed over the slide. For example the excluded regions may effectively break up an otherwise contiguous portion into multiple unconnected portions. We will consider all these multiple unconnected portions to be part of the same countable region (containing one or more excluded regions).

This is further illustrated in FIGS. 5A, 5B and 5C. FIG. 5A is a schematic diagram 500 of a filter illustrating the filter edge 502, gridlines 504 and particulate matter which form excluded regions according to an embodiment. In this embodiment the excluded regions comprise regions around gridlines 512, air bubbles 514 and large particulate matter 516 such as dirt. The locations (e.g. grid coordinates) of the excluded regions are saved.

The field of view will typically be circular (or almost or mostly circular) and thus in some embodiments the field of view of the captured images has a diameter (or dimension) larger than the grid cells dimension so that the grid cells is wholly within the field of view. In this embodiment adjacent images will share overlapping portions, and a composite image can be formed by digitally stitching together an image along the grid cell borders. FIG. 5B shows a close up partial grid region 510 of FIG. 5A illustrating excluded regions and sample locations according to this embodiment. In this embodiment illustrates a first row of sample locations 520 starting at region i to region i+7, and a second row of sample locations 522 starting at region j to region j+7. In this embodiment the sample locations are circles having constant spacing along the row and the rows 520 and 522 are offset, but in other embodiments they may be aligned, or non constant spacing may be used. Each sample location represents a field of view of the microscope at a predefined magnification and are centred on a grid point.

In region 510 there is an air bubble 514 and a large dirt particle 516, along with grid edges 512. Thus valid sample locations are points i, i−3, i+4, i+6, j, j+1, j−2, j−3, and j+4. Sample locations i|1, and i|2 are invalid (rejected) due to the presence of excluded region of air bubble 514 in their field of view, sample locations i−5, and j−5 and j+6 are invalid due to the presence of excluded region of dirt particle 516 in their field of view, and candidate sample points i−7, and j−7 are invalid due to the proximity to grid lines—that is they include the excluded region 512 surrounding grid lines in their field of view. Each of these excluded field of views are represented in FIG. 5B with a diagonally struck through circle (ie "No" symbol).

In other embodiments, the dimensions of the grid cell may be greater than the field of view so the field of view is centred on the centre of the grid, and wholly contained within the grid. FIG. 5C shows a close up partial grid region 510 of FIG. 5A illustrating excluded regions and sample locations according to this embodiment. In this embodiment the a first row of grid cells 520 comprises cells i to i+7, and the second row of cells 522 comprises cells j to j+7 aligned with the first row of grid cells 520. Each cell comprises a sample location with a circular field of view wholly contained within the grid cell centred on centre of the cell (or grid point). As in the previous example valid sample locations are points i, i−3, i+4, i+6, j, j+1, j+2, j−3, and j+4 and the other sample locations are invalid as they contain excluded regions.

The analysis to identify the countable region and excluded regions may be performed on images at each sample location, or the images from multiple sample locations may be digitally combined to create a composite image which is analysed. For example images from rows i to i+7 and j to j+7 are combined into a single composite image. As outlined below, in some embodiments a separate pseudo filter level (macroscale) image is generated from high power scans and analysed. In other embodiments a set of low power scans across the filter are used to perform a filter level analysis. In one embodiment a first analysis step 122 maps or identifies the locations (or boundaries) of gridlines, air bubbles and large particulate matter to determine excluded regions. The excluded region may be based on detecting a feature (eg grid line) and applying a margin of error around the detected feature so the excluded region encompasses the detected feature. For example the margin of error may be N pixels around the edge (eg 2, 5 or 10 pixels), or based on a confidence measure of where the edge ends (for example 90% or 99% confidence a pixel is not in an excluded region). A second analysis may comprise performing a quality assessment 124 of the sample portion of the filter against a set of predefined sample quality criteria.

Quality criteria may include dust loading, which is calculated by simply filtering all particles from the background for all field of views and calculating an average intensity. If the average is too high (e.g. more than 15% dust) the filter is too cluttered and results considered invalid (ie reject this sample). Other quality measures may include analysing the particle loading/distribution to detect uneven particle loading/distribution that indicate an under-performing sampling device, or unusual image properties that may indicate poor quality (e.g. brightness range, colour range, etc). For example, discoloration of the membrane can indicate oversaturation of acetone during sample preparation, and thus an analysis of the pixel colour distribution could be performed to detect discoloration such as by determining the number of pixels (or a percentage) within a certain predetermined discolouration colour range. In an embodiment where a graticule is used, a criteria such as more than one-eighth (12.5%) of a graticule area covered by an agglomerations of fibres and/or particles could be used. Other area based thresholds could be used such as at least 10%, 15% or 20% coverage of the counting region. Other criteria include identifying one or more tears in the filter, detection of a portion of the filter outside of a coverslip or the percentage of the membrane covered by air bubbles exceeding a predetermined threshold value. For example a threshold percentage of 25% or 50% bubble and/or particulate coverage percentage (of usable filter area) could be used. These criteria can be assessed using image analysis for example to detect tear like structures, or a histogram of pixel colours, or by classifying and then counting contaminated cells using the 2D grid.

In some embodiments several quality criteria may be defined (and estimated) and the sample may be required to pass at least n of N quality criteria, or estimates of several quality criteria may be combined to obtain a quality score which must pass a quality score criteria (either exceed or remain below). The combination of estimates may use weighted estimates to place greater emphasis on specific criteria. Additionally quality criteria may be obtained for each sample location and the results from analysing the individual sample locations may be aggregated (or combined) to assess an overall slide quality. If the sample fails the quality assessment 126 then the analysis is terminated 128 and the next slide is analysed.

In one embodiment, to assist in identifying slide features and regions to be excluded at least one sample quality image is captured either at each sample location, at some sample locations, at other quality assessment locations. These may be captured at a lower magnification than images for counting respirable particles (ie with a larger field of view) in order to identify larger scale or macroscopic quality features. In some embodiments the sample quality image may be a pseudo macroscopic scale image of the entire sample obtained by combining multiple images taken across the surface of the filter. In some embodiment this pseudo macroscopic scale image is obtained by combining multiple low power images. These low power images may tile a portion of the surface of the filter, or may be sampled across the surface of the membrane field and have a total area in excess of a threshold amount such as at least 20%, 50%, 75% or 95% of a sample portion of the filter. The sample locations may be planned or regularly spaced over the surface, or may be randomly sampled over the surface. In other embodiments the pseudo macroscopic scale image is obtained by combining many high power Field Of View images. As the magnification increases the number of high power FOV images required to generate a pseudo filter level (macroscale) image substantially increases slowing the rate of capture and processing of a slide. In one embodiment at least one dark image of the slide against the dark background is captured and at least one light image of the slide against a light background is captured. This light and dark analysis may be performed separately on images from individual sample locations, or more preferably these may be combined to form a composite image, either of the entire slide or of a local region around a sample location to enable more reliable identification of features that are larger than the field of view of a sample location. In other embodiments at least one image is captured against a coloured background or a grey background. In some embodiments one or more wavelength filters are used (these may be robotically inserted into and out of the optical path) to capture additional images for quality assessment at a sample location. In some embodiments two image sensors are used, each with sensitivity to a different wavelength range. For example bubbles are visible in IR or near IR images, and thus a quality assessment image could be captured with an IR (or near IR) image sensor, and the (phase contrast) images used to count respirable particles captured with a camera with sensitivity over the visible range. In some embodiments a polariser is inserted into the optical path and one or more polarised images are captured. These may be captured at a range of orientations (the insertion and orientation of the polariser may be robotically controlled).

In one embodiment analysing the images at step 122 using a computer vision method comprises analysing the light image to identify a plurality of reference points on the slide, an edge of the filter and a plurality of gridlines located on the filter within the countable area using the 2D mapping grid and then analysing the dark image to identify the locations of air bubbles within the countable area using the 2D mapping grid. In other embodiments this analysis may be performed on a single image, for example captured against a grey or coloured background, or using polarised images (each with a different polarisation angle). The methods below may be performed separately on low power images, or multiple low power images may be stitched together to form composite image which is analysed.

Figure 6A:
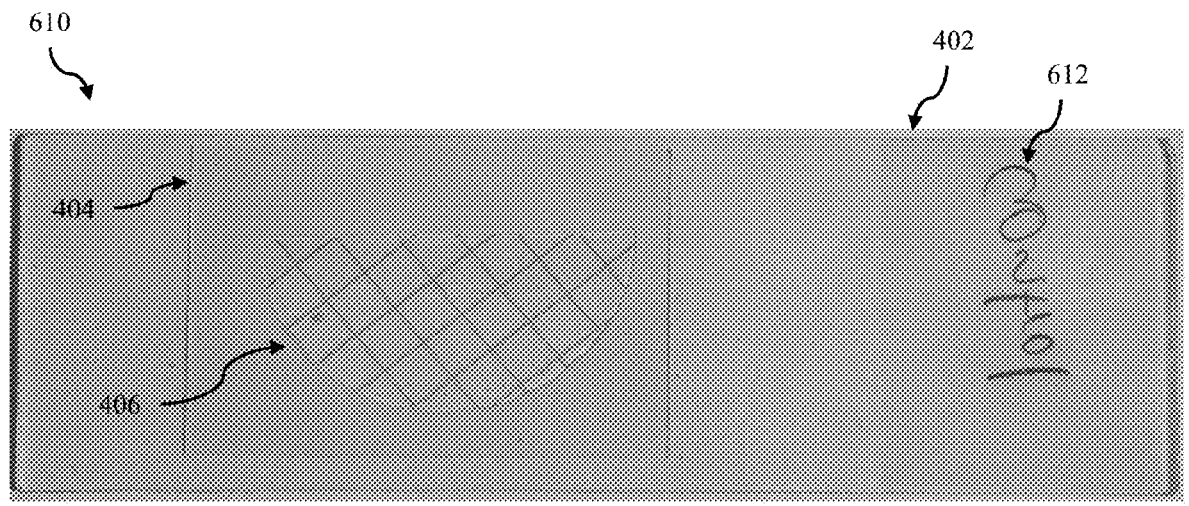
FIG. 6A is a macroscale image of microscope slide with a sample portion of a membrane filter supported and fixed to the microscope slide taken against a light background according to an embodiment.
Figure 6B:
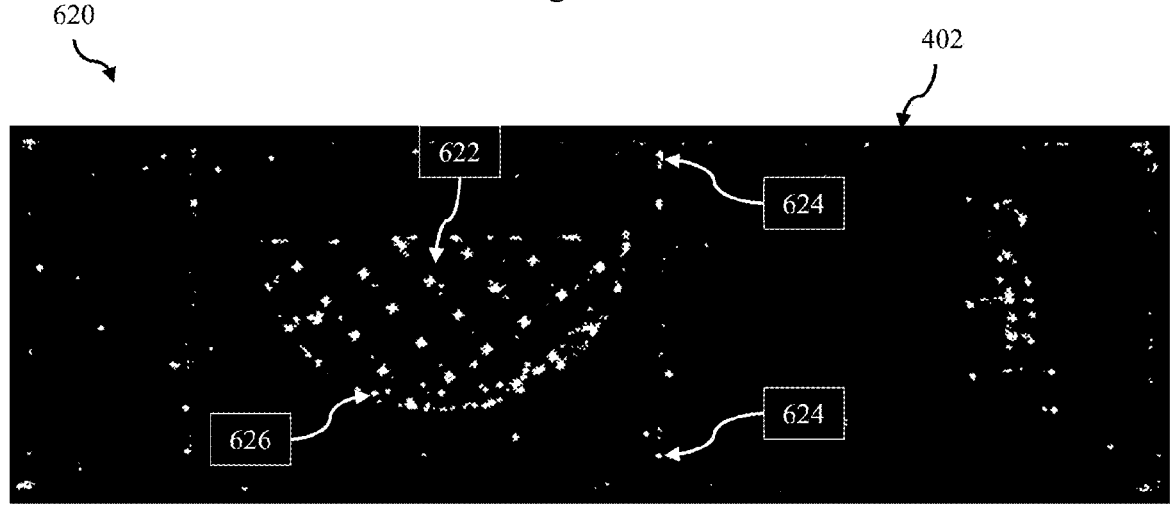
FIG. 6B is the image of FIG. 6A after applying a feature detection algorithm.
Figure 6C:
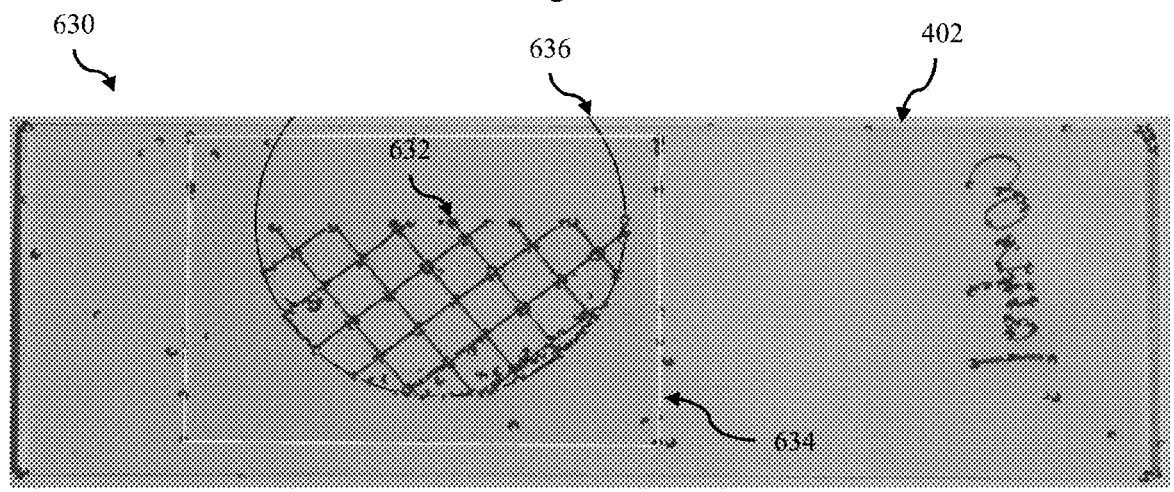
FIG. 6C is the image of FIG. 6A after matching geometric shapes using a feature detection algorithm to identify the slide, coverslip, membrane filter and gridlines according to an embodiment.

As illustrated in FIGS. 6A to 6C analysing the light image comprises applying a feature detection algorithm to the at least one light image to detect features of the slide, coverslip, filter and intersections of grid line. The feature detection algorithm encompasses corner detection, edge detection, line detection etc. which are available in suitable image processing libraries. For example OpenCV, the Open Source Computer vision library available at http://opencv.org includes a set of suitable feature detection algorithms under the feature detection section of the "imageproc" image processing library of OpenCV. FIG. 6A is a macroscale image 610 of microscope slide 402 with a sample portion of a filter such as a membrane filter 406 supported and fixed to the microscope slide taken against a light background. The coverslip 404 can also be seen along with gridlines on the membrane filter. A bar code may also be present on the slide and scanned, or a slide identifier 612 (eg alphanumeric string) may be printed or written on the slide and then passed through an optical character recognition (OCR) program to detect the slide identifier. FIG. 6B is the image of FIG. 6A after applying a feature detection algorithm. The feature detection algorithm detects corners of the slide, coverslip 624, membrane filter edge 626 and intersections of grid line 622. As shown in FIG. 6C, the detected corners and known slide dimensions are used to anchor geometrical shapes to identify the edges of the coverslip 634, membrane filter 636 and intersections of grid line 632 in the image 630. A tetragon shape is used for the coverslip 634, an oval (or circular arc) for the membrane filter 636, and intersecting straight lines for the grid lines 636.

Figure 7A:
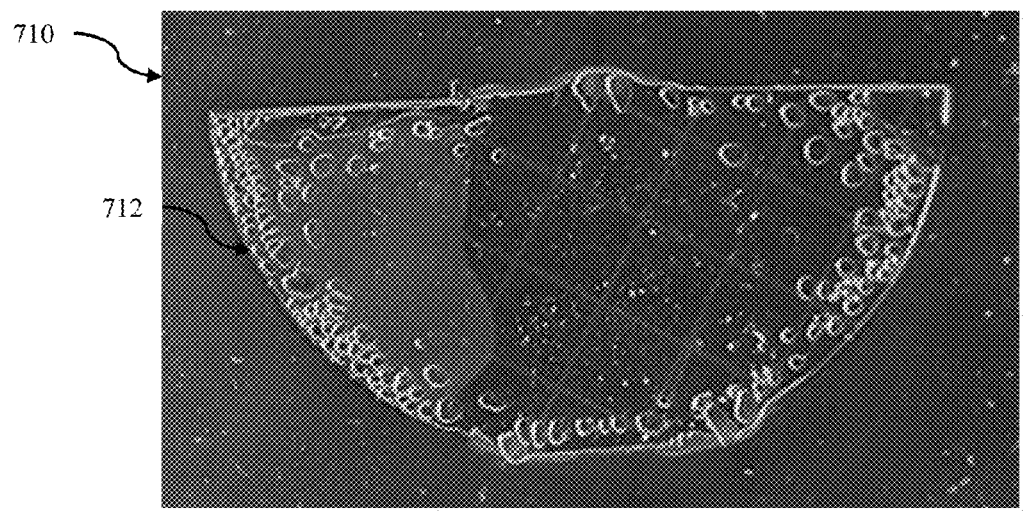
FIG. 7A is a macroscale image of microscope slide with a sample portion of a membrane filter supported and fixed to the microscope slide taken against a dark background cropped to the region around the membrane filter identified in FIG. 6C according to an embodiment.
Figure 7B:
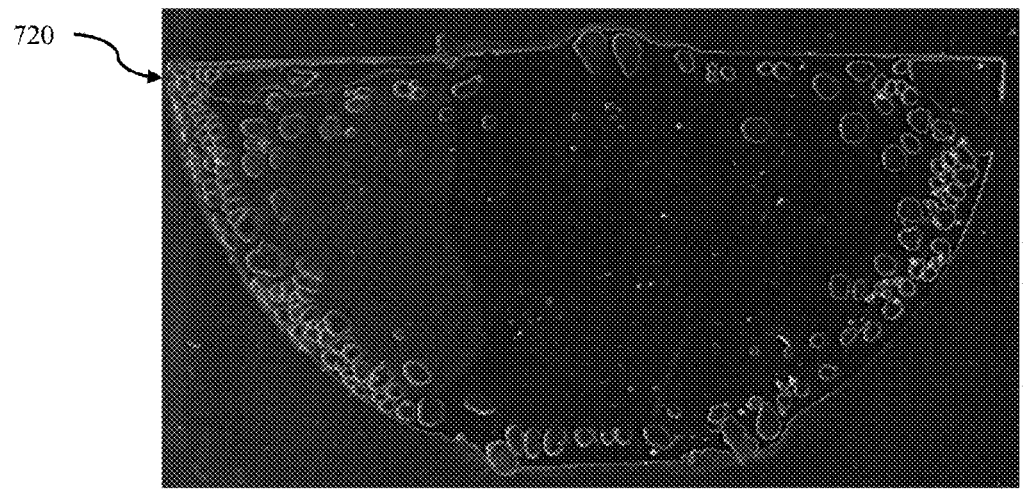
FIG. 7B is the image of FIG. 7A after converting to black and white and applying a contrast adjustment.
Figure 7C:
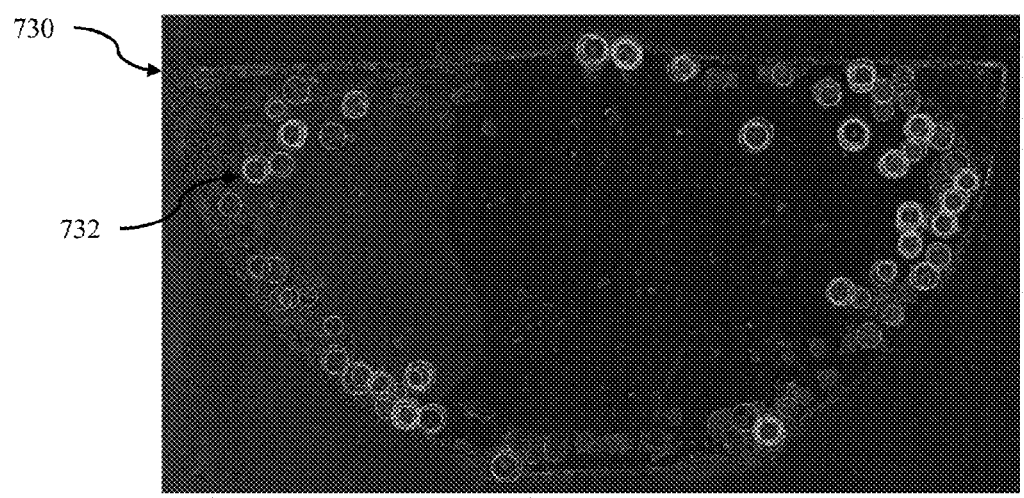
FIG. 7C is the image of FIG. 7B after fitting contours to identify air bubbles according to an embodiment.

After analysis of the light image (or images), the dark image can be analysed to identify air bubbles. FIGS. 7A to 7C illustrate such an analysis according to an embodiment. Analysing the dark image comprises cropping the dark image around the location of the membrane filter. The cropped region may correspond to the coverslip 404 or be a different region. FIG. 7A is a macroscale image 710 of microscope slide 402 with a sample portion of a membrane filter 406 supported and fixed to the microscope slide taken against a dark background cropped to the region around the membrane filter identified in FIG. 6C according to an embodiment. In this dark image 710 air bubbles 712 which become trapped during the fixing/adhering of the membrane filter to the slide are visible. A contrast adjustment is applied to the cropped image to improve the accuracy of bubble detection. To further assist the accuracy the image may be first converted to a black and white image (or grey scale image). FIG. 7B is the image 720 of FIG. 7A after converting to black and white and applying a contrast adjustment. A large air bubble can be seen in the left hand side which is identifiable based on a contrast difference. Contours are then fitted to the contrast adjusted image to identify open and closed air bubbles based on contrast changes. In one embodiment a threshold contrast level is used to define a bubble boundary, or a set of predefined contour levels based on reference images may be used, for example by looking for strong gradients or rapid spatial changes in contrast (i.e. close proximity of contours). In one embodiment the excluded region is obtained by detecting the edge of the air bubble, and then expanding or extending the edge so the excluded region has a larger area than the detected air bubble. FIG. 7C is the image 730 of FIG. 7B after fitting contours (circular segments) to identify air bubbles 732 according to an embodiment.

In other embodiments, the dark image could be analysed before the light image (in this case no cropping is performed and contours are fitted to the entire image). In other embodiments, a single grey background, or other single coloured background is used and a single low power image is captured and analysed (rather than separated black and white images). The captured image can be a colour image or a greyscale image. In this embodiment the background has RGB or grey scale values between 60 and 195 on a 255 scale. A suitable image can be analysed using the computer vision techniques discussed above by first applying a feature detection algorithm to detect features of the slide, coverslip, filter and intersections of grid line, followed by detection of air bubbles or large particulate matter such as dirt.

Other image filtering techniques and methods may be used to identify air bubbles or large particulate matter such as dirt. For example computer vision techniques such as morphological opening or closing techniques can be used to identify air bubbles and map their edges. Machine learning techniques could also be used, for example a classifier trained on a reference set of images comprising air bubbles could be used. Once features such as grid lines, membrane edge, air bubbles, dirt particles, etc., are detected these are used to define excluded regions. In one embodiment the detected edge of a feature is used to define the edge of an excluded region comprising a detected feature. In another embodiment an additional buffer region is added to the detected edge of the feature, so the excluded region has an area larger than (and includes) the detected feature (i.e. the excluded region comprises the feature and a buffer region). The size of the added buffer region may depend upon the type of feature. For example in the case of the outer boundary of the membrane the excluded region may extend inwards 2-5 mm from the detected edge. In the case of grid lines or air bubbles a percentage such as 5% may be used. Further the excluded region may be defined on a pixel by pixel basis, or grid cell by grid cell basis. That is once the mapping grid is defined, each cell in the grid may be assigned a binary excluded status (included or excluded). Any grid cells which contain a detected feature can be assigned an excluded status, and then a buffer region is defined as the next n adjacent grid cells, in both X and Y directions, which are also assigned an excluded status. In other embodiments images the field of view of an image may be analysed to check it does not contain grid lines or boundaries, and counting is then performed. In some embodiment a graticule is used to define the counting region. In other embodiments a counting region may be defined by defining a boundary object (eg boundary box or circle) and counting limited to within the counting region. In some embodiment one or more counting regions are located within a field of view.

In some embodiments, the light and dark light sources (or grey or coloured backgrounds) are integrated into the microscope slide holder so they are also supported (and moved) by the robotic XY stage. In this embodiment the light source also acts as illuminating light source for phase contrast images. In other embodiments the light and dark light sources are fixed in a location under the field of view of the camera, and the microscope slide holder supports the edges of the slide and has an aperture underneath the slide. The robotic XY stage moves the aperture over the light and dark light sources to allow capture of the macroscale images. In one embodiment a colour changing panel located in a base of the microscope slide holder for supporting the microscope slide. The colour changing panel has a dark surface to provide a dark background for a supported microscope slide 402 and further comprises a switchable light source to provide a light background for the supported microscope slide. In one embodiment, the dark surface is provided by a translucent black panel with a LED lighting panel located below it. Other arrangements could be used to provide a colour changeable background. For example two coloured panels (one dark, one light) could be swapped in and out (manually or preferably robotically). Other optical/lighting arrangements could also be used, including the use of light projection systems above the slide to control the amount of illumination (or brightness) of the slide.

Once quality criteria are estimated, these are compared against predefined sample quality criteria to perform a quality assessment. For example the quality criteria may include criteria that indicates the filter has been damaged, improperly prepared, or is significantly contaminated, and if one or more of these conditions (or quality criteria) is detected the sample fails the quality assessment. For example suitable quality criteria include the presence of one or more tears in the filter (which may show up as unusual image properties such as lines), detection of a portion of the membrane outside of the coverslip (indicating improper preparation), discoloration of the membrane indicating oversaturation of acetone or a high proportion of air bubbles and/or particulate on the sample. For example a threshold percentage of 25% or 50% bubble and/or particulate coverage percentage (of usable filter area) could be used. These criteria can be assessed using image analysis for example to detect tear like structures, or a histogram of pixel colours, or by classifying and then counting contaminated cells using the 2D grid.

FIG. 5A is a schematic diagram 500 of a membrane filter illustrating the filter edge 502, gridlines 504 and excluded regions according to an embodiment. In this embodiment the excluded regions comprise regions around gridlines 512, air bubbles 514 and large particulate matter 516 such as dirt. The locations (e.g. grid coordinates) of the excluded regions are saved.

Returning to FIG. 1A, if the sample has passed the quality assessment the next stage is fibre counting stage 140. At step 142 the countable region is analysed using a computer vision method to identify and count the number of countable respirable particles within the countable region, and this is then reported at step 144. Alternatively an estimate of the density of particles on the filter is obtained and reported (for example number of particles counted/estimated (or known) area of sample portion 406.

The analysis is then terminated 146 for this slide, and another slide can then be analysed.

Figure 9A:
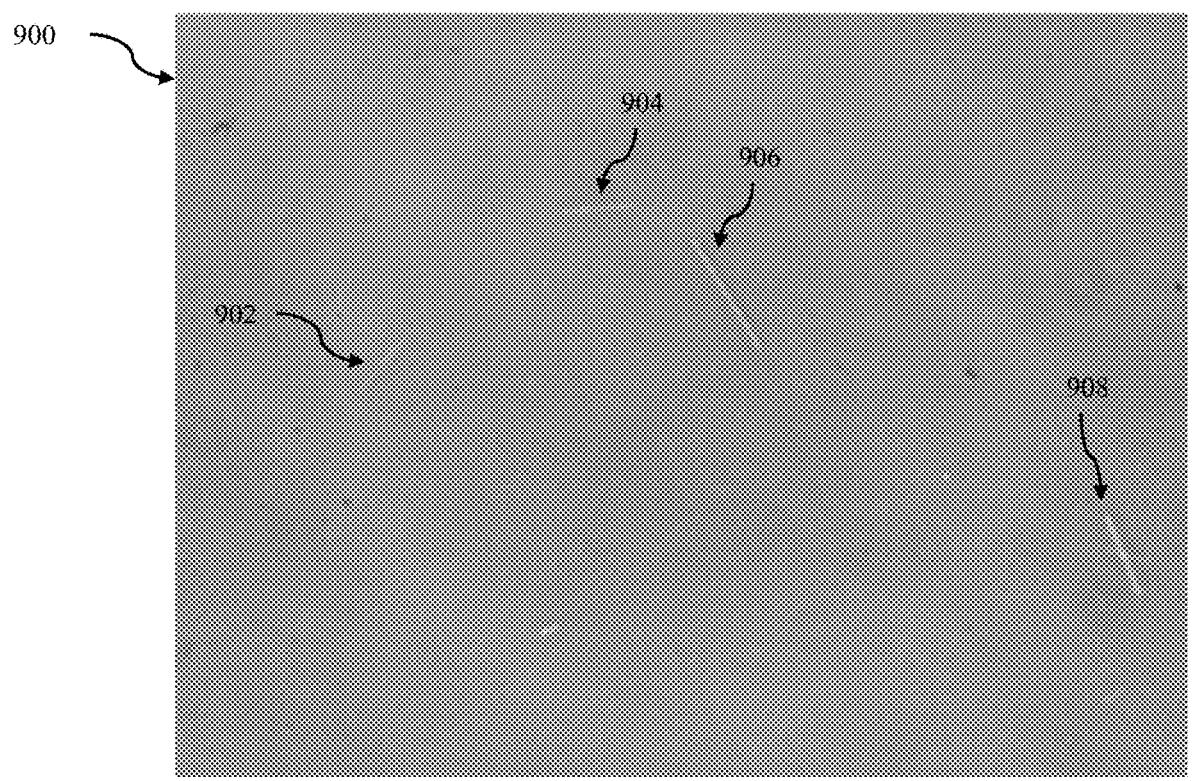
FIG. 9A is a magnified phase contrast image of a sample location of a membrane filter according to an embodiment.
Figure 9B:
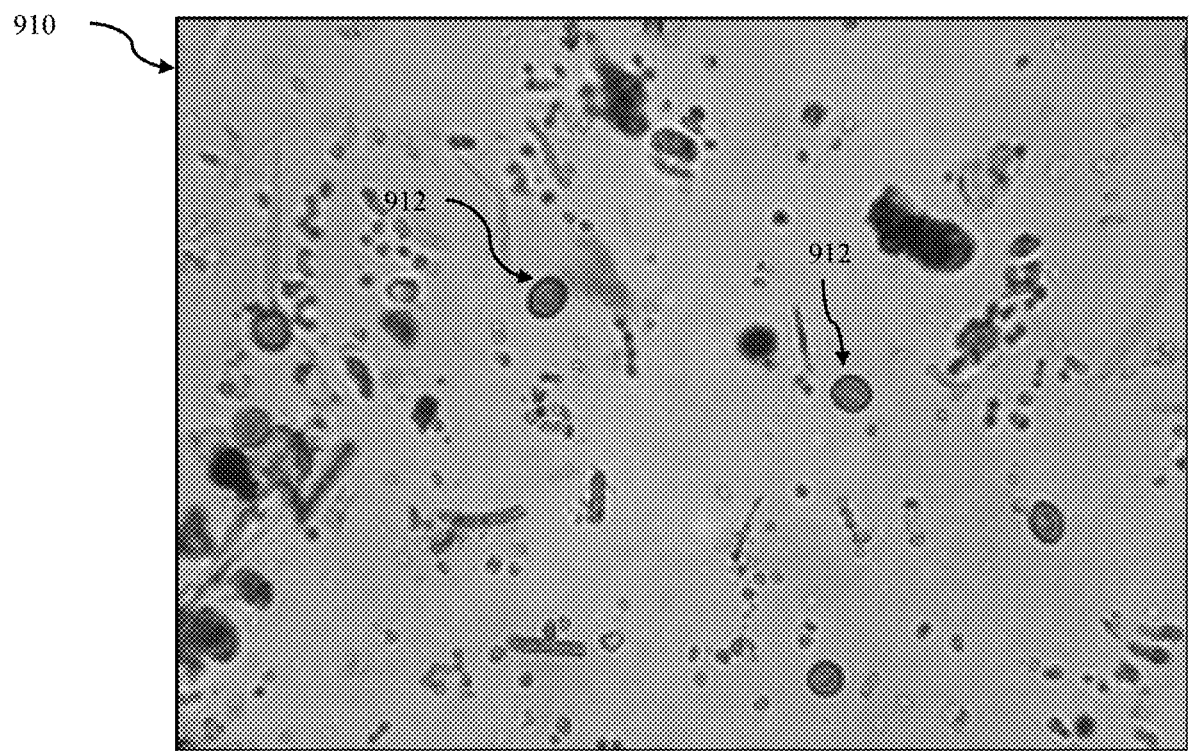
FIG. 9B a magnified phase contrast image of a sample location of a filter taken from a spore trap according to an embodiment.

As discussed above, the digital phase contrast microscope comprises an image sensor or camera configured to capture one or more image of the image plane of the digital phase contrast microscope. FIG. 9A is a magnified phase contrast image 900 of a sample location of a membrane filter according to an embodiment. As can be seen in FIG. 9A, the image comprises various objects 902, 904, 906 and 908 which may be asbestos fibres (or countable respirable fibres) . FIG. 9B a magnified phase contrast image 910 of a sample location of a filter taken from a spore trap and comprises spore (respirable particles).

In one embodiment fibre counting stage 142 is performed separately on each set of one or more images at each valid sample location, e.g. has passed a field of view level quality assessment, so that the entire countable portion of the countable region (or area) is counted. For example at each sample location, a test is performed to determine if the sample location is a valid analysis point (or sample location) and analysis step 142 is only performed if the sample location is valid. A valid sample location may be a sample location that does not include an excluded region within the field of view and/or has passed a field of view level quality assessment. That is a valid analysis point (or sample location) is one that is sufficiently distanced from the perimeter of the sample edge, not within an air bubble, and not on a gridline or contaminated by a dirt particle or similar. Once at a valid sample location is determined the one or more captured magnified phase contrast images are analysed using computer vision techniques 132. In another embodiment, the magnified images are each sample location are combined to form a composite analysis image, and computer vision analysis (and counting) is performed on this composite analysis image.

Figure 10:
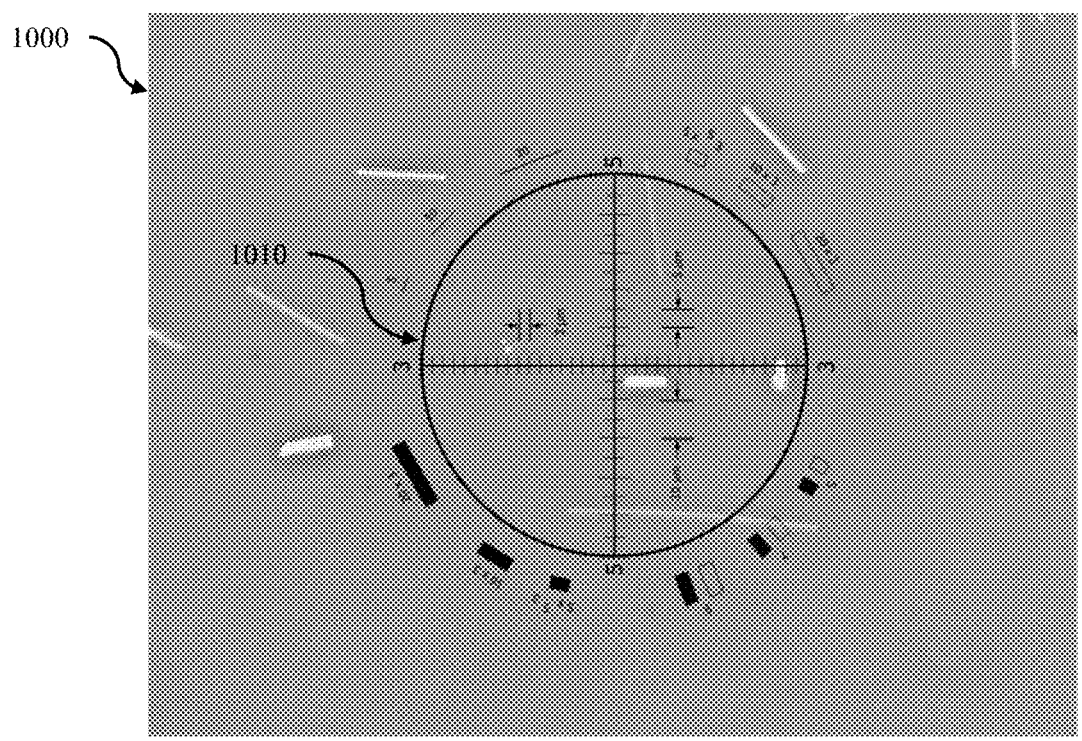
FIG. 10 is a phase contrast image of a sample location of a membrane filter at a total magnification of 400 times showing a counting graticule according to an embodiment.

In one embodiment the counting region within an image is defined by a counting graticule, such as a Walton-Beckett graticule provided in the optical path of the microscope (and thus captured in the image). FIG. 10 shows an image with a Walton-Beckett graticule. Alternatively the counting region of the field of view may be the dimensions of the grid cell, if less than the field of view such as in FIG. 5B, or an area such as a circle or square with predefined dimensions or area based on the total magnification of the image, for example the portion not shared with an overlapping adjacent image. In another embodiment the counting region may be the entire field of view or a bounding object may be defined (eg bounding box or circle) used and counting limited to with the bounding object.

Once the sample locations have been analysed and the countable respirable particles identified and counted, a report generation step 134 is performed which reports the total number of respirable particles counted in the countable area of the filter, or an estimate of the respirable particle density over the sample portion, along with any other relevant information (date, time, location, quality assessments, sample ID, slide ID, etc.) and the analysis is terminated 136. As discussed herein countable respirable particles are those which have a geometry matching the target respirable particle (eg an asbestos fibre). Whilst most respirable particles have a geometry matching a countable respirable particle or fibre, the countable respirable particles are not guaranteed to be the respirable fibre. As such, the number of countable respirable particles acts as an accepted measure or proxy for the number of target respirable particles (eg asbestos fibres) in the sample.

The report may be an electronic report such as a PDF document, or a digital record such as an XML document or other electronic file which can be stored. In some embodiments the report is a machine passable file which can processed and stored in a database, allowing a user to interrogate the data at a later time and generate customised reports, for example using Microsoft SQL Reporting Services (MSRS) or similar software. In some embodiments multiple reports may be generate including a human readable report that summarises the counts or density of one of more slides, and one or more machine readable reports which are stored in a database.

At each sample location, one or more phase contrast magnified images are captured. Whether one or more images are captured will depend upon the magnification of the microscope and whether the depth of field at the magnification is sufficient to capture all of the particles on the filter between the microscope slide and cover slip (that is physical thickness of the filter exceeds the depth of field at that magnification). Typical magnifications are between 100 and 600 times as this is sufficient to allow identification of particles in the field of view, (for example 200, 400, or 450 times) although lower magnifications such as 40 or 50 times (the limit of human resolution), particular if high resolution image sensors are used, or higher magnifications such as 2000 times (the limit of optical microscopy) could be used. At total magnifications up to 200 the depth of field is generally sufficient to capture all countable respirable fibres or particles on the filter. As the magnification increases, the field of view and depth of field decreases. FIG. 10 is a phase contrast image 1000 of a sample location of a filter at 400 times total magnification. A counting graticule 1010 is also shown. In this embodiment the counting graticule is a Walton Beckett Graticule. In cases where the depth of field is less than vertical distance between the microscope slide and coverslip, a technique known as focus stacking may be used to identify all possible particles. This effectively combines the Z images over the vertical depth (z) into a single image for analysis. In other embodiments alternative approaches such as feature tracking of particles across Z multiple images across the vertical (z) depth of the sample may be used (ie the Z images separately analysed). In some embodiments a virtual graticule may be generated and used to define the boundary for the counting process, and in other embodiments the whole field of view, or a region or portion of the field of view (eg central portion) may be used.

Figure 11:
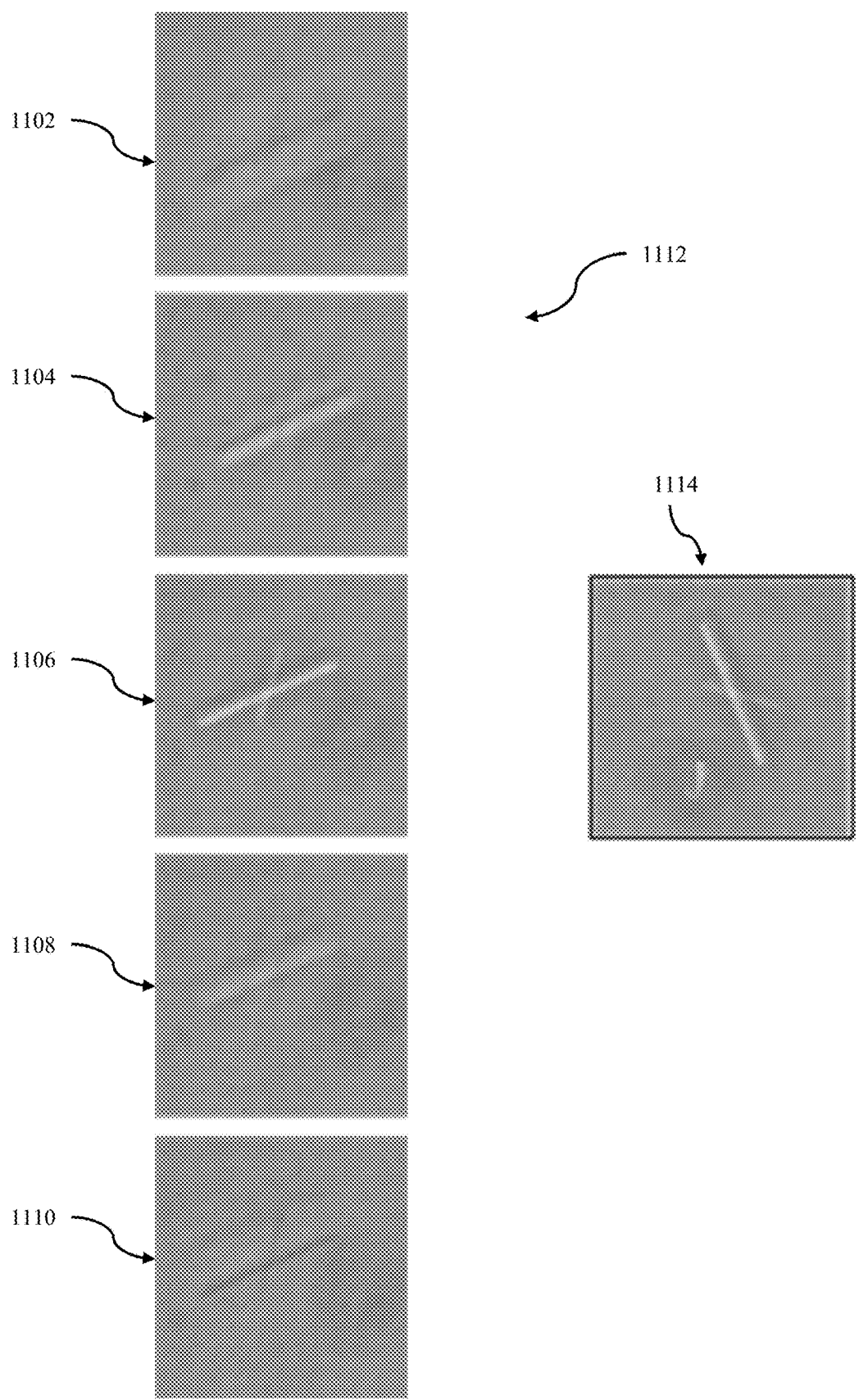
FIG. 11 is a schematic diagram of set of Z magnified phase contrast images taken at different focal planes spanning the vertical (z) depth of the sample and a Z-stacked composition image according to an embodiment.

In focus stacking, a set of Z magnified phase contrast images are each captured at different focal planes spanning the vertical (z) depth of the sample. This is achieved by holding the XY location of the slide constant, but varying the Z axis of the focus drive of the microscope (so that images at different focal planes are captured over the vertical (z) depth of the sample). This can be performed using a motorised or robotic Z axis focus drive. The set of Z magnified phase contrast images are Z-stacked to obtain a single stacked image for analysis. FIG. 11 is a schematic diagram of set 1112 of Z magnified phase contrast images 1102 1104 1106 1008 1110 taken at different focal planes across the vertical depth of the sample and a Z-stacked composite image 1114 according to an embodiment. The Z stacking is implemented in computer vision libraries and operate by using feature detection (e.g. edge detection, corner detection, etc.) and/or Fourier analysis to detecting in-focus regions of each image and the in-focus patches are then blended together to generate the final composition image. The final composite or single stacked image is then analysed to identify and count the number of countable respirable particles within a counting region of the field of view of the single stacked image. In some embodiments a composite analysis image is formed from joining or digitally stitching together the composite stacked images.

In an alternative embodiment the multiple images at a sample location are not combined into a single image, and instead a particle detection approach is used which tracks particles that exist in multiple focus planes. In this embodiment the position of a particle is recorded in each image and searches made across the other images to determine whether particles in the other images are duplicates of this particle, or new particles which were not previously visible. This can be performed by defining a search region which may be the particle location plus some error margin, and for each other image, determining if another particle falls within the search region. This may require the entire new particle to fall within the search region, or the area of the new particle must have a predefined threshold percentage (e.g. 50%, 75%, 90%, 95%) within the search region (e.g. based on pixel counts and/or comparisons). Additional criteria can be imposed such as requiring the duplicate particles to be linked across (vertically) adjacent images. Alternatively a series of images may be analysed to determine the best image such as the image with the sharpest focus. This image is then selected and used in the fibre counting step 142. Other criteria.

Once a single image (either raw or composite Z stacked image, or best image from a set of Z images) or a set of Z images over the vertical depth, at a sample location is obtained it is analysed using a computer vision method to identify and count the number of countable respirable particles within a counting region of the field of view.

Figure 8:
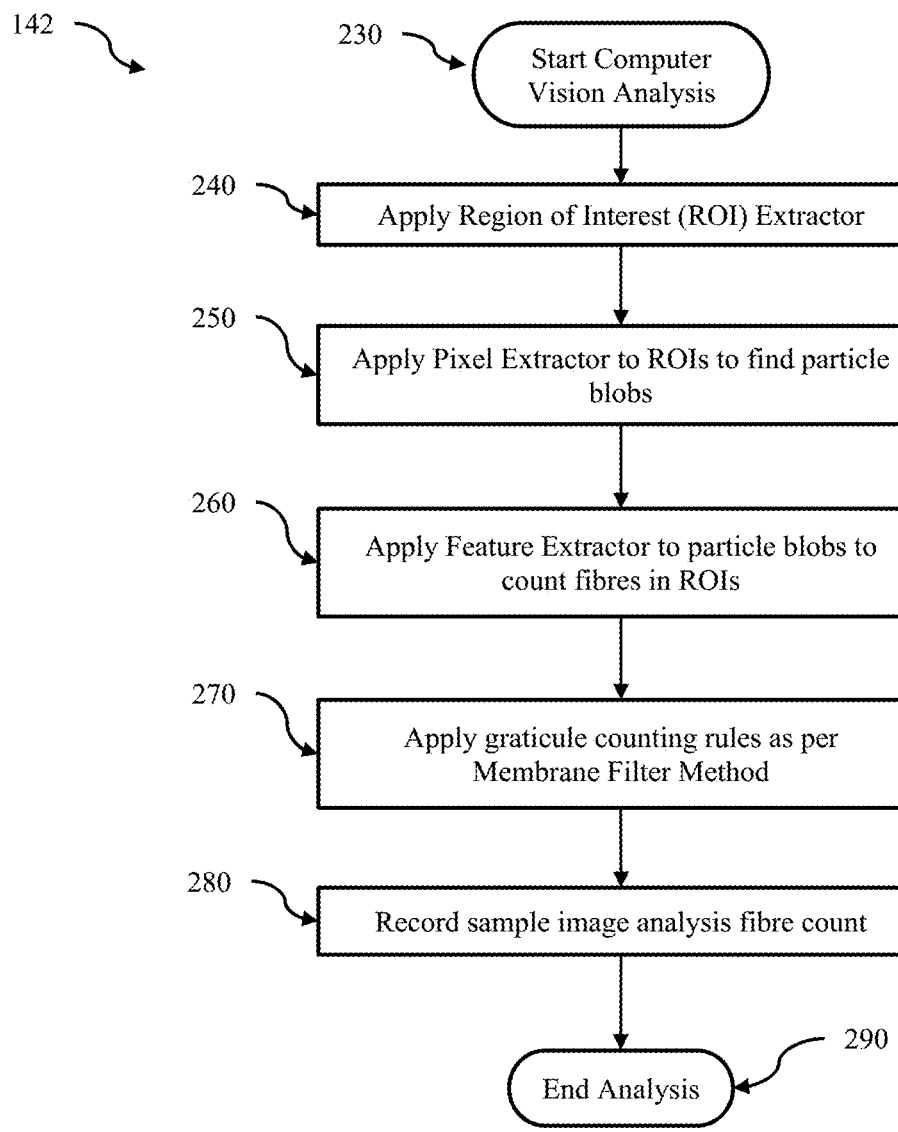
FIG. 8 is a flowchart of an computer vision analysis step in the method shown in FIG. 1B according to an embodiment.

FIG. 8 is a flowchart of the analysing step 142 in the method shown in FIG. 1B according to an embodiment. At step 210 sample imaging analysis (ie fibre counting by computer vision) is started. A quality assessment of the field of view of the sample image 136 may be performed. This can be performed on a single image or Focus stacking of the image set at a sample location can be is performed and quality assessment performed on the composite image. If the sample fails the quality assessment then we record that a sample image analysis failure event and end the sample image analysis step for this field of view. The sample quality assessments step 132 and 136 may be the same step (ie stages 132 and 136 may be combined or performed in parallel), or they may be separate processes, operating on different image sizes or magnifications. For example sample quality assessment 132 may be performed on low power images reflective of the quality of the whole filter (or a composite image of the whole membrane), whilst step 136 may be performed at a specific sample location (ie on a high power small FOV smaller scale), and assess the image quality on a FOV scale. A failure at a specific sample location may simply lead to selection of an alternate sample location, rather than failure of the entire sample/filter. The quality assessment may be performed using computer vision techniques and/or image analysis techniques. Quality assessment criteria include local dust loading, which is calculated by simply filtering all particles from the background for all field of views and calculating an average intensity, and optionally a variance measure such as the standard deviation. The average for this sample location may be compared to a threshold value, such as the global average taking into account the variance and if the local average is too high then this sample location is rejected. Other quality measures may include analysing the local particle loading or spatial distribution to detect uneven particle loading or spatial distribution (eg clustering or clumping of particles, high particle density), or unusual local image properties that may indicate poor local quality (e.g. brightness range, colour range, etc). For example, discoloration of the membrane can indicate over-saturation of acetone during sample preparation, and thus an analysis of the pixel colour distribution could be performed to detect discoloration such as by determining the number of pixels (or a percentage) within a certain predetermined discolouration colour range. Improper preparation such as too much acetone can also wash particles off a part of the membrane. In an embodiment where a graticule is used, a criteria such as more than one-eighth (12.5%) of a graticule area covered by an agglomerations of fibres and/or particles could be used. Other area based thresholds could be used such as at least 10%, 15% or 20% coverage of the counting region. Machine learning approaches could be used based on a reference set of good and/or poor quality sample location images.

If the magnified phase contrast image passes the quality assessment (or it is not performed) then the next step 240 is to identify regions of interest (ROI) in the field of view (or over a sample image). A region of interest is a region that comprises pixels or features that may be a respirable fibre. In one embodiment the ROI extracts rectangular regions but in other embodiments regions of any shape may be extracted (regular and irregular). The extracted region may be the whole sample image or a cropped region of the whole sample image. FIG. 12B is an output image from the ROI extractor with colours inverted to better illustrate image features. This illustrates a plurality of rectangular ROI's 1226a 1126b 1226c 1226d of varying sizes marked on the image. As shown in FIG. 12B ROI's can overlap (eg 1226a and 1226b). A range of image processing techniques may be used to identify ROIs based on pixel intensities and other image characteristics. In one embodiment a local or global background average intensity level and variance is determined or may be predefined. Regions of interest may comprises identifying pixel regions with high intensity compared to the background and defining boundaries for the ROI based on where the intensity drops towards the background level. Various thresholding, gradient, smoothing or morphological opening or closing computer vision or filtering based techniques may be used to identify objects in the image and/or boundaries to define a ROI. In some embodiments the ROI extractor is a computer vision based ROI extractor method using one or more machine learning classifiers trained on a reference set of images of respirable particles (eg asbestos fibres) to identify regions of interest which match known respirable (eg asbestos) fibre images.

At step 250 a pixel extractor is applied to ROI's to identify particle blobs (objects) in the ROI that comprise candidate fibre pixels (for subsequent analysis). Phase contract images often include halos around particles as well as other noise. The pixel extractor receives the ROI as input identifies the pixels that make up particles and filters out artefacts such as halos and noise. In some embodiments the pixel extractor is configured to perform background removal on the image to leave only the pixels that are part of candidate respirable particles (ie may or may not be the target respirable particles—this is determined by the feature extractor step 260 discussed below). The pixel extractor may use machine learning techniques, background filtering, or diffusion filtering techniques. In some embodiments, one or more machine learning classifiers trained on a reference set of images labelled with foreground features (eg respirable particles and other particles) are be used to identify or extract candidate particle pixels in a ROI. In other embodiments image filters or image analysis techniques such as diffusion filtering are used to reduce image noise whilst preserving significant features or parts of the image, such as preserving edges or lines. For example these may be configured to identify contiguous regions of an image and in particular define the edges so that noise pixels and halos are excluded. The pixel extractor may act on the image to flag candidate pixels (ie the extracted pixels), or conversely flag background pixels (pixels to ignore). In some embodiments the output is an image comprising only candidate pixels (ie all background pixels removed, flagged or set to a predefined background value such as zero intensity or a black pixel.

At step 260 a feature extractor is applied to the particle blobs (objects) to apply one or more geometric operations to classify (or identify) a pixel blob having a geometry matching a respirable fibre. In some embodiments the geometric operations may comprises measuring geometric properties or parameters such as length, width, perimeter, and average width and/or standard deviation (or similar variance estimator) along a defined axis, or other indicator of the regularity of the shape (ie how closely it matches a predefined regular shape such as a rectangle. Geometric shapes such as rectangles or ellipses may be fitted and fitted properties used in the assessment. In some embodiments a machine learning approach is used in which a classifier is trained on a set of reference images matching known respirable particles. This is classified (or identified) as a countable respirable fibre, and the number of countable respirable particles in the ROI is returned (to allow counting of the total number of respirable particles). At step 270 a graticule counting rule is applied, for example as per the membrane filter method. This counts the number of features identified as respirable particles in the field of view (ie the number of countable respirable particles), at step 280 the count result (the sample image analysis fibre count) is recorded, and the sample image analysis is terminated 290. Alternatively the density of particles may be estimated and reported (eg total count/area of field of view). Such an analysis can be varied for other respirable particles by replacing the asbestos training images, with a suitable set of training images for the desired target respirable fibre. Strictly the system does not positively identify the target respirable particle type (eg asbestos fibres). Rather it detects objects which appear similar to known images of the target (or desired) respirable particle, and these objects are counted and used as a proxy measure of the number of target respirable particles in the sample.

Figure 12A:
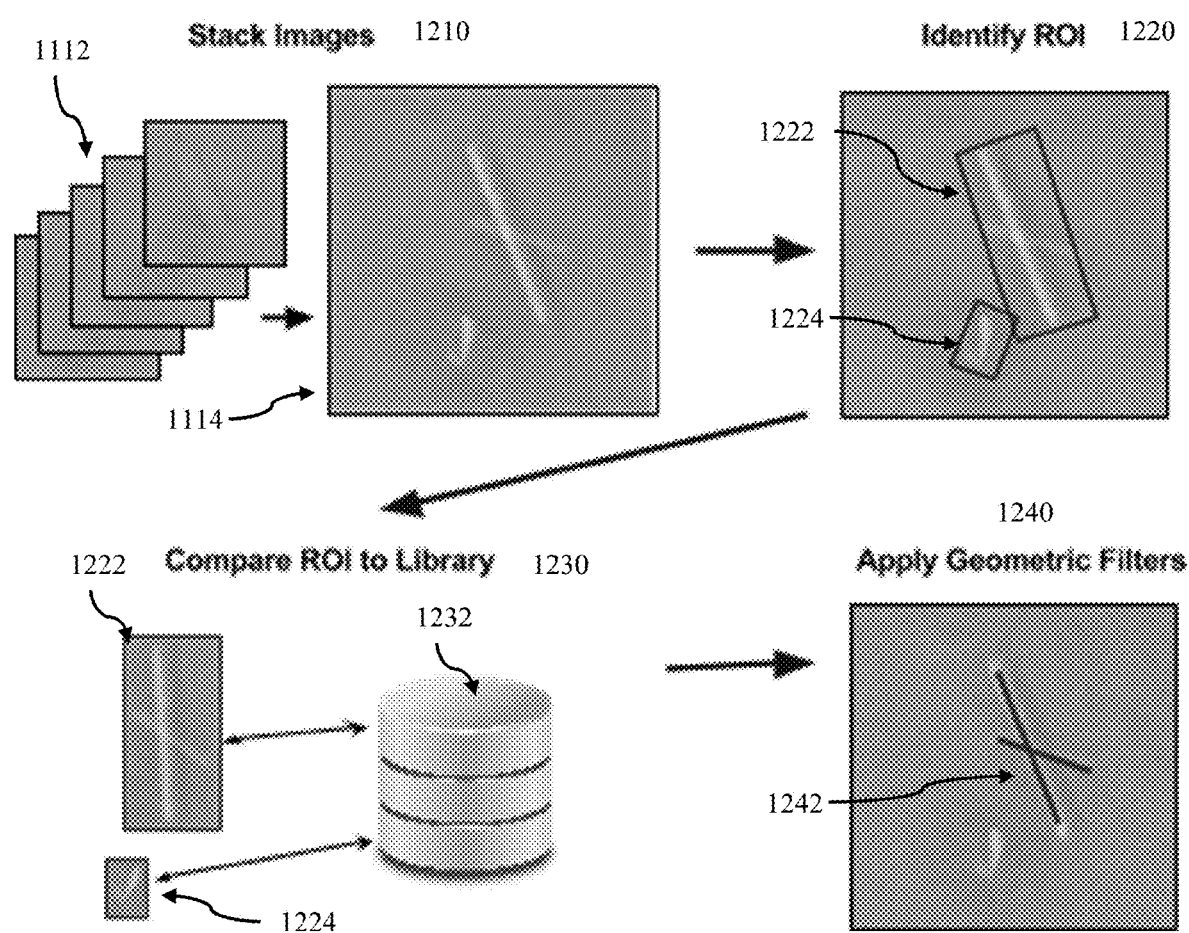
FIG. 12A is a schematic illustration of the flowchart shown in FIG. 2 according to an embodiment.
Figure 12B:
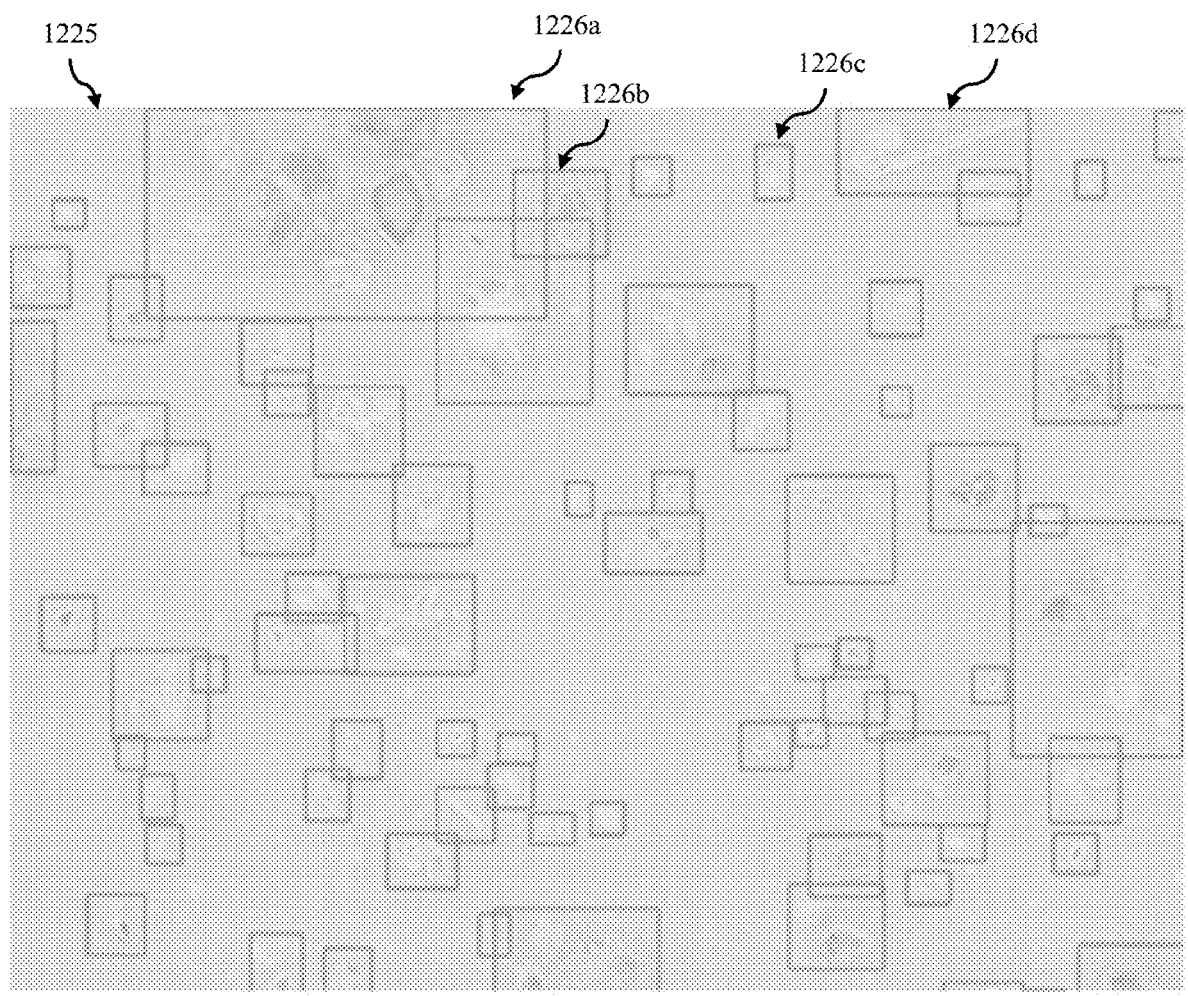
FIG. 12B is an output image from an embodiment of a Region of Interest (ROI) extractor with colours inverted to better illustrate image features.

FIG. 12A is a schematic illustration of the flowchart shown in FIG. 8 according to an embodiment. This method comprises optionally stacking images 1210. Then for each stacked image, identifying one or more regions of interest 1220. Each region of interest comprises an object that may be an asbestos particle (or countable respirable fibre). FIG. 12A shows two regions of interest 1222 and 1224 identified in composition image 1210.

In this embodiment the Pixel Extractor comprises a machine learning based classifier configured to compare pixels within ROI's to a library of reference images 1230. In this embodiment one or more machine learning classifiers are trained on a reference set of images of particles and/or respirable fibres 1232 (eg asbestos fibres). Each region of interest 1222 1224 is provided to the classifier to identify one or more candidate regions of interest which match a reference image (ie classify as a match or not). In this embodiment both regions of interest match references images and are considered candidate regions of interest. Next a feature extractor uses a geometric filter 1240 that is applied to each candidate region of interest to identify if an object has a geometry matching the target respirable fibre (eg an asbestos fibre). As shown in FIG. 12, the first region of interest 1222 comprises an object with a geometry that passes the geometrical filter, but the second region of interest 1224 failed the geometrical filter and was excluded. The number of countable respirable particles in the regions of interest passing the geometrical filter is the counted and reported (and/or density may be estimated based on the count).

Figure 12C:
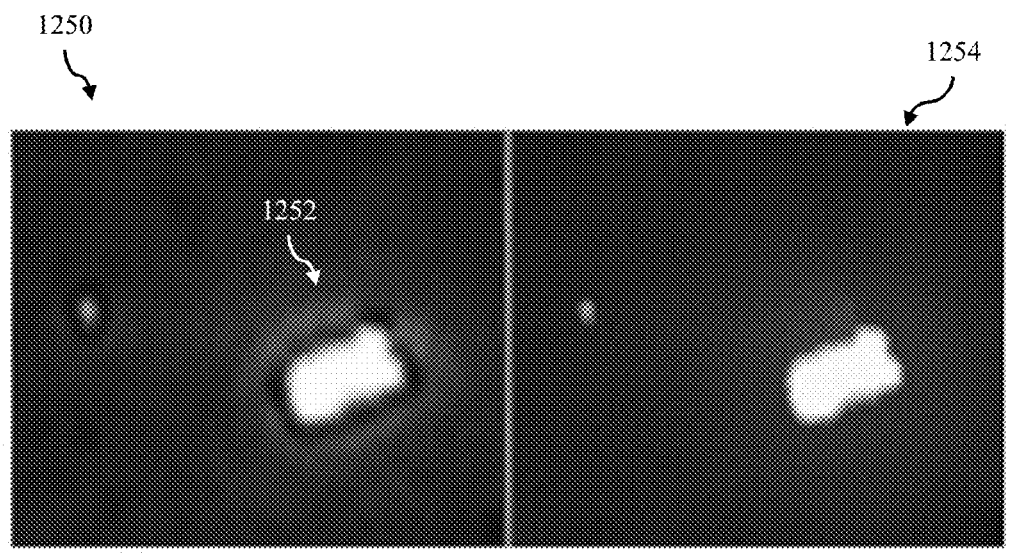
FIG. 12C is a set of comparative images showing an input ROI image and the output from an embodiment of a pixel extractor.
Figure 12D:
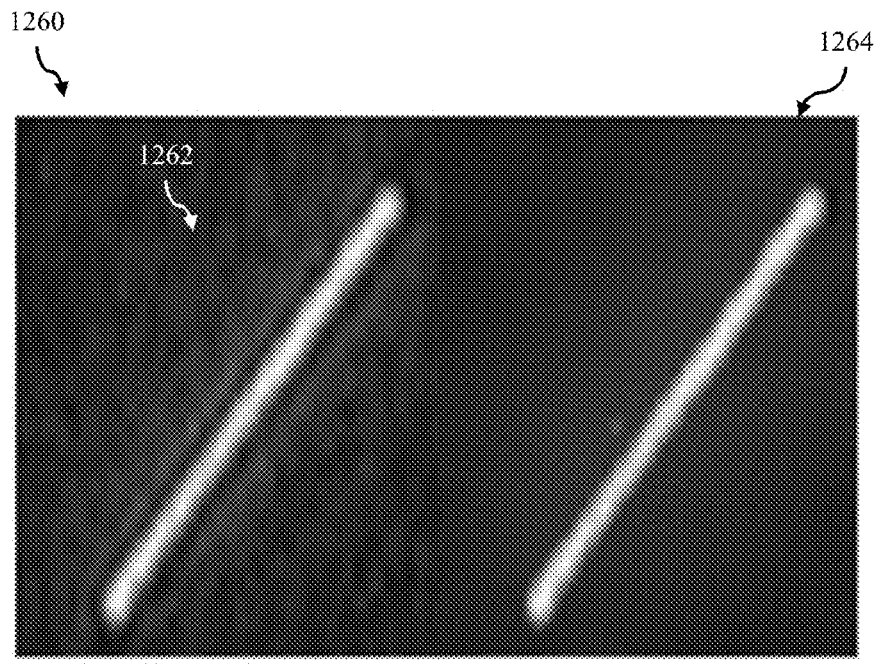
FIG. 12D is a second set of comparative images showing an input ROI image and the output from an embodiment of a pixel extractor.

FIGS. 12B and 12C are comparative sets of images showing the effect of an embodiment of the Pixel Extractor. In FIG. 12C a first ROI image 1250 is shown comprising a bright white rectangular object 1252 with a bright halo, as well as other noise. After passing the ROI image through an embodiment of a pixel extractor, the halo is removed and the noise is suppressed, as shown in output image 1254. Similarly FIG. 12D shows a second ROI image 1260 comprising a bright white elongated (fibre like) linear object 1262. Considerable noise a halo is visible in this image. After passing the image through an embodiment of a pixel extractor, the halo is removed and the noise is suppressed, as shown in output image 1264.

In one embodiment, the feature extractor is a geometric filter configured to match a regular asbestos fibre (eg a regular asbestos fibre geometric filter). This uses filtering criteria requiring an object in a candidate region of interest to have a maximum width less than 3 micrometres, a length greater than 5 micrometres and a length:width ratio greater than 3:1, and which does not appear to touch any other object within the candidate region of interest. Each object satisfying the filtering criteria is counted as a single countable respirable fibre. These parameters may be varied for other respirable fibre types. Most other respirable fibres of interest have similar length to width ratios (ie 2:1, 3:1 4:1) although most other respirable fibres of interest tend to have larger diameter than asbestos fibres.

Figure 13A:
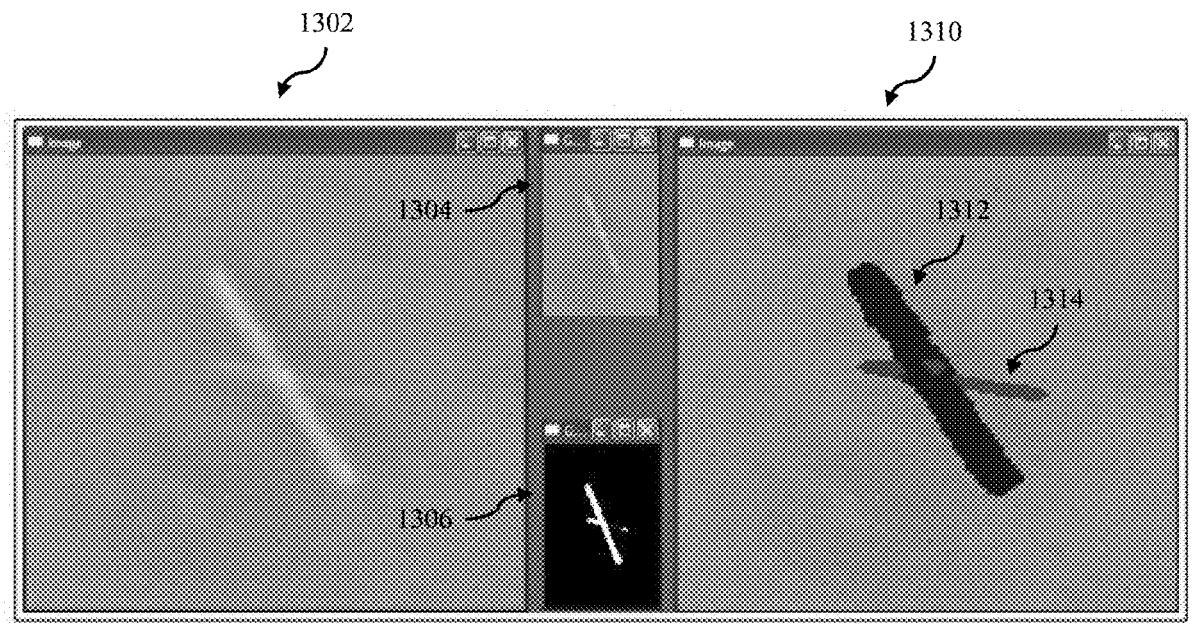
FIG. 13A is schematic diagram of the computer vision processing of a bundled fibre according to an embodiment.

In some cases regions of interest comprise bundled fibres. FIG. 13A is schematic diagram of the computer vision processing of a bundled fibre according to an embodiment. Thus in one embodiment a bundled asbestos fibre geometric filter is applied. This uses a filtering criteria requiring an object in a candidate region of interest to have a maximum width less than 3 micrometres, a length greater than 5 micrometres and a length:width ratio greater than 3:1; and which does not appear to touch any other object with a maximum width, defined as the smaller of the two dimensions of the other object, greater than 3 micrometres. Counting of a bundled fibre is more difficult. In this case counting the number of countable respirable fibres comprises counting any individually distinguishable fibres, or if no individual fibres can be distinguished then counting the bundle as a single fibre. Individually distinguishable fibres can be identified using the single fibre criteria with the limitation that it may touch another object. Alternatively another more complex shape based computer vision technique can be used to identify whether the bundle is distinct fibres or not. Alternatively the bundled fibres may be visually inspected by an operator and manually counted.

Figure 13B:
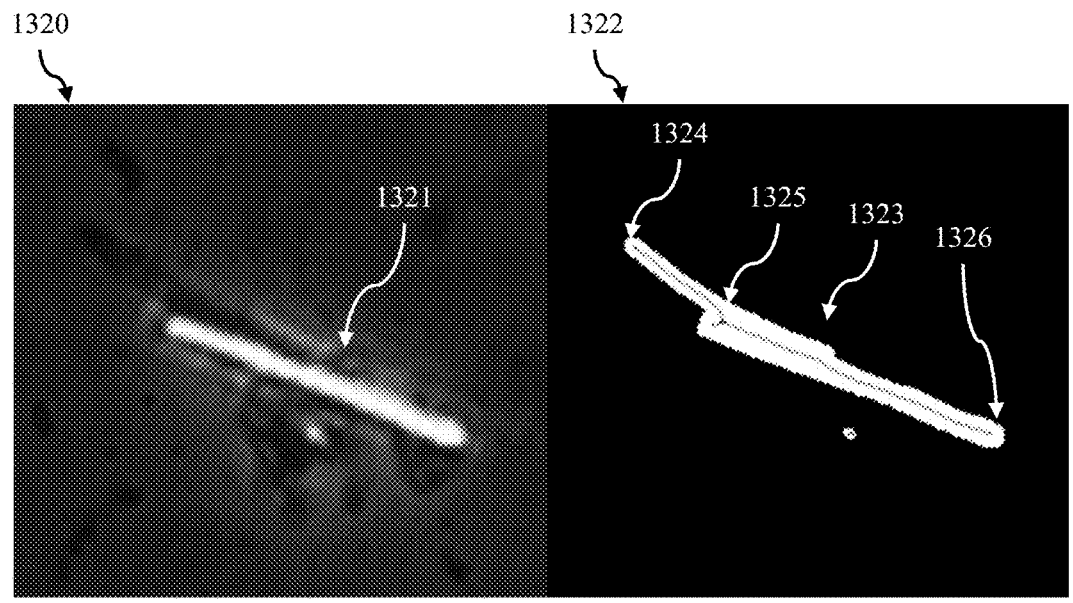
FIG. 13B is a set of comparative images of illustrating an embodiment of a feature extractor.
Figure 13C:
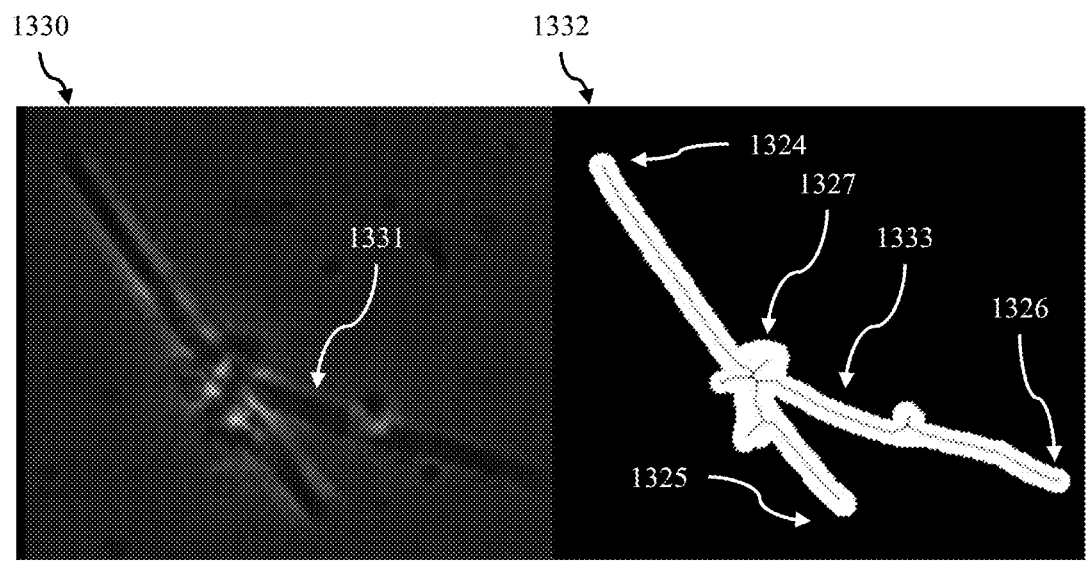
FIG. 13C is another set of comparative images of illustrating an embodiment of a feature extractor.

FIGS. 13B and 13C shows set of comparative images illustrating an embodiment of a feature extractor. The pixel extractor receives the pixel blob as an input, identifies fibre related pixels and this is provided to the feature extractor that applies geometric operations to identify and count fibres in the blob. In this embodiment the pixel extractor identifies pixels that make up the particle and the feature extractor skeletonises (ie thins) the particle blob to a skeleton. The Feature extractor also identifies and records endpoints and nodes. A circle of fit is used calculate the width of the particle blob along the skeleton. Then line of best fit rules are applied to the skeleton with nodes/endpoints to determine the number of individual, split, and overlapping fibres. FIG. 13B shows a first image comprising a first ROI 1320 comprising a possible fibre 1321. The pixel extractor analyses this image to identify pixels and provides this as a pixel blob. This is represented in second image 1322 in which the pixel blob is represented by white pixels. The particle blob is thinned and converted to a white skeleton 1323 and end points 1324 and 1328 identified, as well as any internal node 1325. FIG. 13C shows another image comprising a second ROI 1330 comprising a more complex particle complex 1331 which appears to be two overlapping fibres. The pixel extractor analyses the ROI and identifies pixels as a particle blob. This is represented in second image 1332 in which the pixel blob is represented by white pixels. The particle blob is thinned and converted to a white skeleton 1333 is defined and end points 1324, 1325 and 1326 identified, as well as several internal nodes. A junction is defined at node 1327 and in this embodiment two fibres are identified and counted (1324 to 1325; and 1327 to 1326).

The performance of the computer vision steps was assessed against a set of manually reviewed (annotated) images. The region extractor correctly selected 98.2% of good regions. The Pixel Extractor successfully matched 73.2% of pixels, with 25.3% False negatives and 1.5% False Positives. This gives a precision of 98% and a recall of 74%, and a balanced F-score (F1) of 0.84. The Feature Extractor correctly identified 76.8% of features, with 11.2% False Negatives and 12.0% False Positives. This gives a precision of 86% and a recall of 87%, and a balanced F-score (F1) of 0.86.

In a further form, the quality assessment step 230 is performed after the results of the ROI, pixel extractor and feature extractor steps based on quality measures or metrics calculated during performing these steps. For example the image analysis, classifiers, or other computer vision methods may generate quality measures, or statistical or probabilistic measures of the performance of each of steps 250, 260 and/or 270 (either on the whole image or specific ROI's). A set of predefined quality criteria may be defined, and sample image terminated (234) if the sample image fails the quality assessment. Similarly analysis may be terminated if the number of individual ROI's in an image having poor quality exceeds some threshold.

In other embodiments Machine Learning methods, such as Deep Learning methods are used to combine the above described individual quality assessment 220, ROI extraction 240, pixel extraction 250, feature extraction 260 and/or counting steps 270 are combined into a single step or a reduced number of steps. For example a deep learning method could perform all of these steps (ie step 132 is a single step), or a deep learning method could be applied to a whole sample image (e.g. FOV) to output the count and location of particles, or applied to the output of the ROI extractor to effectively combine the pixel extraction 250 and feature extraction 260 steps, or the pixel extraction 250, feature extraction 260 and counting steps 270.

Figure 14A:
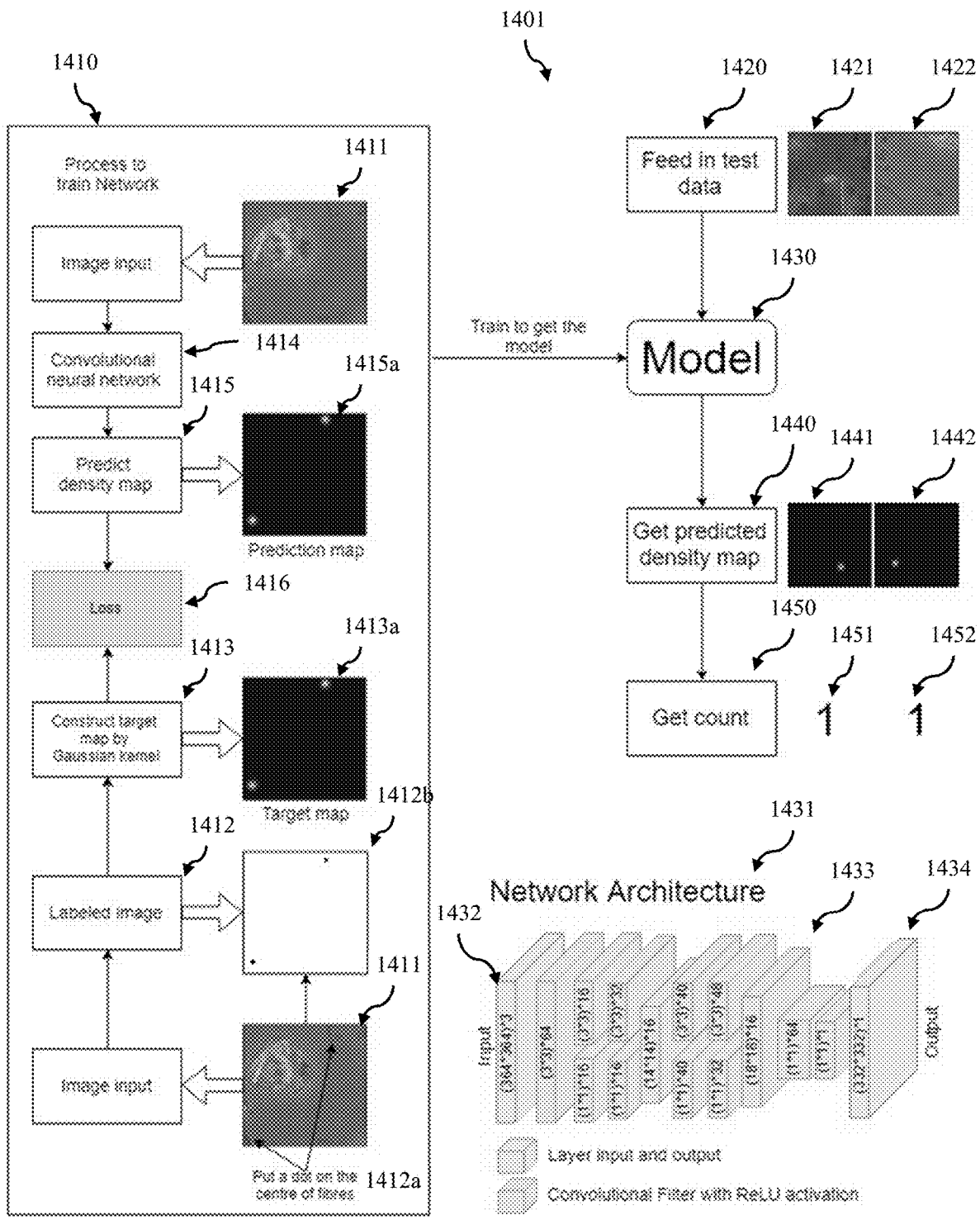
FIG. 14A is a flowchart of a deep learning method for identifying and counting respirable particles according to an embodiment.

In one embodiment the deep learning method is trained by providing an image with particles in the FOV marked on the image. The deep learning solution would then be able to receive a FOV input image and output the location and count of particles across the whole FOV. FIG. 14A is flow chart of a deep learning method 1401 for identifying and counting particles in an image according to an embodiment. In this embodiment the deep learning model estimates features to which a feature extractor can be applied to count the number of respirable particles in an image. In this embodiment the deep learning method uses a convolution neural network based model 1430. An embodiment of the network architecture 1431 comprises an input layer 1432, a set of convolution filter with rectifier linear units (ReLU) activation (ie rectifier activation functions) 1433 and an output layer 1434. In this embodiment the deep learning image is trained using training process 1410. This comprises providing an input image 1411 to a labelling step 1412 by putting a pixel-level dots on the centre of each asbestos (or other respirable) fibre 1412a to obtain labelled image 1412b. the labelled image is provided to target map construction step 1413 which applies a Gaussian kernel on the labelled image 1412b to get a target map 1413a for counting particles. The input image 1411 is provided to the current convolutional neural network (ie the model being trained) 1414 which convolves the image to calculate a prediction density map 1415*a* (predict density map step 1415) which (ideally) should match the target map 1413*a*. A loss function 1416 is used to calculate the loss between these two maps to train the network. Based on the output the convolution neural network model 1414 is adjusted and the training process repeated until satisfactory performance is achieved eg by meeting certain performance criteria such as those based on false positive, true positive and false negative rates. Once the model 1430 is trained the deep learning method comprises providing (feeding) test data 1420 such as input images 1421 and 1422 for analysis and counting. Each image is processed by the convolutional neural network model 1430 to obtain (or get) a predicted density map 1440. First density map 1441 is obtained for first input image 1421 and second density map 1442 is obtained for second input image 1422. A counting step is then performed 1450 returning a first count (1) 1451 for first density map 1441 and a second count (1) 1452 for second density map 1442.

Figure 14B:
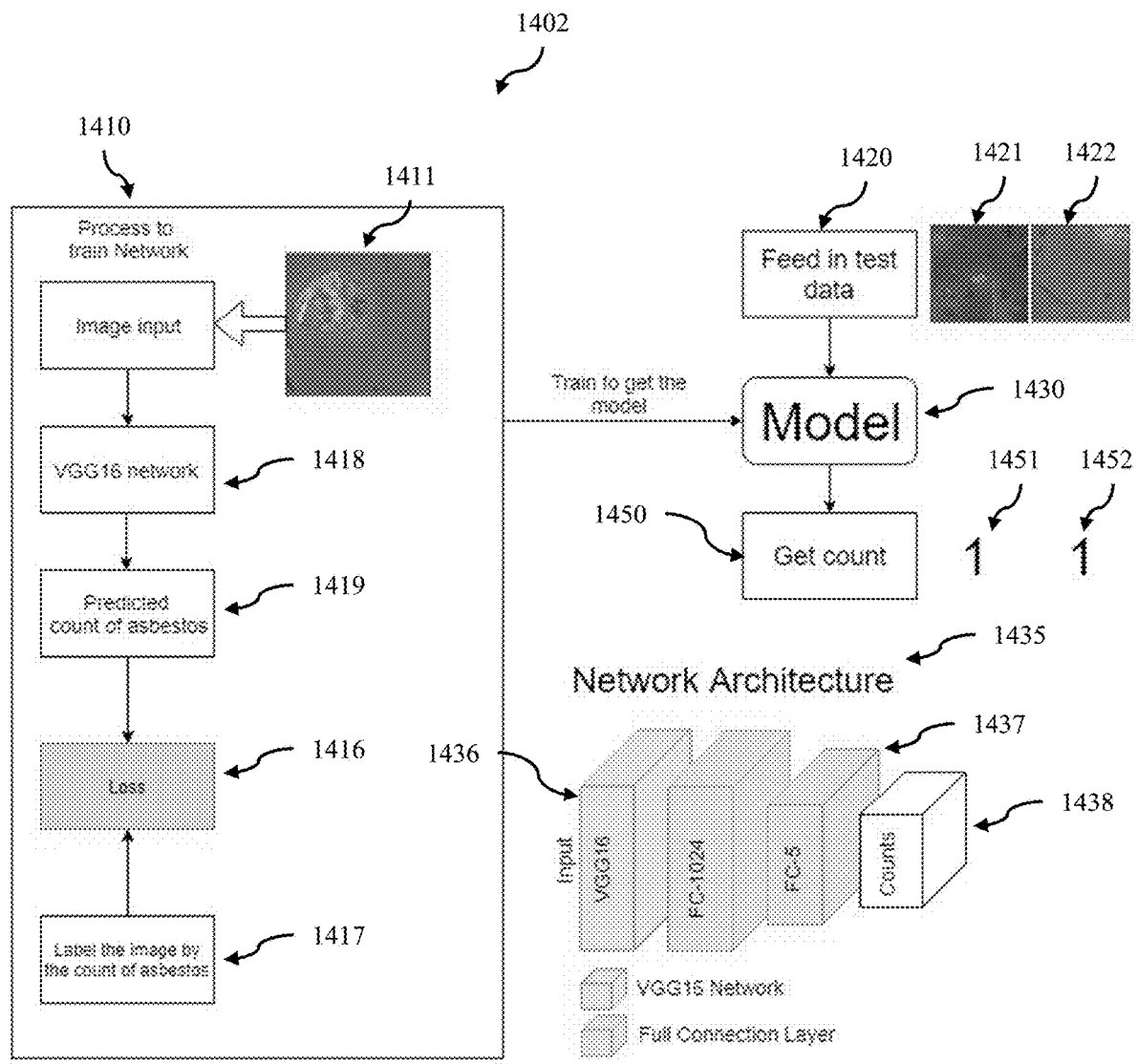
FIG. 14B is a flowchart of another deep learning method for identifying and counting respirable particles according to an embodiment.

FIG. 14B is flow chart of a deep learning method 1402 for identifying and counting particles in an image according to an embodiment. In this embodiment the deep learning model directly estimates the number of respirable particles in an image. In this embodiment the deep learning method uses a neural network regression model 1430. An embodiment of the network architecture 1435 comprises a VGG16 convolutional neural network 1436 which receives the input image, and uses full connection layers 1438 to produce output counts 1439. In this embodiment the deep learning image is trained using training process 1410. This comprises labelling 1417 an input image 1411 with the count of respirable (ie asbestos) particles in the field of view of the image. The input image 1411 is provided to the current convolutional regression neural network (ie the model being trained) 1418 which convolves the image using a VGG16 network and full connection layers to get the predicted count of respirable particles 1419. A loss function 1416 is used to calculate the loss between the labelled count and estimated count from the model 1418. Based on the output the regression neural network model 1418 is adjusted and the training process repeated until satisfactory performance is achieved eg by meeting certain performance criteria such as those based on false positive, true positive and false negative rates. Once the model 1430 is trained the deep learning method comprises providing (feeding) test data 1420 such as input images 1421 and 1422 for analysis and counting. Each image is processed by the trained convolutional regression neural network model 1430 and counting step 1450 comprises returning a first count (1) 1451 for first image 1421 and a second count (1) 1452 for second image 1422.

One advantage of machine learning methods is that they allow the extension of the method to identification and counting of other respirable particles besides respirable fibres, such as pollen and mould spores. Provide a sufficient set of training images are obtained the above methodology could be applied to counting pollen mould spores and similar objects with specific geometrical or visual/optical properties which can be detected in filters (or similar) and where it is desirable to perform a quality assessment prior to counting.

FIG. 15 is a schematic diagram of a system for automated analysis of a filter obtained from an air quality monitoring apparatus according to an embodiment. The system comprises a robotic microscope platform 2 and at least one computing apparatus 4 operatively connected to the robotic microscope platform 2. The robotic microscope platform 2 comprises a phase contrast microscope 10, a motorised XY stage 12 for receiving a microscope slide (or other optically transparent support), a motorised Z axis focus drive 13, and an image sensor 16 located in an image plane 14. A motorised nosepiece may be included to switch the objective lens. The phase contrast microscope can be a monocular, binocular or trinocular microscope. An autoloader 18 may also be used to store prepared microscopes and which can be automatically loaded onto the robotic XY stage. This allows an image capture to be performed automatically on a large batch of microscope slides, and the captured images can then be sent to the computing apparatus for analysis.

As indicated above the motorised (or robotic) XY stage may support multiple slides. In that case the slides may be processed sequentially—for example all images for a slide obtained before capturing images of the next slide. Alternatively images for slides could be captured in parallel. For example for a given focal length, images for all of the slides could be captured. Once all images are captured they could be separated into groups of images for each slide and then analysed. The image sensor may be camera with optics that integrates with the microscope, or an image sensor such as a CMOS sensor chip and supporting electronics. An autoloader could be used to load multiple slides onto the XY stage. The image sensor could be a visible range sensor, or a more specialised image sensor such as an image sensor configured to operate in the IR or near IR. An image sensor operating in IR can directly identify bubbles without requiring a coloured (or grey or dark) background. The image sensor or camera could be a multispectral camera which collects a multiple distinct wavelength ranges.

The system comprises at least one computing apparatus 4 operatively connected to the robotic microscope platform 2. This may be a local computing apparatus connected over a local wired or wireless link and may external to the robotic microscope platform or it may be integrated into the robotic microscope platform. In one embodiment the at least one computing apparatus comprises a local computing apparatus 20 and a remote, web, or cloud based computing apparatus 30. Each computing apparatus comprises at least one processor and a memory operatively connected to the processor, and the computing apparatus 4 is configured to perform the method described herein. In some embodiments quality assessment and fibre counting is performed by the local computing apparatus 4 and the results and images saved to a remote apparatus (eg in the cloud). Alternatively in some embodiments the quality assessment is performed locally, and fibre counting is performed remotely (eg in the cloud). In some embodiments the local computing apparatus coordinates captures and transmission of images to a remote computing apparatus that performs quality assessment and fibre counting.

The system is a computer implemented system comprising at least one computing apparatus 4. This computing apparatus comprises at least one processor 22, 32 and at least one memory 23, 33 operatively connected to the at least one processor (or one of the processors) and may comprises additional devices or apparatus such as a display device, and input and output devices/apparatus (the term apparatus and device will be used interchangeably). The memory may comprise instructions to cause the processor to execute a method described herein. The processor memory and display device may be included in a standard computing apparatus, such as a desktop computer, a portable computing apparatus such as a laptop computer or tablet, or they may be included in a customised apparatus or system (eg embedded or integrated computing apparatus). The computing apparatus may be a unitary computing or programmable apparatus, or a distributed apparatus comprising several components operatively (or functionally) connected via wired or wireless connections. The computing apparatus may comprise a central processing unit (CPU), comprising an Input/Output Interface, an Arithmetic and Logic Unit (ALU) and a Control Unit and Program Counter element which is in communication with input and output devices through an Input/Output Interface. The input and output devices may comprise a display, a keyboard a mouse, the robotic (or motorised) XY-stage, the sample imaging camera, and the robotic microscope camera (or image sensor). In one embodiment an OASIS-Glide XY (or XYZ) stage and controlled using an OASIS-Blue or OASIS-4i PCIE controller manufactured by Objective Imaging of Cambridge UK (http://www.objectiveimaging.com/) may be used. Other similar products may also be used.

The Input/Output Interface may also comprise a network interface and/or communications module for communicating with an equivalent communications module in another apparatus or device using a predefined communications protocol (e.g. Bluetooth, Zigbee, IEEE 802.15, IEEE 802.11, TCP/IP, UDP, etc.). A graphical processing unit (GPU) may also be included. The display apparatus may comprise a flat screen display (e.g. LCD, LED, plasma, touch screen, etc.), a projector, CRT, etc. The computing apparatus may comprise a single CPU (core) or multiple CPU's (multiple core), or multiple processors. The computing apparatus may use a parallel processor, a vector processor, or be a distributed computing apparatus including cloud based servers. The memory is operatively coupled to the processor(s) and may comprise RAM and ROM components, and may be provided within or external to the apparatus. The memory may be used to store the operating system and additional software modules or instructions. The processor(s) may be configured to load and executed the software modules or instructions stored in the memory.

In one embodiment, for example as illustrated in FIG. 3, the computing apparatus 4 comprises a local computing apparatus 20 and at least one remote computing apparatus 30. The local computing apparatus 20 is either directly connected to the robotic microscope platform 2, for example over a wired connector such as USB cable, or over a wireless connection according to a protocol such as Bluetooth or Wi-Fi Direct. Alternatively the local computing apparatus 20, the robotic microscope platform 2 may form a local area network and each be connected to the same router over wired or wireless connections to allow the different apparatus to exchange messages or data.

For example as shown in FIG. 3 a local computing 20 comprises at least one processor 22 and a memory 23 and a desktop application 24, and a remote computing apparatus 30 comprises at least one processor 32 and a memory 33 and a web application 34. The local computing apparatus may be a laptop, a desktop, a mobile tablet, a smart phone, or an computing board (or boards) integrated into the robotic microscope, and the remote computing apparatus may be a web server or cloud hosted server. The desktop application may be an "App" configured to execute on tablet computing apparatus or smart phone. The web application 34 provides the system user interface as well as licensing, user accounts, job coordination, analysis review interface, report generation, archiving functions, etc. The web application 34 and the local desktop application 14 exchange system messages 35, for example to initiate scanning jobs, or receive notifications of completed jobs. The desktop application 24 is used to control the sample imaging apparatus and robotic microscope and initiate image capture using control messages 28, and to receive captured images 29 for analysis. The received images 29 may be pre-processed by the local application and then uploaded and 29 to a master image server 36, which may be secure cloud server. An image analysis module 37, which may be a cloud based or server based analysis module performs the image analysis as described herein and provides results or outcomes to the web application 34 for reporting.

The desktop application 24 comprises a microscope controller module 26, along with supporting operations such as calibration, network communications, error reporting, and providing a local user interface to allow local control of the desktop application. A sample imaging controller module 25 may also be included which sends positioning and capture commands 28 to the sample imaging apparatus 3 and receives captured macroscale images 29 from the camera 310 which are stored in master image server 36 and provided to the image analysis module 37 for quality assessment and identification of excluded regions. The microscope controller module 26 provides positioning commands 28 to the motorised stage controller 12 and the motorised Z axis focus drive 13, and initiates image capture by image sensor (or camera) 16 located at the image plane 14 of the microscope, and receives the captured magnified phase contrast images 29. These are then stored in master images server 36 and provided to the analysis module 37 for identification and counting of countable respirable particles.

In one embodiment the analysis module 37 may be provided locally as part of the desktop application. In other embodiments, the analysis module may be a distributed module, with some functionality performed on the local computing apparatus 20 and some functionality by the remote computing apparatus 30. For example image quality assessment could be provided locally and detailed image analysis provided remotely. In another embodiment analysis of both the low power images and the high power magnified phase contrast images is performed locally. That is analysis module 37 is part of the desktop application 24. The analysed results are then serialised and sent to the web application 37, and/or the master image store 36.

The desktop and web applications are developed and built using a high level language such as C++ or JAVA and Qt v5.7 framework. In one embodiment the image analysis module 37 implements computer vision libraries such as OpenCV 3.1. In one embodiment the sample imaging apparatus 3 and the robotic microscope 2 are both controlled via respective USB connections to a local laptop computing which runs the desktop application 24. In one embodiment the robotic XY stage is an Oasis Imaging Glide-S2 motorised stage provided by Objective Imaging who also provide C++ Dynamically Linked Libraries (DLLs herein) and an Application Programming Interface (API herein). The API allows accurate position of the X-Y stage axis and of the Z focus axis. The API also provides utilities for image stitching, generation of focus maps, and predictive focusing.

The above embodiments use computer vision methods to perform a quality assessment and to identify and count the number of countable respirable particles within a counting region of the field of view of high magnification images captured at a sample location that cover the complete depth of the membrane. In the context of this specification a computer vision method is an automated method for analysing an image based on known reference or training data sets and comprises the use of machine learning or a supervised learning method to build a classifier (or classifiers) using reference data sets including test and training sets, including deep learning methods using multiple layered classifiers and/or multiple neural nets. The classifiers may use various image processing techniques and statistical technique such as feature extraction, detection/segmentation, mathematical morphology methods, digital image processing, objection recognition, feature vectors, etc. to build up the classifier. Various algorithms may be used including linear classifiers, regression algorithms, support vector machines, neural networks, Bayesian networks, etc. Computer vision or image processing libraries provide functions which can be used to build a classifier such as Computer Vision System Toolbox, MATLAB libraries, OpenCV C++ Libraries, ccv C++ CV Libraries, or ImageJ Java CV libraries.

In one embodiment a deep learning method is used for the pixel extractor and/or feature extractor steps of the computer vision analysis. Deep learning methods use a hierarchical cascade of multiple layers of classifiers, or other feature extraction modules, where the output from a previous layer forms the input for the next layer. Typically deep learning requires a very large training set of images for training the system. For example a set of 10,000+ microscope images at 200× and 400× magnification could be used as the training set. Regions of interest (ROI) containing individual particles, grouped particles, and no particles are then extracted from the images. A software tool allows humans to label regions of interest and count the particles in an image and/or highly fibre pixels in images. For example a Human Intelligence Task (HIT) template can be provided on the Amazon Mechanical Turk marketplace to allow humans to label the regions of interest (see for example https://blog.mturk.com/tutorial-annotating-images-with-bounding-boxes-using-amazon-mechanical-turk-42ab71e5068a). These labelled images are then used to configure a deep learning training process to create one or more classifiers. A range of deep learning software libraries such as TensorFlow and Caffe can be used for deep learning implementations (for example see http://www.wolfib.com/Image-Recognition-Intro-Part-1/).

The deep learning process comprises using training data (images) to create an initial set of models/classifiers. Multiple classifiers may be created such as: a classifier able to identify individual pixels that are part of one or more countable respirable particles; a classifier able to identify individual particles in their entirety; and/or a classifier able to identify and estimate the number of particles in a grouping. An iterative deep learning process is then initiated. This iterative process begins with the models/classifiers analysing input ROI images they have not previously seen (ie not been trained on). The performance of each classifier is assessed by comparing the fibre count and/or fibre pixel accuracy compared with the human labelled results. Alternatively the best performing models/classifiers are selected after the evaluation step, and a new set of models/classifiers are created by random changes to the best performing classifiers. The iterative deep learning steps of analyse new images, evaluate, select and modify classifiers is repeated until acceptable performance is achieved (ie passes a threshold accuracy). For example if a classifier achieves an 99.5% accuracy of count results compared to the human labelled results then the iterative deep learning process can be terminated (during the evaluation step). Once a deep learning solution is trained (ie passes a threshold accuracy), the deep learning solution can be deployed in a cloud computing environment where images captured by the microscope are sent to the deep learning solution to identify and count from ROI in the images it receives.

Embodiments of the method and system described herein provide improvements for implementing the standard membrane filter method used for analysing a membrane filter obtained from an air quality monitoring apparatus for measuring airborne asbestos fibre concentration. The automated sample capture and analysis enables computer vision techniques to be used to assess slide quality and detection of regions to be excluded prior to identification of countable respirable particles. The robotic microscope system can rapidly acquire images to sample or tile the sample portion (ie filter) and automates movement of the XY stage, Z focusing, and image capture. Images can then be sent to an analysis module which uses computer vision techniques to rapidly and reliably assess quality and determine a countable region and then identify and count countable respirable particles and generate an appropriate report. The result comprises at least the total count and/or density, and may contain any other relevant information such as a quality assessment score, images, etc. This automated system thus provides fast and rigorous adherence to the guidelines for implementing the standard membrane filter method compared to existing manual methods and systems. This allows higher throughput and thus reduces the operational costs enabling cheaper testing.

For example a highly skilled human operator takes between 8-30 minutes to scan and analyse up to 100 sample locations per sample, and can process 8-12 samples per day. The result uncertainty is high and inter-laboratory reliability is low, and the due to the subjectively the analysis is not repeatable. In comparison the automated system described herein can scan and analyse a sample in 1-2 minutes and can easily process 100 samples per day or more. The operator skill required is much lower as they are only required to fix samples to microscope slides and place them in the autoloader, or onto the robotic XY stage (and between the microscope and sample imaging apparatus if they are separate). Further rather than using 20 or 100 random/user selected sample locations, the system scans (tiles) the entire sample portion, allowing a measurement of the total asbestos count over the entire filter, or an estimate of the fibre density over the entire filter.

Further the result uncertainty is comparatively lower and the inter-laboratory reliability is much higher and the analysis is repeatable. The system also provides superior traceability. Analysed images can be stored on web servers along with analysis information such as absolute positions of particles, excluded regions, quality measures, etc.

The system includes a quality assessment prior to fibre counting. A range of quality assessment criteria can be used. The quality assessment may be performed at the level of field of view so that particle detection and counting is only performed on high quality images. Further quality assessment at the filter level may also be performed to detect poor quality membranes which should not be counted. In one embodiment a set of high resolution images are captured and field of view level quality assessment is performed on each image at a sample location, or a set of images taken at the same sample location. If the image passes the field of view quality assessment, then particle counting is performed, otherwise the sample location is terminated. The whole slide may be rejected if too many individual sample locations fail field of view level quality assessments as this may indicate the slide as a whole may be a poor quality slide. Alternatively or additionally, images from multiple sample locations may be combined, or analysed collectively to perform an overall filter level quality assessment. A slide that fails the overall filter quality assessment may be discarded or ignored (ie no counting performed or discarded). In some embodiments the quality assessment is performed in two parts, by performing a filter level quality assessment (part 1), and a field of view level quality assessment (part 2). The filter level quality assessment may comprise performing a low power scan of the filter which collects low magnification images across the sample portion. These may tile the sample portion or sample a sufficient area of the sample portion to allow an estimate of the overall quality of the filter. The second part may comprise performing a high power scan of the filter by collecting one or more images at a plurality of sample locations, and performing field of view level quality assessment.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by a computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "analysing" encompasses a wide variety of actions. For example, "analysing" may include calculating, computing, processing, deriving, investigating, looking up (e.g., looking up in a table, a database or another data structure), ascertaining and the like. Also, "analysing" may include receiving (e.g., receiving information), accessing (e.g., accessing data in a memory) and the like. Also, "analysing" may include resolving, selecting, choosing, establishing and the like.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the scope.

The invention claimed is:

1. A method for automated analysis of a filter obtained from an air quality monitoring apparatus used for sampling airborne respirable particles, the method comprising:
   loading an optically transparent support supporting a sample portion of a filter into a robotic XY stage of a digital phase contrast microscope further comprising an image sensor configured to capture an image of the image plane of the digital phase contrast microscope;
   capturing at least one image at each of a plurality of sample locations distributed over the sample portion of the filter, wherein the at least one image at each of the sample location comprises at least one magnified phase contrast image, and the robotic XY stage is configured to move the optically transparent support to position the sample location in the field of view of the microscope;
   performing a quality assessment by analysing one or more images captured at one or more of the plurality of sample locations using a computer vision method to estimate one or more quality criteria and terminating further analysis at least the sample location and/or rejecting the sample location, or terminating further analysis of the filter if the estimated one or more quality criteria fails the quality assessment based upon one or more predefined quality thresholds, wherein estimating the one or more quality criteria comprise estimating one or more of a dust loading, a particle loading, a particle distribution, a pixel colour distribution, a brightness range, or an image property or feature that indicates poor quality or proximity to a boundary, gridline or air bubble;
   analysing a plurality of the at least one image at each of a plurality of sample locations using a computer vision method to identify and count the number of countable respirable particles, wherein the computer vision method is configured to filter out one or more halos and geometrically identify one or more countable respirable particles in a group of pixels; and
   reporting either the total number of countable respirable particles counted on the filter, or an estimate of the density of respirable particles on the filter.

2. The method as claimed in claim 1, wherein terminating further analysis at at least the sample location and/or rejecting the sample location, or terminating further analysis of the filter comprises terminating further analysis at a sample location if the estimated one or more quality criteria fails the quality assessment based upon one or more predefined quality thresholds and then moving to another sample location, and if further analysis is terminated at more than a threshold number of sample locations then no further locations are sampled and further analysis of the filter is terminated and a failed quality assessment status is reported.

3. The method as claimed in claim 2, wherein a quality assessment is performed at each sample location, and further comprising performing a filter level quality assessment by combining one or more images at a plurality of sample locations to estimate one or more filter level quality criteria, the one or more filter level quality criteria comprising identify one or more tears in the filter, detecting if a portion of the filter is outside of a coverslip, detecting discolouration of the filter, estimating a percentage of the membrane covered by air bubbles, estimating a dust loading, and/or detecting an image property or feature that indicates poor quality or improper sample preparation.

4. The method as claimed in claim 1, wherein the quality analysis is performed in two parts, the first part comprising performing a filter level quality assessment of the filter using a plurality of images captured in a first magnification range at a plurality of sample locations, and the second part comprises performing a field of view level quality assessment of one or more of the at least one images at a plurality of sample locations captured in a second magnification range, wherein the second magnification range is a higher power magnification range than the first magnification range, and
   performing a filter level quality assessment comprises analysing a plurality of images captured in the first magnification range at a plurality of sample locations, and the estimating the one or more quality criteria comprises identifying one or more tears in the filter, detecting if a portion of the filter is outside of a coverslip, detecting discolouration of the filter, estimating a percentage of the membrane covered by air bubbles, estimating a dust loading, and/or detecting an image property that indicates poor quality or improper sample preparation, and
   performing a field of view level quality assessment at each sample location comprises estimating one or more a dust loading, a particle loading, a particle distribution, a pixel colour distribution, a brightness range, and/or an image property or feature that indicates poor quality or proximity to a boundary, gridline or air bubble for the field of view at the sample location,
   and wherein if the estimated one or more quality criteria fails a filter level quality assessment then terminating further analysis comprises terminating further analysis of the filter and reporting a failed quality assessment status for the filter, and
   if the estimated one or more quality criteria fails a field of view level quality assessment then terminating further analysis comprises terminating further analysis for this sample location and then moving to another sample location unless further analysis has been terminated at more than a threshold number of sample locations in which case no further locations are sampled and a failed quality assessment status is reported.

5. The method as claimed in claim 4, the first magnification range is between 10× and 200×, and the second magnification range is between 200× and 600×.

6. The method as claimed in claim 4, wherein the second part is performed after the first part and the filter level quality assessment and the filter level quality assessment is used to plan the location of the sample locations used in the second part.

7. The method as claimed in claim 4, wherein the plurality of images used for performing the filter level quality assessment are collected at the same time as the plurality of images used for performing field of view level quality assessment, and an objective lens of the digital phase contrast microscope is robotically switched between two magnifications at a sample location depending upon whether an image to be captured is to be used for the filter level quality assessment or the field of view level quality assessment.

8. The method as claimed in claim 4, wherein the plurality of images used for performing the filter level quality assessment tile the sample portion of the filter.

9. The method as claimed in claim 4, wherein the plurality of images used for performing the filter level quality assessment are captured at a plurality of sample locations distributed within the sample portion of the filter such that the total area of the captured images comprises at least 20% of the total area of the sample portion.

10. The method as claimed in claim 4, wherein performing the filter level quality assessment further comprises determining a countable region of the filter and one or more excluded regions within the countable region of the filter, the excluded regions comprising one or more of filter grid lines, air bubbles and large particulate matter.

11. The method as claimed in claim 10 determining a countable region of the filter comprises:
identifying one or more locations comprising a slide boundary, a coverslip, gridlines on the filter, one or more bubbles on the filter, or large particulate matter including dirt;
defining or more excluded regions containing the one or more identified locations;
defining the countable region by identifying the set of images in the plurality of images which do not contain an excluded region within the field of view of the image, and
wherein analysing a plurality of the at least one image at each of a plurality of sample locations comprising analysing the countable region using a computer vision method to identify and count the number of countable respirable particles within the countable region.

12. The method as claimed in claim 10, wherein analysing a plurality of the at least one image at each of a plurality of sample locations comprises analysing the one or more captured images at each sample location if the field of view at the sample location is wholly within the countable region.

13. The method as claimed in claim 1, wherein the step of capturing at least one image at each of a plurality of sample locations further comprises capturing, at each sample location, a set of Z magnified phase contrast images each captured at a different focal plane, and analysing the countable region comprises Z-stacking the set of Z magnified phase contrast images to obtain a single stacked image, and the computer vision method analyses the single stacked image to identify and count the number of countable respirable particles within a counting region of the field of view of the single stacked image.

14. The method as claimed in claim 1, wherein the step of capturing at least one image at each of a plurality of sample locations further comprises capturing, at each sample location, a set of Z magnified phase contrast images each captured at a different focal plane where Z is more than 1, and selecting the image with the sharpest focus wherein the selected image is used in the step of analysing a plurality of the at least one image at each of a plurality of sample locations.

15. The method as claimed in claim 1, wherein the step of capturing at least one image at each of a plurality of sample locations further comprises capturing, at each sample location, a set of Z magnified phase contrast images each captured at a different focal plane where Z is more than 1, and separately analysing the Z images to detect a feature present in multiple focal planes.

16. The method as claimed in claim 1, wherein analysing one of the plurality of the at least one image at each of a plurality of sample locations using a computer vision method comprises:
identifying one or more regions of interest within a counting region of the field of view;
applying a pixel extractor to identify candidate particle pixels in each region of interest and filter out halo pixels using one or more machine learning techniques, background filtering, or diffusion filtering techniques, and outputting one or more pixel blobs comprising a contiguous group of pixels;
applying a feature extractor to each pixel blob received from the pixel extractor to apply one or more geometric operations to classifying a pixel blob having a geometry matching a respirable particle as a countable respirable particle; and counting the number of countable respirable particles.

17. The method as claimed in claim 16, wherein the respirable particles and countable respirable particles are asbestos fibres and the one or more geometric operations comprises applying a regular asbestos fibre geometric filter to each candidate region of interest using a filtering criteria requiring a pixel blob in a candidate region of interest to have a maximum width less than 3 micrometres, a length greater than 5 micrometres and a length:width ratio greater than 3:1, and which does not appear to touch any other pixel blob within the candidate region of interest, and each pixel blob satisfying the filtering criteria is counted as a single countable respirable fibre.

18. The method as claimed in claim 16, wherein the respirable particles and countable respirable particles are asbestos fibres and the one or more geometric operations comprises applying a bundled asbestos fibre geometric filter to each candidate region of interest using a filtering criteria requiring a pixel blob in a candidate region of interest to have a maximum width less than 3 micrometres, a length greater than 5 micrometres and a length:width ratio greater than 3:1; and which does not appear to touch any other pixel blob with a maximum width, defined as the smaller of the two dimensions of the other pixel blob, greater than 3 micrometres, and wherein counting the number of countable respirable fibres comprises counting any individually distinguishable fibres, or if no individual fibres can be distinguished then counting the bundle as a single fibre.

19. The method as claimed in claim 1, wherein analysing one of the plurality of the at least one image at each of a plurality of sample locations using a computer vision method comprises using a deep learning neural network model.

20. The method as claimed in claim 1, wherein the step of capturing at least one image at each of a plurality of sample locations distributed over the sample portion of the filter comprises:
a) defining a 2D mapping grid over the sample portion, wherein the dimensions of the grid are based on a field of view associated with a magnification setting of the digital phase contrast microscope, and the grid points define the plurality of sample locations;
b) selecting a point within the 2D mapping grid;
c) instructing the robotic XY stage to the selected point and capturing at least one magnified phase contrast image;
d) repeating steps b) and c) until the captured images tile the sample portion or have a total area exceeding a threshold area.

21. The method as claimed in claim 1, further comprising determining a target focal plane at at least one sample location, comprising:
capturing an image at a magnification of between 4× and 200× and using a computer vision method to identify one or more gridlines in the captured image;
moving the robotic XY stage so that an identified gridline is proximal to a centre of the field of view;
switching an objective lens of the digital phase contrast microscope to a higher magnification objective lens;

adjusting a Z height of the digital phase contrast microscope until the gridline is in focus;

storing the Z height as a point in the target focal plane, and using the stored target focal plane to determine the focal plane for capturing one or more images at one or more other sample locations.

22. The method as claimed in claim 1, further comprising determining a target focal plane at at least one sample location, comprising:

capturing a series of images at a magnification of between 4× and 200× at a sample location, wherein the series of image are each taken at a different Z height;

analysing the series of images to determine one or more of a coverslip boundary or an upper slide boundary, or a lower slide boundary, and storing the Z height of the image with the sharpest focus that is estimated to be within upper slide boundary and the lower slide boundary as a point in the target focal plane, and using the stored target focal plane to determine the focal plane for capturing one or more images at one or more other sample locations.

23. The method as claimed in claim 1, wherein the countable respirable particles are asbestos fibres or synthetic mineral fibres and the filter is a membrane filter.

24. The method as claimed in claim 1, wherein the optically transparent support is a microscope slide, and the method further comprises loading a plurality of microscope slides each supporting a sample portion filter into a computer controlled autoloader configured to loads and unload one or more microscopes into the robotic XY stage, and inserting the microscope slide supporting the sample portion filter into a robotic XY stage is performed using the autoloader, and wherein each microscope slide comprises a unique identifier, and the method further comprises capturing a representation of the identifier, and performing the capturing analysing and reporting steps for each loaded microscope wherein the reporting also reports the unique identifier of the microscope.

25. A system for automated analysis of a filter obtained from an air quality monitoring apparatus used for sampling airborne respirable particles, the apparatus comprising:

a robotic microscope platform comprising
 a phase contrast microscope;
 a motorised XY stage for receiving an optically transparent support which in use comprises a sample portion of a filter;
 a motorised Z axis focus drive;
 an image sensor located in an image plane configured to capture at least one magnified phase contrast image; and at least one computing apparatus operatively connected to the robotic microscope platform, the at least one computing apparatus comprising at least one processor and a memory operatively connected to the processor, and the computing apparatus configured to perform a method for automated analysis of sample portion of a filter loaded into the robotic microscope platform, the method comprising:

capturing at least one image at each of a plurality of sample locations distributed over the sample portion of the filter, wherein the at least one image at each of the sample location comprises at least one magnified phase contrast image, and the motorised XY stage is configured to move the optically transparent support to position the sample location in the field of view of the microscope;

performing a quality assessment by analysing one or more images captured at one or more of the plurality of sample locations using a computer vision method to estimate one or more quality criteria and terminating further analysis at at least the sample location and/or rejecting the sample location, or terminating further analysis of the filter if the estimated one or more quality criteria fails the quality assessment based upon one or more predefined quality thresholds, wherein estimating the one or more quality criteria comprise estimating one or more of a dust loading, a particle loading, a particle distribution, a pixel colour distribution, a brightness range, or an image property or feature that indicates poor quality or proximity to a boundary, gridline or air bubble;

analysing a plurality of the at least one image at each of a plurality of sample locations using a computer vision method to identify and count the number of countable respirable particles, wherein the computer vision method is configured to filter out one or more halos and geometrically identify one or more countable respirable particles in a group of pixels; and reporting either the total number of countable respirable particles counted on the filter, or an estimate of the density of respirable particles on the filter.

26. The system as claimed in claim 25, further comprising:

a motorised nosepiece comprising multiple objective lenses each with a different magnification.

27. The system as claimed in claim 25, further comprising:

an autoloader for storing a plurality of optically transparent supports and configured to load and unload one or more optically transparent support in the motorised XY stage.

28. The system as claimed in claim 25, wherein the at least one computing apparatus comprises a local computing apparatus and at least one remote computing apparatus, the local computing apparatus either directly connected to the robotic microscope platform or integrated in the robotic platform, or connected on a local network and wherein the local computing apparatus is configured to perform the capturing step and provide the captured at least one image to the at least one remote computing apparatus over a network connection, and the remote computing is configured to perform the analysis and reporting steps.

* * * * *